United States Patent
Lei et al.

(10) Patent No.: US 10,303,911 B2
(45) Date of Patent: May 28, 2019

(54) MOBILE DEVICE CONFIGURED TO USE MOTION DETECTION TO OPTIMIZE ACTIVATION OF VIDEO CAPTURE FOR FAST DECODING

(71) Applicant: The Code Corporation, Draper, UT (US)

(72) Inventors: Ming Lei, Princeton Junction, NJ (US); Anuj Sajit Shah, Brookline, MA (US)

(73) Assignee: The Code Corporation, Draper, UT (US)

(*) Notice: Subject to any disclaimer, the term of this patent is extended or adjusted under 35 U.S.C. 154(b) by 0 days.

(21) Appl. No.: 15/792,608

(22) Filed: Oct. 24, 2017

(65) Prior Publication Data
US 2019/0122012 A1    Apr. 25, 2019

(51) Int. Cl.
*G06K 7/10* (2006.01)
*G06K 7/14* (2006.01)
*G01P 15/18* (2013.01)

(52) U.S. Cl.
CPC ............ *G06K 7/1091* (2013.01); *G01P 15/18* (2013.01); *G06K 7/1092* (2013.01); *G06K 7/1404* (2013.01)

(58) Field of Classification Search
CPC .......................... G06K 7/10851; G06Q 30/02
USPC ................................ 235/462.3, 462.45, 470
See application file for complete search history.

(56) References Cited

U.S. PATENT DOCUMENTS

| | | | |
|---|---|---|---|
| 8,162,218 B2 | 4/2012 | Meier | |
| 8,750,637 B2 | 6/2014 | Stroem | |
| 9,257,396 B2 | 2/2016 | Uzoh | |
| 9,696,612 B2 | 7/2017 | Anderson | |
| 2003/0025822 A1 | 2/2003 | Shimada | |
| 2003/0030923 A1 | 2/2003 | Hsu | |
| 2003/0121981 A1* | 7/2003 | Slutsky | G06K 7/10851 235/462.45 |
| 2004/0056956 A1 | 3/2004 | Gardiner et al. | |
| 2006/0131419 A1 | 6/2006 | Nunnik | |
| 2006/0284987 A1 | 12/2006 | Wolf, II | |
| 2007/0158220 A1 | 7/2007 | Cleereman et al. | |
| 2007/0205287 A1 | 9/2007 | Tien | |
| 2008/0142599 A1 | 6/2008 | Benillouche | |
| 2010/0268592 A1* | 10/2010 | Shaer | G06Q 30/02 705/14.38 |
| 2012/0061462 A1 | 3/2012 | Shadwell | |
| 2013/0109316 A1 | 5/2013 | Lee | |
| 2013/0155253 A1 | 6/2013 | Wood | |
| 2013/0329014 A1* | 12/2013 | Obata | H04M 1/72522 348/46 |

(Continued)

FOREIGN PATENT DOCUMENTS

| | | |
|---|---|---|
| CN | 203838715 U | 9/2014 |
| JP | 2004032507 A | 1/2004 |
| WO | 2015083979 | 6/2015 |

*Primary Examiner* — Allyson N Trail
(74) *Attorney, Agent, or Firm* — Timothy P. O'Hagan; Ray Quinney & Nebeker P.C.

(57) ABSTRACT

Disclosed herein is a mobile device that includes a camera, a processor, memory, and a barcode-reading application stored in the memory. The mobile device may also include a motion-sensing component that may be configured to detect motion of the mobile device. The barcode-reading application may be executable by the processor to use data from the motion-sensing component to determine when to activate video capture by the camera.

20 Claims, 54 Drawing Sheets

(56) References Cited

U.S. PATENT DOCUMENTS

| | | |
|---|---|---|
| 2014/0014727 A1* | 1/2014 | Choi .................... G06K 7/0004 |
| | | 235/470 |
| 2014/0017955 A1 | 1/2014 | Lo |
| 2014/0171150 A1 | 6/2014 | Hurst et al. |
| 2014/0313377 A1 | 10/2014 | Hampton |
| 2014/0327815 A1 | 11/2014 | Auger |
| 2015/0126244 A1 | 5/2015 | Moran |
| 2015/0126245 A1 | 5/2015 | Barkan et al. |
| 2015/0317503 A1 | 11/2015 | Powell |
| 2016/0012269 A1 | 1/2016 | Kowalczyk et al. |
| 2016/0042767 A1* | 2/2016 | Araya .................... G11B 19/02 |
| | | 386/201 |
| 2016/0104016 A1 | 4/2016 | Deal |
| 2016/0104017 A1 | 4/2016 | Deal |
| 2016/0171357 A1 | 6/2016 | Kwon |
| 2016/0180128 A1 | 6/2016 | Utykanski |
| 2016/0180129 A1 | 6/2016 | Utykanski |
| 2016/0188932 A1 | 6/2016 | Powell |
| 2016/0188933 A1 | 6/2016 | Powell |
| 2016/0188934 A1 | 6/2016 | Powell |
| 2016/0232389 A1 | 8/2016 | Gifford |
| 2016/0321483 A1 | 11/2016 | Utykanski |
| 2016/0321485 A1 | 11/2016 | Utykanski |
| 2016/0373629 A1 | 12/2016 | Jung |
| 2017/0004340 A1 | 1/2017 | Powell |
| 2017/0193306 A1* | 7/2017 | Robil ................. G06K 9/00771 |
| 2017/0249491 A1* | 8/2017 | MacIntosh ............... G06K 9/78 |
| 2017/0308738 A1* | 10/2017 | Zhang ................ G06K 9/00288 |

* cited by examiner

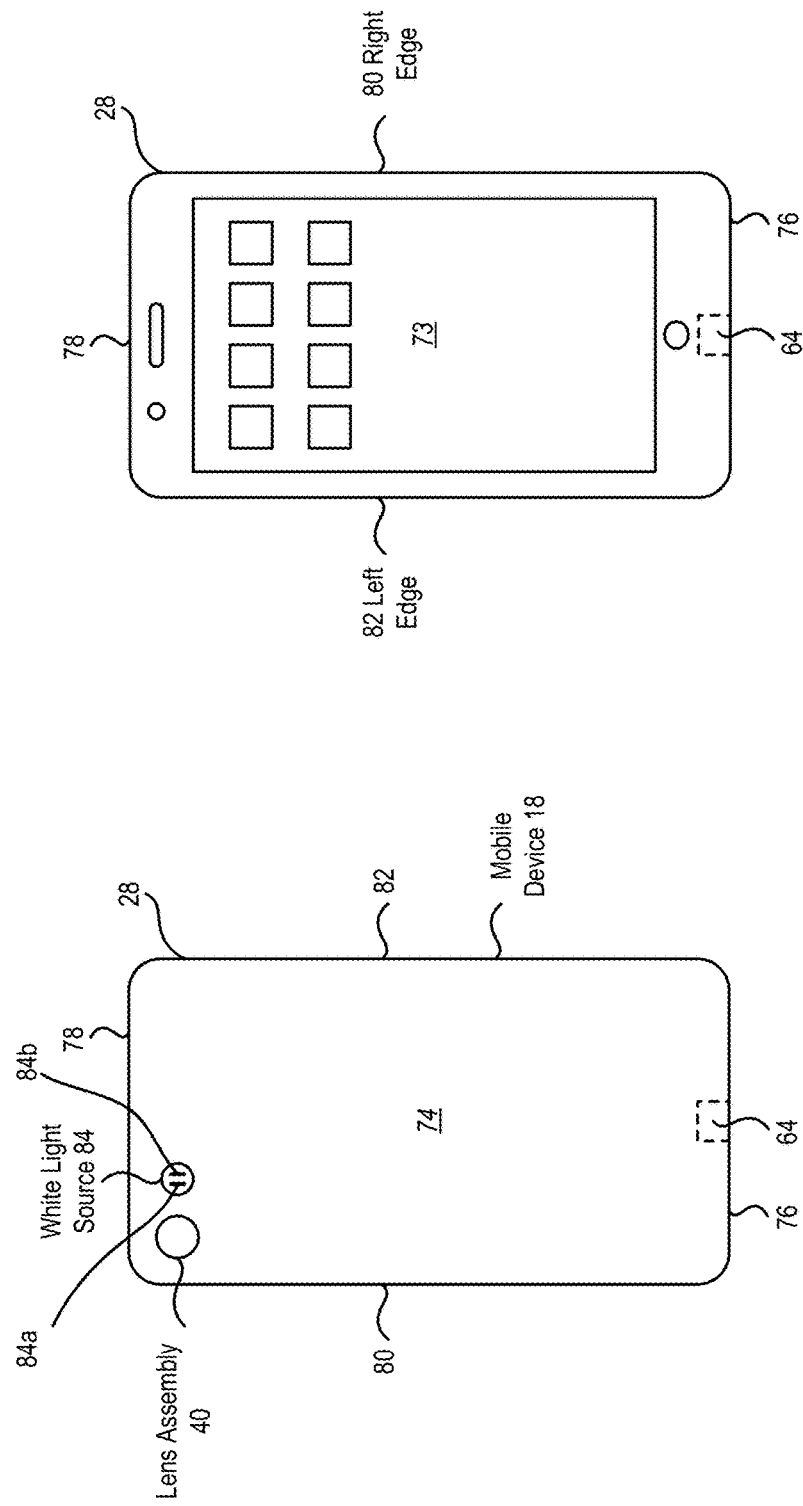

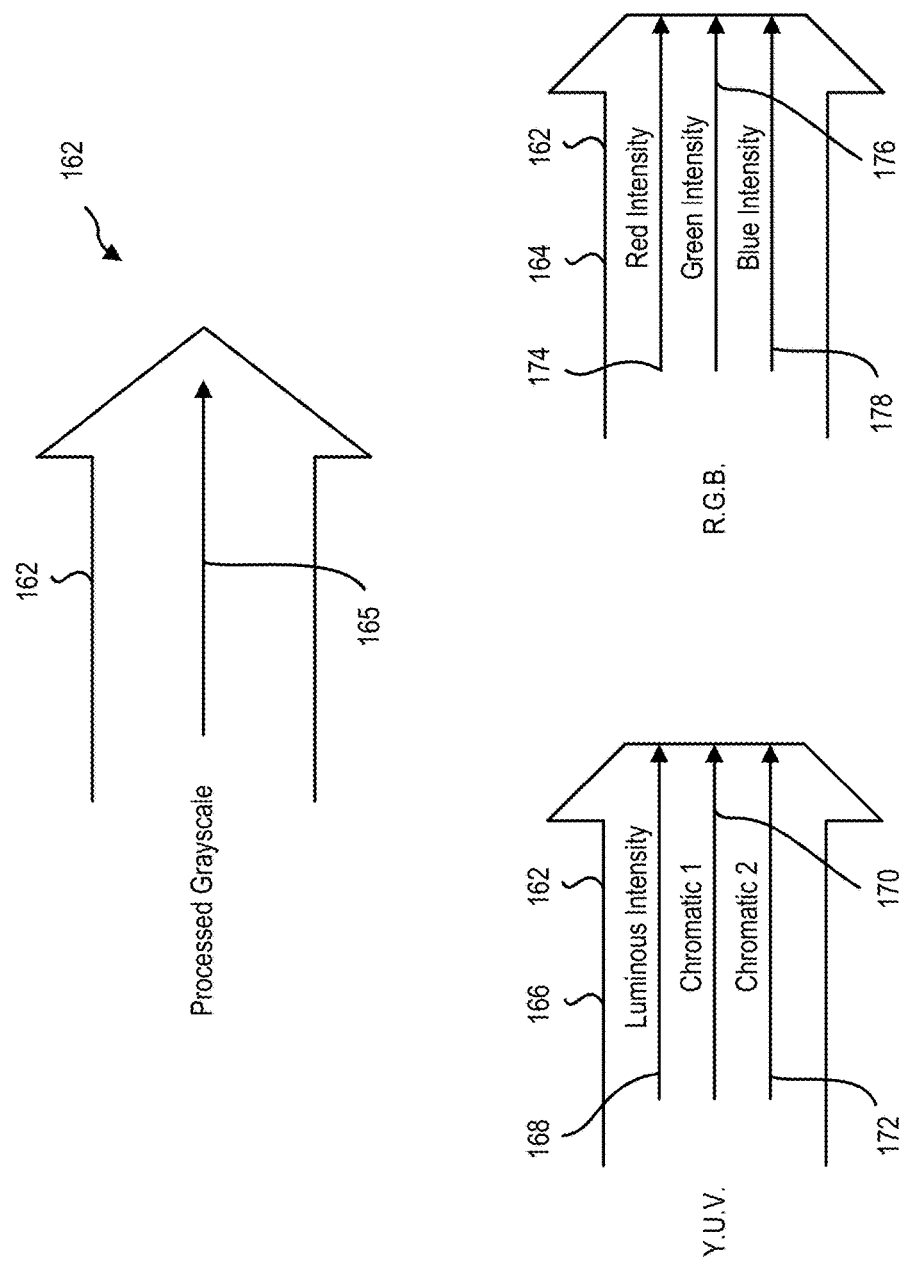

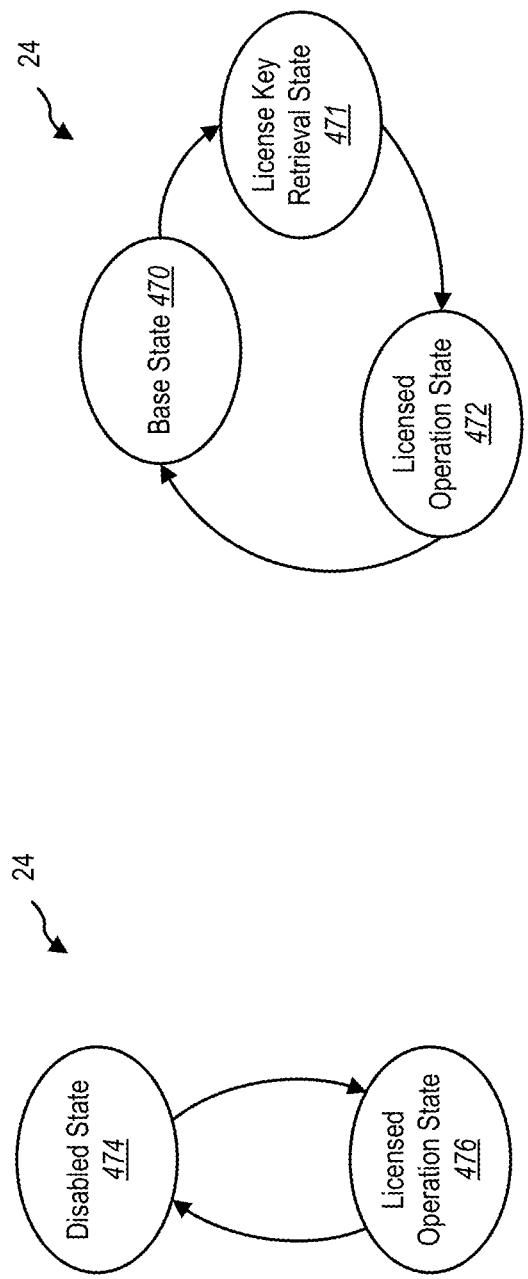

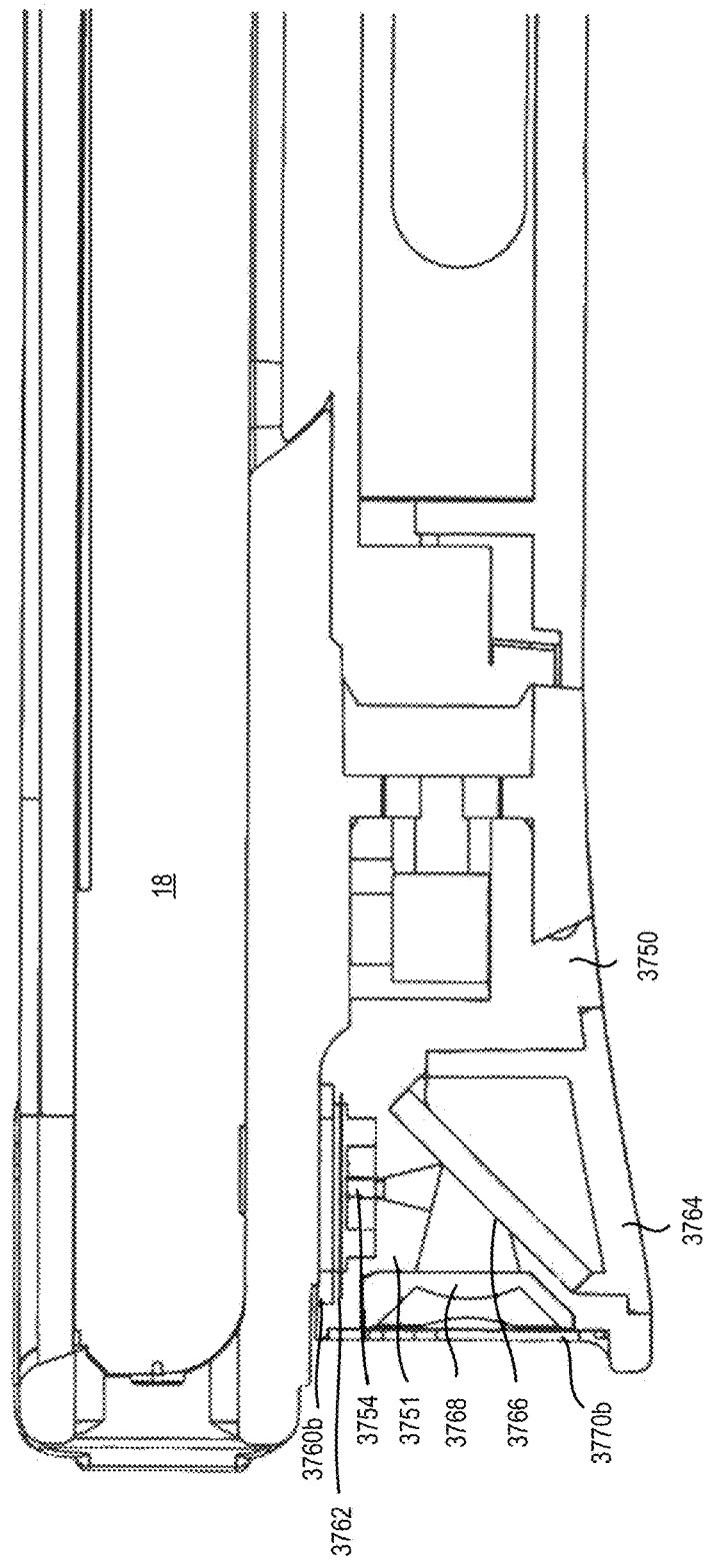

MOBILE DEVICE CONFIGURED TO USE MOTION DETECTION TO OPTIMIZE ACTIVATION OF VIDEO CAPTURE FOR FAST DECODING

BACKGROUND

Smartphones and other types of portable, hand-held computing devices, such as tablet computers, are in widespread use today, most often in connection with entertainment, communications and office productivity. Most smartphones include a camera, and applications have been developed for using the camera to read barcodes. In a typical known application an image feed from the camera is displayed on the display screen of the smartphone to assist the user in aiming the field of view of the camera towards the barcode and ensuring that the entire barcode is within the image captured by the camera.

SUMMARY

In accordance with an aspect of the present disclosure, a mobile device is disclosed that includes a camera, a processor, memory, and a barcode-reading application stored in the memory. The mobile device may also include a motion-sensing component that may be configured to detect motion of the mobile device. The barcode-reading application may be executable by the processor to use data from the motion-sensing component to determine when to activate video capture by the camera.

The barcode-reading application may be further executable by the processor to periodically determine, while the camera is in a standby mode, whether the mobile device is in motion based on the data from the motion-sensing component. The barcode-reading application may be further executable by the processor to place the camera in a video capture mode if the mobile device is in motion.

The motion-sensing component may include an accelerometer that is configured to detect acceleration of the mobile device. The accelerometer may be configured to provide accelerometer data including a plurality of acceleration values. Determining whether the mobile device is in motion may include determining a current acceleration value, determining an average of N previous acceleration values (where N may be an integer greater than or equal to one), and comparing the current acceleration value to the average of the N previous acceleration values.

Each acceleration value of the plurality of acceleration values may include an x-coordinate, a y-coordinate, and a z-coordinate. The barcode-reading application may be further executable by the processor to determine that the mobile device is in motion if any of the x-coordinate, the y-coordinate, or the z-coordinate of the current acceleration value exceeds a corresponding coordinate of the average of the N previous acceleration values. Alternatively, the barcode-reading application may determine that the mobile device is in motion if any of the x-coordinate, the y-coordinate, or the z-coordinate of the current acceleration value exceeds a corresponding coordinate of the average of the N previous acceleration values by a threshold amount.

The barcode-reading application may be further executable by the processor to wait for a defined time period after an attempt to read a barcode, and to use the data from the motion-sensing component to make a determination about whether the mobile device is in motion, the determination being made after the defined time period. The camera may be placed in a standby mode if the mobile device is not in motion.

The barcode-reading application may be further executable by the processor to restart a countdown timer after each attempt to read a barcode. The barcode-reading application may be further executable by the processor to determine, at a defined time interval prior to or after expiration of the countdown timer, whether the mobile device is in motion, and to place the camera in a standby mode if the mobile device is not in motion.

The motion-sensing component may include an accelerometer. The barcode-reading application may be further executable by the processor to set an update interval for the accelerometer. The update interval may control how often accelerometer data is updated.

The mobile device may further include an operating system that exposes the accelerometer data and the update interval for the accelerometer to the barcode-reading application via an application programming interface.

In accordance with another aspect of the present disclosure, a mobile device is disclosed that includes a camera, a processor, memory, and a barcode-reading application stored in the memory. The camera may be operable in a video capture mode and a standby mode. The mobile device may also include an accelerometer that may be configured to detect acceleration of the mobile device and to provide accelerometer data that is indicative of the acceleration of the mobile device. The barcode-reading application may be executable by the processor to periodically determine, based on the accelerometer data, whether the mobile device is in motion while the camera is in the standby mode, and place the camera in the video capture mode if the mobile device is in motion. The barcode-reading application may also be executable by the processor to use the accelerometer data to determine whether the mobile device is in motion following a defined time period after each read attempt, and place the camera in the standby mode if the mobile device is not in motion.

The accelerometer data may include a plurality of acceleration values. Determining whether the mobile device is in motion may include determining a current acceleration value, determining an average of N previous acceleration values (where N is an integer greater than or equal to one), and comparing the current acceleration value to the average of the N previous acceleration values.

Each acceleration value of the plurality of acceleration values may include an x-coordinate, a y-coordinate, and a z-coordinate. The barcode-reading application may be further executable by the processor to determine that the mobile device is in motion if any of the x-coordinate, the y-coordinate, or the z-coordinate of the current acceleration value exceeds a corresponding coordinate of the average of the N previous acceleration values. Alternatively, the barcode-reading application may determine that the mobile device is in motion if any of the x-coordinate, the y-coordinate, or the z-coordinate of the current acceleration value exceeds a corresponding coordinate of the average of the N previous acceleration values by a threshold amount.

The barcode-reading application may be further executable by the processor to restart a countdown timer after each read attempt. The barcode-reading application may be further executable by the processor to determine, at a defined time interval prior to or after expiration of the countdown timer, whether the mobile device is in motion, and to place the camera in the standby mode if the mobile device is not in motion.

The barcode-reading application may be further executable by the processor to set an update interval for the accelerometer. The update interval may control how often the accelerometer data is updated.

The mobile device may further include an operating system that exposes the accelerometer data and the update interval for the accelerometer to the barcode-reading application via an application programming interface.

In accordance with another aspect of the present disclosure, a method implemented by a mobile device that includes a camera is disclosed. The method may include periodically determining, based on accelerometer data, whether the mobile device is in motion while the camera is in a standby mode, and placing the camera in a video capture mode if the mobile device is in motion. The method may also include using the accelerometer data to determine whether the mobile device is in motion following a defined time period after each attempt to read a barcode, and placing the camera in the standby mode if the mobile device is not in motion.

The accelerometer data may include a plurality of acceleration values. Determining whether the mobile device is in motion may include determining a current acceleration value, determining an average of N previous acceleration values (where N is an integer greater than or equal to one), and comparing the current acceleration value to the average of the N previous acceleration values.

Each acceleration value of the plurality of acceleration values may include an x-coordinate, a y-coordinate, and a z-coordinate. The method may further include determining that the mobile device is in motion if any of the x-coordinate, the y-coordinate, or the z-coordinate of the current acceleration value exceeds a corresponding coordinate of the average of the N previous acceleration values. Alternatively, the method may further include determining that the mobile device is in motion if any of the x-coordinate, the y-coordinate, or the z-coordinate of the current acceleration value exceeds a corresponding coordinate of the average of the N previous acceleration values by a threshold amount.

BRIEF DESCRIPTION OF THE DRAWINGS

FIGS. 2B and 2C show a back side surface and a face surface of an exemplary mobile device that may be used in the barcode-reading system.

FIG. 2D shows two exemplary image output formats.

FIG. 4A is a state machine diagram depicting two states of operation in a barcode-reading application in accordance with one embodiment.

FIG. 4B is a state machine diagram depicting three states of operation in a barcode-reading application in accordance with another embodiment.

FIGS. 29A and 29B are cross-sectional views of the optics module along the A-A' and B-B' lines shown in FIG. 28A.

DETAILED DESCRIPTION

Figure 1:
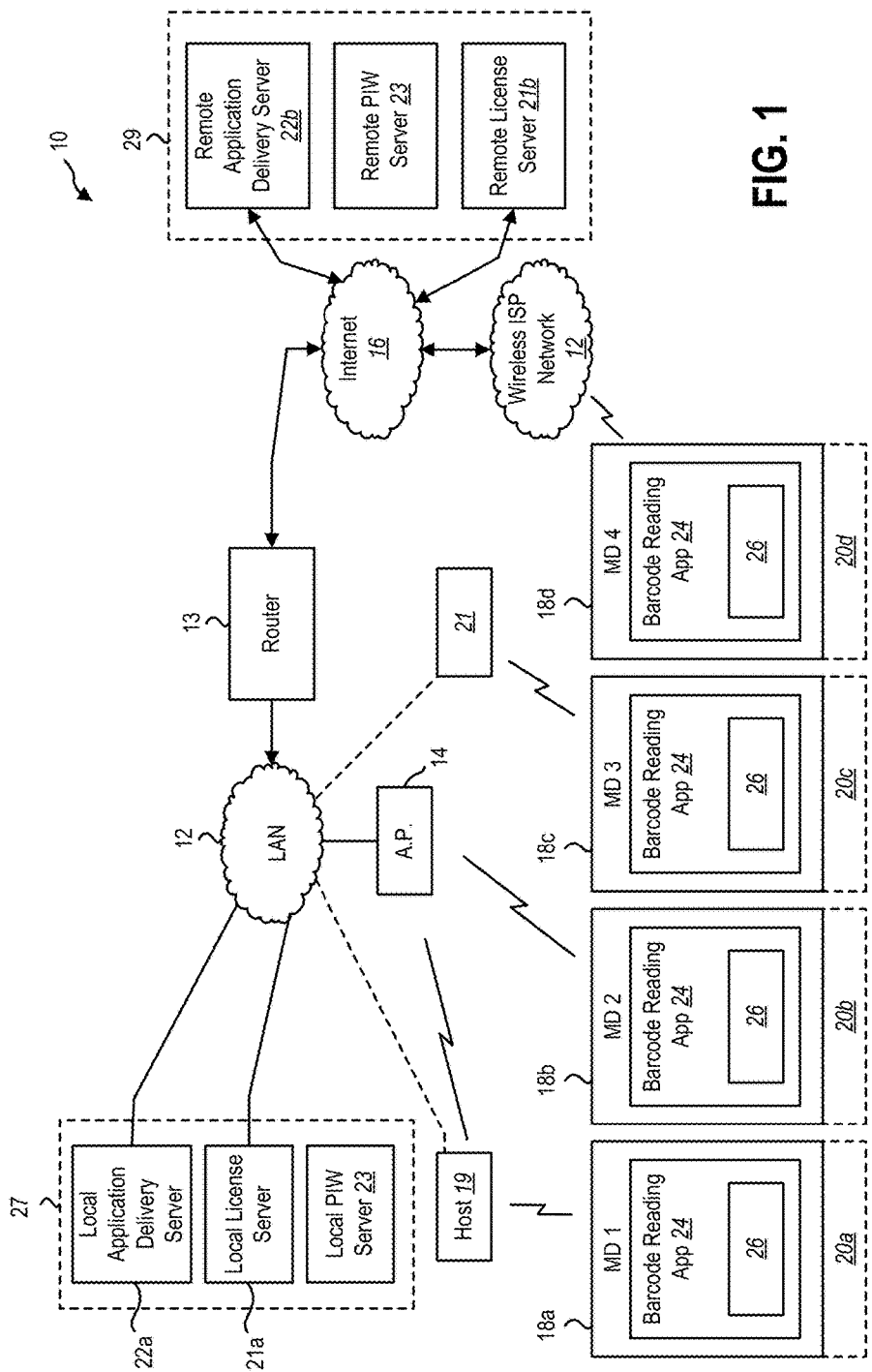
FIG. 1 illustrates an example of a barcode-reading system.

FIG. 1 depicts a system 10 according to one embodiment of the present application wherein mobile devices 18a-18d: i) obtain at least one barcode-reading application 24 from an application delivery server 22a or 22b; ii) obtain licensing (e.g., a license key 26) necessary for the operation of the at least one barcode-reading application 24 on the mobile devices 18a-18d from a licensing server 21a or 21b; and iii) use the at least one barcode-reading application 24 to exchange data with, and/or operate under control of, a data processing/workflow server 23a or 23b.

As used in this patent specification and the accompanying claims, the term "mobile device" will be used to describe a portable, hand-held computing device that comprises a camera. As indicated above, one example of a mobile device is a smartphone. Another example of a mobile device is a tablet computer. Yet another example is a hybrid tablet/smartphone device, often nicknamed a "phablet." Yet another example would be a device with a camera, display, a keyboard or a graphical user interface to perform data entry and/or manipulate data associated with an image captured by the camera (or a barcode present therein) and/or instruct the user in relationship to performing tasks associated with an image captured by the camera (or a barcode present therein).

The application delivery server may be, for example, a local application delivery server 22a or a remote application delivery server 22b. Similarly, the license server may be a local license server 21a or a remote license server 21b and the data processing/workflow server may be a local data processing/workflow server 23a or a remote data processing/workflow server 23b.

The application delivery server, the license server, and data processing workflow server may each operate on distinct hardware or combinations thereof may operate on the same hardware server. For example, the local application delivery server 22a and the local license server 21a may operate on the same hardware server 27 or on distinct hardware servers, each coupled to a local area network (LAN) 12. Similarly, the remote application delivery server 22b and the remote license server 21b may operate on the same hardware server 29 or on distinct hardware servers, each coupled to the Internet 16.

The system 10 may include a LAN 12 to which each of the local application delivery server 22a and the local license server 21a are connected. The LAN 12 may further include at least one wireless access point 14 enabling LAN communications with mobile devices (for example, mobile devices 18b and 18c) as well as other computing systems such as a host computer 19 and/or a charging station 21 (e.g. a station for providing power to the mobile device 18 for charging its battery).

The LAN 12 may be coupled to the Internet 16 via a router 13. Although FIG. 1 depicts the LAN 12 coupled to the Internet 16 via a single router 13, such connections may employ multiple routers and firewall systems, including demilitarized zone (DMZ) networks.

Figure 2A:
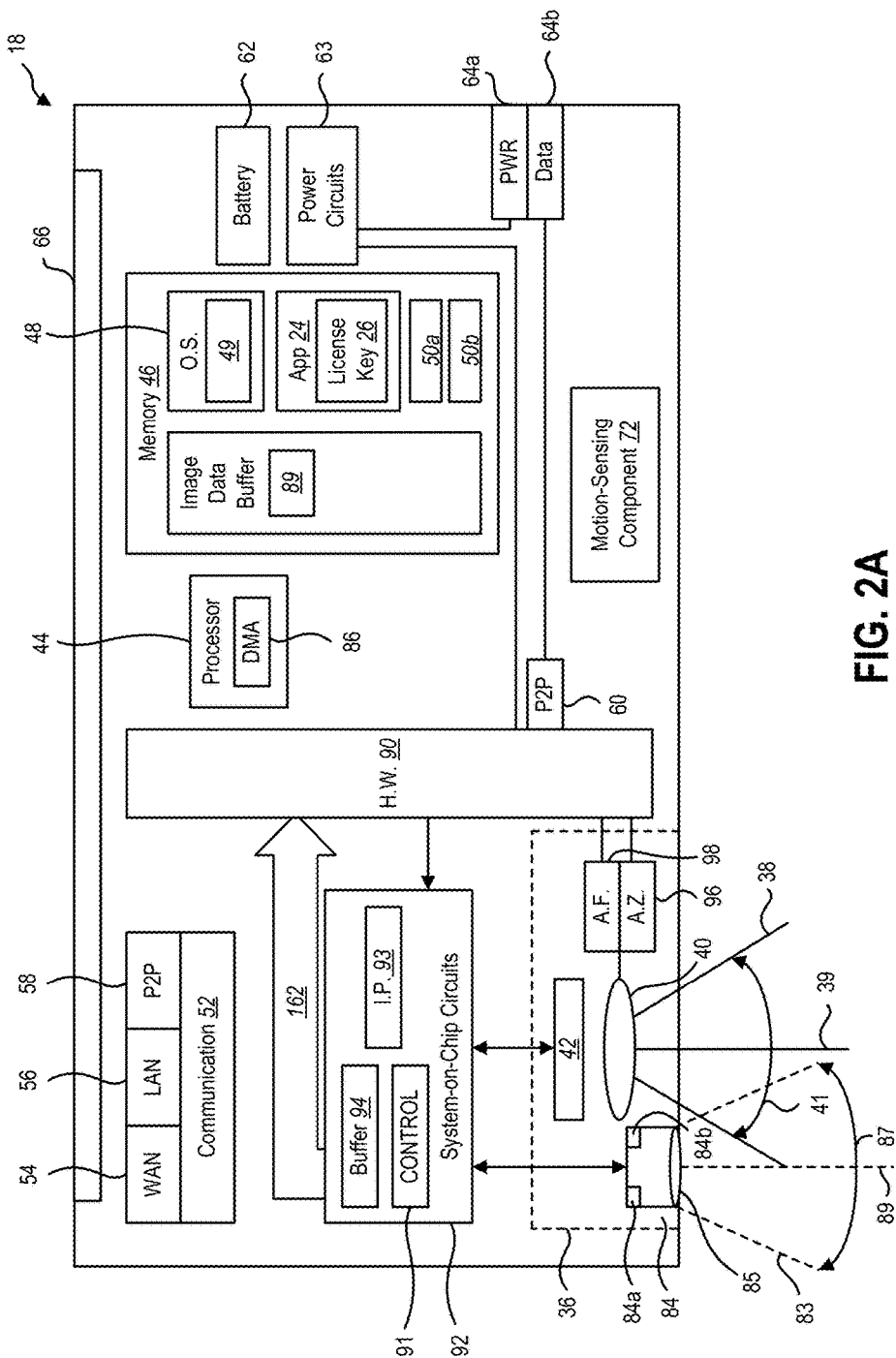
FIG. 2A is a block diagram of an exemplary mobile device useful in a barcode-reading system.

Referring to FIG. 2A in conjunction with FIG. 1, each of the mobile devices 18a-18d may include a wireless communication system 52 for operating within a wireless network environment. The wireless communication system 52 may comprise any permutation of: i) a local area network (LAN) communications module 56, ii) a wide area network (WAN) communications module 54, and/or iii) a wireless point-to-point communication interface 58.

The LAN communications module 56 may utilize Wi-Fi™ (IEEE 802.11) or similar wireless local area communication protocols for communication with a wireless access point 14 of a wireless portion of a LAN 12, such that the mobile device itself may be an addressable endpoint on the LAN 12, i.e., the mobile device may be assigned an IP address and may be capable of IP communications with other devices over the LAN 12 using IP protocols such as Transmission Connection Protocol (TCP), Uniform Datagram Protocol (UDP), etc. The wireless access point 14 and the LAN communications module 56 may function in accordance with any known wireless communications protocol, including but not limited to the IEEE 802.11 standards, which are sometimes referred to as Wi-Fi™. As will be discussed in more detail, a mobile device, 18b for example, utilizing its wireless communication system 52 (for example its LAN communications module 56 or WAN communication module 54) may obtain at least one barcode-reading application 24 from an application delivery server 22a or 22b and its license key from a license server 21a or 21b via the LAN 12 and, as applicable, the Internet 16.

The WAN communications module 54 may utilize Wideband Code Division Multiple Access (WCDMA), High Speed Packet Access (HSPA), cdma2000, Long Term Evolution (LTE) technology, or other similar long-range wireless communication protocols for communication with a wide area wireless Internet service provider (ISP). For example, the ISP may be a mobile telephone service provider and the wireless WAN communications module 54 may be a system for wireless data communications with the access towers of the wireless ISP network 17 (i.e., WAN).

Such wireless data communications may occur in accordance with any suitable wireless communication standard, including Third Generation (3G) standards (e.g., Universal Mobile Telecommunication Systems (UMTS), cdma2000, Enhanced Data Rate for GSM Evolution (EDGE), etc.) and/or Fourth Generation (4G) standards (e.g., LTE, Mobile WiMAX, etc.). The wireless ISP network 17 may assign an IP address to the mobile device such that the mobile device may be capable of IP communications with other devices over the wireless ISP network 17 using IP protocols such as TCP, UDP, or the like.

Remote devices (e.g., devices coupled to the Internet 16) may be logically connected to the LAN 12 using a Virtual Private Network (VPN) technology. As such, a mobile device, 18*d* for example, coupled to communicate with the wireless ISP network 17 utilizing its WAN communications module 54 may, utilizing a VPN technology, be an endpoint on the LAN 12. As such, a mobile device 18 may obtain at least one barcode-reading application 24 from the remote application delivery server 22*b* (or local application delivery server 22*a* utilizing VPN technologies) and its license key 26 from the remote license server 21*b* (or the local license server 21*a* utilizing VPN technologies) via the wireless ISP network 17 and, as applicable, the Internet 16.

The wireless point-to-point communication interface 58 may form a wireless point-to-point communication link with another compatible system, such as a host computer 19 and/or charging station 21, utilizing Bluetooth® or similar wireless point-to-point communication protocols. The host computer 19 and/or charging station 21 in turn includes a wired and/or wireless LAN interface for communication with a switch (not shown) or the wireless access point 14 of the LAN 12 such that the host computer 19 may be an addressable endpoint on the LAN 12.

As will be discussed in more detail, a mobile device, 18*a* or 18*c* for example, coupled to communicate with the host computer 19 utilizing its wireless point-to-point communication interface 58 may obtain at least one barcode-reading application 24 from an application delivery server 22*a* or 22*b* and its license key 26 from a license server 21*a* or 21*b* via its point-to-point connection to the host computer 19 and/or charging station 21 which communicates with the servers via the LAN 12 and, as applicable the Internet 16.

FIGS. 2B and 2C illustrate a back surface and a face surface of an exemplary mobile device 18, respectively. Referring to FIGS. 2B and 2C, the mobile device 18 may comprise a housing 28 with a plurality of external surfaces such as a face surface 73 and a back surface 74 which is generally parallel to the face surface 73 and separated from the face surface 73 by four (4) edge surfaces (each orthogonal to, and extending about the perimeter of, both the face surface 73 and the back surface 74, including a bottom edge 76, a top edge 78 (which is parallel to the bottom edge 76), a right edge 80 and a left edge 82 (which is parallel to the right edge 80).

The face surface 73 may include a user interface such as a capacitive multi-touch display screen 66 (e.g., with a glass cover), which is shown in FIG. 2A, and may define the face surface 73 of the housing 28.

Referring to FIG. 2C, the nomenclature bottom edge 76, top edge 78, right edge 80, and left edge 82 have been chosen because they correspond to the bottom, top, right, and left sides of the display screen 66 of the face surface when the display screen 66 is operated in a portrait mode. Each of the right edge 80 and the left edge 82 may be of equal length and longer than each of the bottom edge 76 and the top edge 78 (which may also be of equal length).

Referring to FIG. 2A, the mobile device 18 may include a processor 44 and a memory 46. The processor 44 may be embodied as a combination of one or more microprocessors, microcontrollers, digital signal processors (DSP), or the like, and, when operating, may execute instructions (in the form of an operating system and/or applications) stored in the memory 46. The memory 46 may be any component capable of storing electronic information, including an operating system and/or application instructions executable by the processor 44, and may be embodied as read-only memory (ROM), random access memory (RAM), magnetic disk storage media, optical storage media, flash memory devices, on-board memory included with the processor 44, erasable programmable read-only memory (EPROM), electrically erasable programmable read-only memory (EEPROM), and/or registers, etc.

The memory 46 may include an operating system 48, the barcode-reading application 24, the license key 26, one or more other applications 50*a*, 50*b*, and a data buffer including an image data buffer 89. In operation, the processor 44 may execute instructions embodied in the operating system 48, the barcode-reading application 24, and each of the other applications 50*a*, 50*b* to implement functionality described herein. Hardware circuits 90 interface the processor 44 with peripheral systems including, but not limited to, a (multi-touch) display screen 66, a wireless communication system 52, a hardwired point-to-point communication interface 60, a camera assembly 36, and a white light source 84 (e.g., an illuminator or a flash for utilizing the camera assembly 36 for photography).

The hardwired point-to-point communication interface 60 may utilize Universal Asynchronous Receiver/Transmitter (UART), Universal Serial Bus (USB), and similar communication protocols for communicating with a compatible system connected to a data connector 64*b* (which may be a part of a single power/data connector 64 such as a USB connector or an Apple® Lightning Connector®).

Referring to FIG. 2A, the camera assembly 36 may include a (color) photo sensor 42 (i.e., an array of image sensors) positioned parallel to each of the face surface 73 and the back surface 74 and a lens assembly 40 with an optical axis 39 orthogonal to the photo sensor 42 and defining a center line of a camera field of view 38 extending outward from the back surface 74 of the mobile device 18. The photo sensor 42 may include one or more sensors such as charge-coupled display (CCD) sensors, complementary metal-oxide-semiconductor (CMOS) sensors, or the like.

The lens assembly 40 may receive light reflected from objects within the camera field of view 38. The camera field of view 38 may have an angular size 41 which may be the angle at which the camera field of view 38 spreads with respect to distance from the lens assembly 40. The lens assembly 40 may have a camera aperture size measured as an f-number which is the ratio of the focal length of the lens assembly 40 to the diameter of the entrance pupil (i.e., the lens aperture (an aperture stop or an inherent aperture of the lens component defining the aperture) as viewed through the front of the lens assembly 40).

The camera assembly 36 may further include an auto zoom module 96 and/or an autofocus module 98 which may serve to control an optical zoom setting and/or autofocus setting of the camera, respectively. Autofocus and auto zoom may be controlled by moving the position of at least one of the lenses making up the lens assembly 40 with respect to each other (or with respect to the photo sensor 42) and/or altering the curvature of at least one of the lenses making up the lens assembly 40.

In general, the camera lens assembly 40 and the autofocus module 98 (which compensates for limited depth of field at larger apertures) and the auto zoom module 96 (which adjusts the angular size 41 and image magnification) are designed and/or optimized for general-purpose photography, and may therefore not be ideal for barcode capture and/or decoding. More specifically, in a barcode-reading application an operator expects to read and decode a barcode in less than 300 ms. The focus and zoom adjustment process may require significantly more time and therefore, if used, it would significantly delay the response time in a barcode-reading application.

If the camera lens assembly 40 is fixed (e.g., not adjusted for focus and zoom) at any particular focus and/or zoom setting for the lens assembly 40, the combination of the angular size 41 and the camera aperture size affect the camera depth of field (e.g., the range of distances at which a barcode of a particular modular size is imaged onto the photo sensor with sufficient size and sharpness for decoding). The angular size 41 affects the minimum distance at which a barcode of a certain overall size can be imaged onto the photo sensor 42.

The photo sensor 42 may be coupled to system-on-chip circuits 92 which include a control module 91 and an image processing module 93. In one embodiment, the control module 91 may control the operation of the photo sensor 42 (e.g., exposure, gain, and coupling of pixels to analog-to-digital (ND) converters for image read out), format the digital intensity values of each pixel of the photo sensor 42 for color image output (e.g. RGB or YUV Formats), and make the color image output available for writing to the image data buffer 89.

In one embodiment, exposure period and gain may be calculated for each frame by the control module 91 using control algorithms of the control module 91. In another embodiment, exposure period and gain may be calculated by an application such as the barcode-reading application 24. In this embodiment the application provides the exposure period and gain settings to the control module 91 and the control module 91 controls gain and exposure of the image sensor 42 in accordance therewith.

In one embodiment, the system on chip circuits 92 (or more specifically the image processing module 93) may perform image processing on images captured by the photo sensor 42 and stored in a buffer 94. Control of the photo sensor 42 and image pre-processing which may be performed by the system on chip circuits 92 are described in more detail in U.S. patent application Ser. No. 14/717,112, entitled "BARCODE READER" and filed on May 20, 2015, which is hereby incorporated by reference in its entirety.

The digital image output 162 (which may be the color image or a result of processing the image one or more times in accordance with the teachings of U.S. patent application Ser. No. 14/717,112) may be written to the image data buffer 89. The mobile device 18 may include a direct memory access (DMA) system 86 which may be a part of the processor 44. The DMA 86 provides for direct writing of the digital image output 162 from the camera assembly 36 to the image data buffer 89.

The camera assembly 36 may further include a white light source 84. The white light source 84 may include one or more LEDs 84a, 84b controlled by the system-on-chip circuits 92.

In an exemplary embodiment, a first LED 84a may be a white LED. The color of a white LED is typically described using a Kelvin temperature scale with 1500 K representing a warm color "white," such as that of candlelight, and 9500 K representing a cool color "white," such as that of a blue sky. The exemplary white LED may be within this range. Alternatively, the exemplary white LED may have a color between 4000 K and 7000 K.

In the exemplary embodiment the second LED 84b may be an amber LED emitting illumination within the 600-615 nm range. Both the first LED 84a and the second LED 84b may be positioned behind a common optic 85 which directs illumination within a field of illumination 83 projecting away from the back surface 74 and having an illumination axis 88 perpendicular to the back surface 74 and an illumination angle 87 which substantially coincides with the field of view 38 of the camera assembly 36. In operation, the system-on-chip circuits 92 may control each LED 84a, 84b independently; and control the intensity of each LED 84a, 84b independently such that the color of the white illumination of the combined LEDs may be controlled by controlling the intensity of the amber LED with respect to the intensity of the white LED. If the intensity of the amber LED is higher, the white color of the combination will be warmer (lower Kelvin temperature). If the intensity of the amber LED is lower, the color approaches the Kelvin temperature of the white LED alone.

FIG. 2D shows three exemplary formats of the digital image output 162. The digital image output 162 from the system on chip circuits 92, if not subject to image processing as described in U.S. patent application Ser. No. 14/717,112, may be in either R.G.B. format 164 and/or Y.U.V. format 166.

The Y.U.V. format 166 may include, for each pixel, a luminous intensity 168 indicative of the overall intensity of light incident on the pixel during the exposure period, a first chromatic 170 representative of a first dimension of color of the light incident on the pixel during the exposure period, and a second chromatic 172 representative of a second dimension of color incident on the pixel during the exposure period.

The R.G.B. format 164 may include, for each pixel, a red intensity value 174 indicating the intensity of red light incident on the pixel during the exposure period, a green intensity value 176 indicating the intensity of green light incident on the pixel during the exposure period, and a blue intensity value 178 indicating the intensity of blue light incident on the pixel during the exposure period.

The digital image output 162 from the system on chip circuits 92 when the image has been subjected to image processing as described in U.S. patent application Ser. No. 14/717,112 may be pixel grayscale values 165 representing an image data record as described in U.S. patent application Ser. No. 14/717,112.

Returning to FIG. 2A, the mobile device 18 may further include a battery 62 and power circuits 63. In general the power circuits 63 control charging of the battery 62 from power received from an external power source via the power connector 64a and providing operating power at the voltage and current drawing requirements of the various components of the mobile device 18 from the power received from the battery 62 or the external power source (when connected to the external power source).

The mobile device 18 may also include a motion-sensing component 72. The motion-sensing component 72 may be configured to detect motion of the mobile device 18. For example, the motion-sensing component 72 may be able to detect acceleration, rotation, angular displacement, tilt, position, orientation, motion along a non-linear (e.g., arcuate) path, or the like. The motion-sensing component 72 may be, for example, an accelerometer, a gyroscope, or a magnometer. In some embodiments, the mobile device 18 may include multiple motion-sensing components 72.

Referring to FIG. 2A in conjunction with FIG. 1, in an exemplary embodiment, the operating system 48 may include an application retrieval system 49 which obtains the barcode-reading application 24 and the applications 50a, 50b from the application delivery server 22a or 22b. In one embodiment, the operation of the application retrieval system 49, which may obtain the barcode-reading application 24 and the other applications 50a, 50b from the application delivery server 22a or 22b, may be the exclusive means for loading, writing, or otherwise placing the barcode-reading application 24 and the other applications 50a, 50b into the memory 46. The operating system 48 may be configured to block or prevent loading of any applications to the memory 46 by any means other than the operation of the application retrieval system 49 in a manner such that the applications 24, 50a, 50b may be retrieved exclusively from the application delivery server 22a or 22b.

Figure 3A:
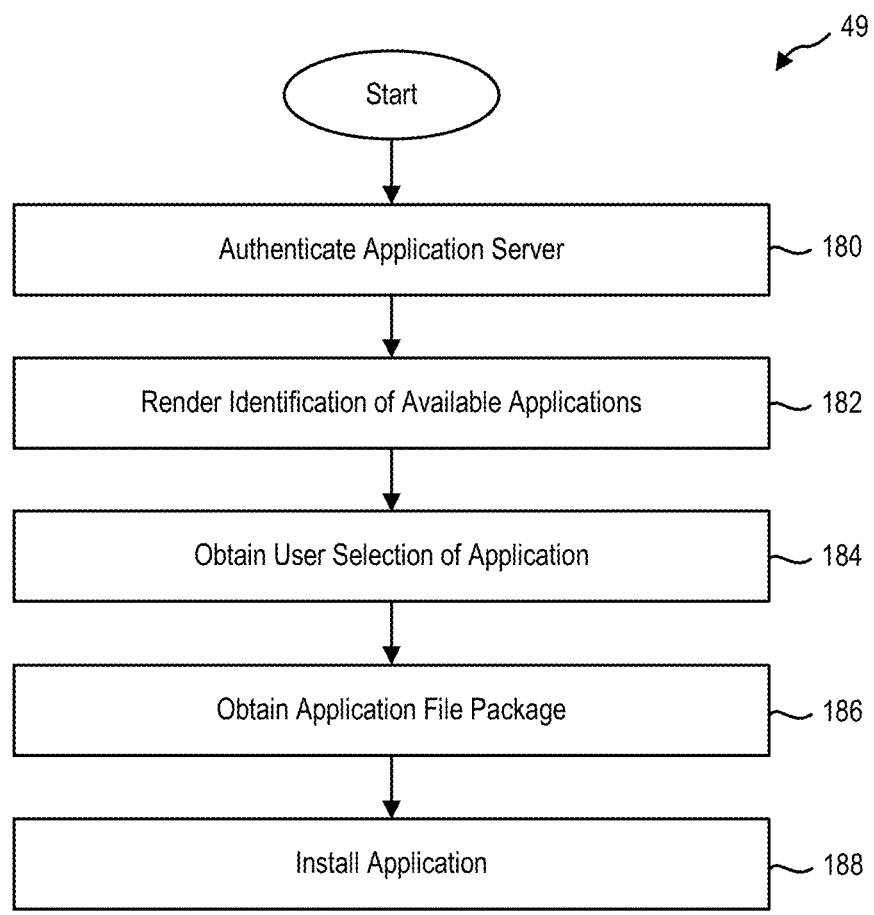
FIG. 3A is a flow diagram of an exemplary process for an operation of an application retrieval system.

FIG. 3A is a flow diagram of an exemplary process for the operation of the application retrieval system 49. Step 180 represents the application retrieval system 49 of the mobile device 18 establishing a secure connection to the application delivery server 22a or 22b over the LAN 12, the wireless ISP network 17 and/or the Internet 16 and authenticating the application delivery server 22a, 22b (i.e., mutual authentication between the mobile device and the application delivery server). The mutual authentication may be established by using any conventional authentication protocol.

Step 182 represents rendering, on the display screen 66 of the mobile device 18, identification of applications which are available to the mobile device 18 for downloading. Step 184 represents obtaining user selection of an application to download.

Step 186 represents obtaining an application file package (e.g., an install package) from the application delivery server 22a or 22b. The application file package may be temporarily stored in the memory 46 of the mobile device 18.

Step 188 represents installing the application. The installation process may include un-packing the install package and writing an executable application 50 to the memory 46.

Figure 3B:
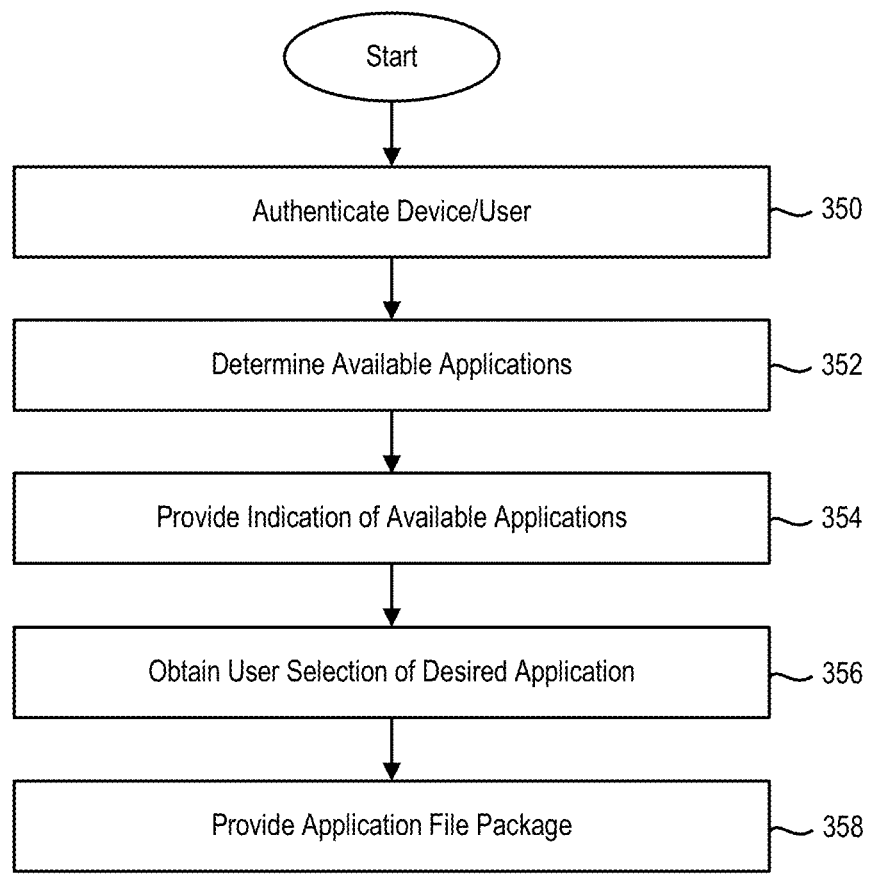
FIG. 3B is a flow diagram depicting an exemplary process for an operation of an application delivery server.

FIG. 3B is a flow diagram depicting an exemplary process for operation of an application delivery server 22a, 22b. Step 350 represents the application delivery server 22a, 22b establishing a secure connection with the mobile device 18 over the LAN 12, the wireless ISP network 17, and/or the Internet 16 and authenticating the mobile device 18 and/or the user of the mobile device 18. Authenticating the user of the mobile device 18 may include: i) authenticating the individual to which the mobile device 18 is assigned or the individual using the mobile device 18, utilizing a combination of a user ID and a password or similar schemes for authenticating an individual, and/or ii) authenticating an organization, company, or other group of users to which the mobile device 18 is assigned, utilizing a combination of a user ID and a password or other similar schemes for identifying whether the mobile device 18 has been assigned to the organization, company, or group and authenticating the assignment. The user ID may be unique to each mobile device 18 or common for all mobile devices 18 assigned to the organization, company, or group.

Step 352 represents the application delivery server 22a, 22b determining a plurality of one or more applications (the barcode-reading application 24, applications 50a, 50b, etc.) available for download based on the individual, organization, company, or other group to which the mobile device 18 is assigned.

Figure 3C:
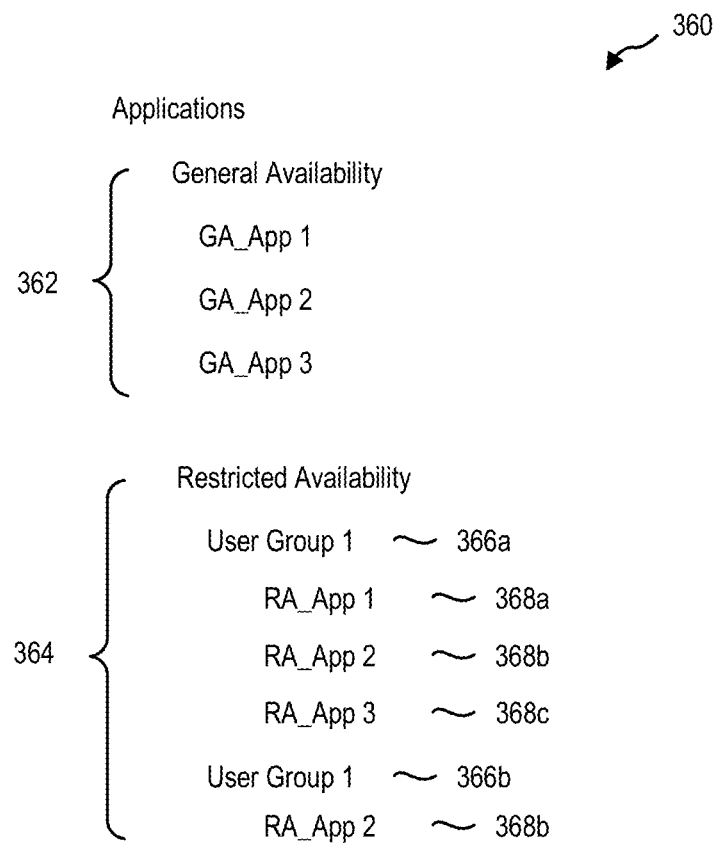
FIG. 3C shows an exemplary structure of a database of applications for downloading.

Turning briefly to FIG. 3C, the application delivery server 22a, 22b may contain, or have access to, a database 360 which identifies generally available applications 362 which are available to any mobile device 18 without regard to the identification of the user, organization, company, or group to which the mobile device 18 is assigned; and restricted applications 364 which are available only to certain individuals, organizations, companies, and groups. For restricted applications 364, the database 360 may associate each user group 366a, 366b with identification of those restricted applications 368 available to that user group 366a, 366b. Each user group may be an individual, organization, company, or other group. For example, user group 1 366a may have access to restricted applications 368a, 368b, and 368c, and user group 2 366b may have access to restricted application 368b. In each case these restricted applications may be applications written custom for the user group (and therefore are not made available to other user groups) or may be licensed to the user group (and therefore made available to those user groups which obtained a license for the application).

Returning to FIG. 3B, step 354 represents the application delivery server 22a, 22b providing an indication of the available applications to the mobile device 18. The available applications may include any of the generally available applications 362 and/or the restricted applications 364. The indication of the available applications may include, for each application, a display screen icon representing the application. The indication of available applications may not include all available applications but may include only those available applications within parameters established by the user, for example available applications which meet search criteria provided by the user. As such, step 354 may include making a search function available to the mobile device 18, obtaining search criteria or search terms from the user of the mobile device 18, and selecting matching applications that meet the search criteria from the applications available to the individual, organization, company, or group.

Step 356 represents the application delivery server 22a, 22b obtaining a user selection of a desired application. The desired application may be one of the available applications indicated to the user at step 354.

Step 358 represents the application delivery server 22a, 22b providing an application file package for the desired application to the mobile device 18. The application file package may be provided to the application retrieval system 49 of the mobile device 18 which is provided for writing the file package to a non-volatile memory and unpacking and loading the contents of the file package to generate instructions which, when loaded to a memory, may be executed by the processor 44.

Certain applications such as the barcode-reading application 24 may: i) require a license key from a license server 21a, 21b to enable operation of the application, ii) operate in a base mode of operation without a license key but require a license key from a license server 21a, 21b to enable at least one enhanced function to operate in an enhanced mode of operation, and/or iii) require a license key from a license server 21a, 21b to continue operating, or continue operating in the enhanced mode of operation, following the passage of time or following a threshold level of usage based on the time and/or the quantity of instances with which certain functions were performed (such as the quantity of decoding a barcode of a certain symbology or symbologies).

The at least one enhanced function may be a function of decoding a barcode symbology that the barcode-reading application 24 (e.g., the decoder) is restricted from decoding in the base mode of operation. Alternatively or additionally, the at least one enhanced function may be a function of decoding multiple barcodes in sequence at a rate that is faster than a rate at which the barcode-reading application 24 (e.g., the decoder) can decode multiple barcodes in sequence in the base mode of operation. Alternatively or additionally, the at least one enhanced function may be a function of decoding a quantity of barcodes of a particular symbology that exceeds a restricted threshold quantity of barcodes of the particular symbology that the barcode-reading application 24 (e.g., the decoder) can decode in the base mode of operation.

Alternatively or additionally, the at least one enhanced function may remove a demonstration restriction function (i.e., a demonstration factor that makes output of decoded data useful for demonstration purposes only) under which the barcode-reading application 24 functions in the base mode of operation. The demonstration restriction function may be at least one of: i) a function that scrambles decoded data from a barcode of at least one symbology, ii) a function that restricts the decoded data or scrambled decoded data from a barcode of at least one symbology from being made available for further processing, or iii) a function that restricts the decoded data or the scrambled decoded data from a barcode of at least one symbology from being displayed on a display screen of the mobile device 18.

Alternatively or additionally, the at least one enhanced function may enable at least one enhanced image processing function that improves an ability to decode an image of a barcode and is not operable when the decoder operates in the base mode of operation. The enhanced image processing function may include preforming additional image processing algorithms which alter the image captured by the camera assembly 36 prior to execution of the algorithms which attempt to decode a barcode depicted within the image.

Stated differently, the at least one enhanced function enabled by a license key may be a function of the barcode-reading application 24, a function of the image processing circuits 93, or a function that is a combination of functions of the barcode-reading application 24 and functions of the image processing circuits 93. For purposes of utilizing a license key to enable functions of the image processing circuits 93, the barcode-reading application 24, when operated by processor 44, may utilize the license key to determine whether certain image processing functions are entitled and, if entitled, enable the functions within the image processing circuits 93. The image processing circuits may not directly obtain or use the license key.

In accordance with another embodiment, the base mode of operation may include a base decoding mode of operation and a demonstration mode of operation. In the base decoding mode of operation, the barcode-reading application 24 may drive the camera assembly 36 to capture an image of a barcode and apply base decoder functions to the image to identify a barcode symbology. The barcode-reading application 24 may decode the barcode and make decoded data available for further processing if the barcode symbology is a base symbology, and enter the demonstration mode of operation if the barcode symbology is not the base symbology.

In the demonstration mode of operation, the barcode-reading application 24 may apply at least one enhanced barcode-reading function to decode the barcode, and perform at least one of: i) outputting an indication of successful decoding of the barcode, or ii) implementing a restriction function. The restriction function may be at least one of: i) a function that scrambles decoded data, ii) a function that restricts the decoded data or scrambled decoded data from being made available for further processing by at least one application executing on the mobile device, or iii) a function that restricts the decoded data or the scrambled decoded data from being displayed on a display screen of the mobile device 18.

The barcode-reading application 24 may perform an upgrade function in the demonstration mode of operation. The upgrade function may enable user selection to obtain the license code, obtain the license code based on the user selection, establish a network connection to the licensing server 21a, 21b, and obtain the license code from the licensing server 21a, 21b.

In order to obtain the license code from the licensing server 21a, 21b, the barcode-reading application 24 may communicate to the licensing server 21a, 21b one of: i) a unique identification code of the mobile device 18, or ii) a user identification code identifying a controller of the mobile device 18.

In accordance with another embodiment, the barcode-reading application 24 (e.g., a decoder application) running on the processor 44 of the mobile device 18 may be configured to control the image processing circuits 93 and camera assembly 36 of the mobile device 18 to capture an image of a barcode. The image of the barcode may be affected by at least one optic system of the camera assembly 36. The decoder application may utilize a base decoder function for attempting to decode a barcode if an enhanced decoder mode has not been authorized for the mobile device 18, and utilize an enhanced decoder function for attempting to decode the barcode if the enhanced decoder mode has been authorized for the mobile device 18.

The enhanced decoder function may include a function of decoding a barcode symbology that the decoder application is restricted from decoding if the enhanced decoder mode has not been authorized for the mobile device 18. Alternatively or additionally, the enhanced decoder function may include a function of decoding multiple barcodes in sequence at a rate that is faster than a restricted rate at which the decoder application can decode a sequence of multiple barcodes if the enhanced decoder mode has not been authorized for the mobile device 18. Alternatively or additionally, the enhanced decoder function may include a function of decoding a quantity of barcodes of a particular symbology that exceeds a restricted quantity of barcodes of the particular symbology which the decoder application can decode if the enhanced decoder mode has not been authorized for the mobile device 18. Alternatively or additionally, the enhanced decoder function may remove a demonstration restriction function (i.e., a demonstration factor that makes output of decoded data useful for demonstration purposes) under which the decoder application functions when the enhanced decoder mode has not been authorized for the mobile device 18, thereby making decoded data from a barcode of a particular symbology available for further processing by an application executing on the mobile device 18. The demonstration restriction function may be at least one of: i) a function which scrambles decoded data from a barcode of at least one particular symbology, ii) a function which restricts the decoded data or scrambled decoded data from a barcode of at least one particular symbology from being made available for further processing by at least one application executing on the mobile device 18, or iii) a function which restricts the decoded data or the scrambled decoded data from a barcode of at least one particular symbology from being displayed on a display screen of the mobile device 18. Alternatively or additionally, the enhanced decoder function may enable at least one enhanced image processing function which improves an ability to decode an image of a barcode and is not operable if the enhanced decoder mode has not been authorized for the mobile device 18. The enhanced decoder mode may be authorized by obtaining a license code from a licensing server 21a, 21b.

The decoder application may be configured to subject the license code to a predetermined algorithm to determine at least one operating permission authorized by the license code. The enhanced decoder function may correspond to the at least one operating permission authorized by the license code. The decoder application or any other application may be further configured to obtain the license code from the licensing server 21a, 21b by communicating to the licensing server one of: i) a unique identification code of the mobile device 18, or ii) a user identification code identifying a controller of the mobile device 18.

The barcode-reading application 24 (and the decoder application) disclosed above may be embodied on a computer-readable medium. The barcode-reading application 24 (and the decoder application) includes instructions executable by the processor 44 of the mobile device 18 for performing the functions disclosed above.

FIG. 4A is a state machine diagram depicting two states of operation in a barcode-reading application 24 in accordance with one embodiment. The first state of operation may be a disabled state 474 (which may also be referred to as a base state). In the disabled state 474, at least one function of the barcode-reading application 24 is disabled such that the barcode-reading application 24 may not output useful decoded data for further processing or transmission by the barcode-reading application 24 but may be capable of connecting to a licensing server 21a, 21b to obtain a license to transition the barcode-reading application 24 to a licensed operation state 476 (which may also be referred to as an enhanced operation state). The at least one function that may be disabled includes: i) an image capture function which, if enabled, would enable capturing an image of a barcode for image processing and decoding, ii) a decoding function which, if an image of a barcode is captured, would decode the image of the barcode to generate decoded data, iii) a data processing function which, if decoded data is generated, would process the decoded data as part of a useful workflow, and/or iv) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16.

The licensed operation state 476 may enable the function(s) that is/are disabled when the barcode-reading application 24 is in the disabled state 474 such that the barcode-reading application 24 may be capable of capturing an image of a barcode for image processing and decoding, decoding the image of the barcode to generate decoded data, and performing, as applicable: i) a data processing function which, if decoded data is generated, would process the decoded data as part of a useful workflow, and ii) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16.

There may be two sub-embodiments of the licensed operation state 476. In a first sub-embodiment, all of the functions of the barcode-reading application 24 may be enabled. In a second sub-embodiment, all functions of the barcode-reading application 24 may be enabled except restrictions on the output of useful decoded data may be implemented. The restrictions may be specified in the license key which transitions the barcode-reading application 24 from the disabled state 474 to the licensed operation state 476. The restrictions may be symbology restrictions, time restrictions, and/or quantity restrictions.

Figure 5:
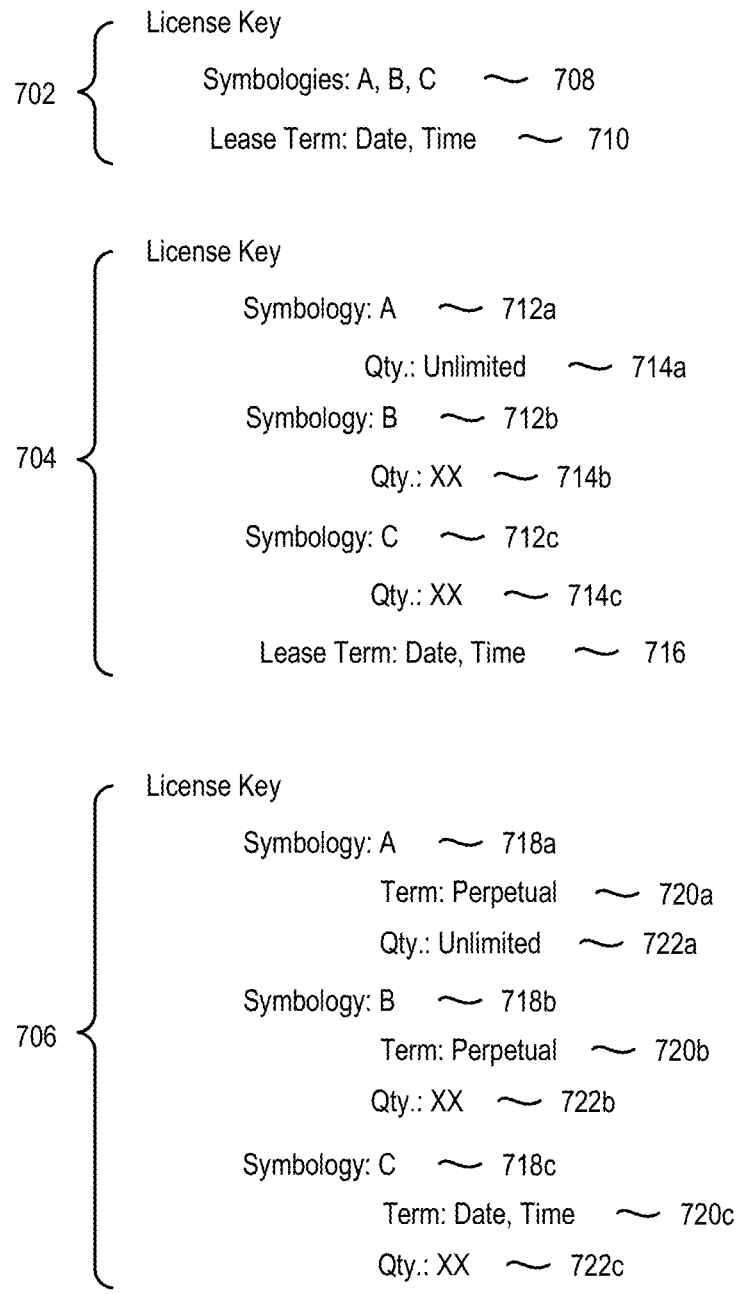
FIG. 5 shows examples of a data structure of a license key in accordance with some embodiments.

FIG. 5 shows examples of a data structure of a license key in accordance with some embodiments. A first example license key 702 may include data fields (that may be encrypted) which specify the symbologies 708 (for example, symbologies A, B, and C that correspond to a Universal Product Code (UPC), a Quick Response (QR) Code, and a Portable Data File (PDF)-417) and a lease term 710. The lease term 710 may specify a date and time at which the license key 702 expires. In response to receipt of this license key 702 (and decryption of the license key 702 if encrypted) the barcode-reading application 24 may transition to the licensed operation state 476, decode the specified symbologies 708 when in the licensed operation state 476 (while remaining disabled for decoding other symbologies not specified in the license, for example for a data matrix), and at the end of the lease term 710, transition back to the disabled state 474 (unless a new license key with an updated lease term 710 is received prior to expiration, which functions to extend the expiration of the lease term).

A second example license key 704 may include data fields (that may be encrypted) which specify the symbologies 712a-c (for example, symbologies A, B, and C that correspond to a UPC, a QR Code, and a PDF-417), and a licensed quantity of decodes 714a-c for each symbology 712a-c. The licensed quantity of decodes for a particular symbology, for example the licensed quantity 714a for symbology 712a, may be unlimited. The licensed quantity of decodes 714b-c for symbologies 712b-c may be limited to a specified quantity. The entire license key 704 may further include a lease term 716 which may specify a date and time at which the license key 704 expires. In response to receipt of this license key 704 (and decryption of the license key 704 if encrypted) the barcode-reading application 24 may transition to the licensed operation state 476, and decode the specified symbologies 712a-c when in the licensed operation state 476 up to the licensed quantities 714a-c. The barcode-reading application 24 may remain disabled for decoding other symbologies not specified in the license (e.g., symbologies other than 712a-c), automatically disable each of symbologies 712b-c when the total quantity of decodes of each symbology 712b-c exceeds the licensed quantity 714b-c (unless a new license key increases the quantity), and transition back to the disabled state 474 (unless a new license key with an updated lease term 710 is received prior to expiration, which functions to extend the expiration of the lease term). In this arrangement, the ability to decode symbologies 712b-c will expire upon the earlier of: i) reaching the maximum quantity of decodes 714b-c, or ii) expiration of the lease term 716.

A third example license key 706 may include data fields (that may be encrypted) which specify the symbologies 718a-c (for example, symbologies A, B, and C that correspond to a UPC, a QR Code, and a PDF-417), a license term 720a-c for each symbology 718a-c, and a licensed quantity 722*a-c* for each symbology 718*a-c*. The license term 720*a-c* may specify a date and time at which the license for that particular symbology 718*a-c* expires. The license term may be perpetual (e.g., license term 720*a-b*) or time limited (e.g., license term 720*c*). The licensed quantity of decodes for a particular symbology may be unlimited (e.g., the licensed quantity 722*a* for symbology 718*a*), or may specify a specific quantity (e.g., the licensed quantity 722*b-c* for symbologies 718*b-c*).

In response to receipt of this license key 706 (and decryption of the license key 706 if encrypted) the barcode-reading application 24 may transition to the licensed operation state 476, and decode the specified symbologies 718*a-c* when in the licensed operation state 476 up to the licensed quantities 722*a-c* for each symbology and for the duration of the license term 720*a-c* for each symbology. The barcode-reading application 24 may remain disabled for decoding other symbologies not specified in the license (e.g., symbologies other than 718*a-c*), and automatically disable each of symbologies 718*b-c* when the earlier of: i) the expiration of the license term 720*a-c* for each symbology 718*a-c* expires, or ii) the total quantity of decodes of each symbology 718*b-c* exceeds the licensed quantity 722*b-c*, each being subject to extension by a new license key with an increased term duration or an increased quantity.

Each of the license keys may be a data file, specifying the symbologies, the license terms, and the license quantities as depicted in FIG. 5. The data file may be encrypted utilizing an encryption key (e.g., a private key of a public/private key pair). The encrypted data file may form the license key and may be decrypted by the barcode-reading application 24 utilizing an encryption key (e.g., a public key of the public/private key pair). Other known encryption technologies may also be utilized for securing the delivery of the license key to the barcode-reading application including the license restrictions (e.g., licensed symbologies, license terms, and licensed quantities) within the license key.

FIG. 4B is a state machine diagram depicting three states of operation in a barcode-reading application 24 in accordance with another embodiment. The first state of operation may be a base state 470. When in the base state, the barcode-reading application 24 may include barcode-reading capabilities which, although functional and capable of generating useful decoded data, are limited by at least one factor or function (which will be referred to as a demonstration factor) which makes output of decoded data useful for demonstration purposes but not practical for ongoing operation.

The operation of the barcode-reading application 24 in the base state may be a base decoding mode of operation or a demonstration mode of operation. In the base decoding mode of operation, the barcode-reading application 24 may drive the camera of the mobile device 18 to capture an image of a barcode, and apply base decoder functions to the image to identify the barcode symbology. If the barcode symbology is a base symbology, the barcode-reading application 24 may decode the barcode and make the decoded data available for further processing. If the symbology is other than a base symbology, the barcode-reading application 24 may enter the demonstration mode of operation.

In the demonstration mode of operation, the barcode-reading application 24 may apply at least one unlicensed enhanced barcode-reading function to decode the barcode, and perform at least one of: i) outputting an indication of successfully decoding the barcode, or ii) implementing a restriction function. The restriction function may be at least one of: i) a function which scrambles decoded data; ii) a function which restricts the decoded data or scrambled decoded data from the barcode from being made available for further processing by at least one application executing on the mobile device; or iii) a function which restricts the decoded data or the scrambled decoded data from the barcode from being displayed on a display screen of the mobile device.

The at least one demonstration factor may include, but is not limited to: i) a scrambling function which, upon generating decoded data, provides the output in a scrambled or truncated format for purposes of demonstrating decoding capabilities (and decoder performance) but preventing use of the decoded data for further data processing, ii) a time delay function which, upon generating and outputting decoded data (or scrambled decoded data), provides for implementing a time delay before a barcode of the same symbology can again be successfully decoded, iii) an output restriction function which restricts decoded data (or scrambled decoded data) from being made available for further processing by at least one application executing on the mobile device 18, and iv) an output restriction function which enables outputting decoded data (or scrambled decoded data) to the display screen and prevents the decoded data from being further processed by the mobile device 18 (other than presentation on the display screen) or transmission to a remote application.

The demonstration mode of operation may include an upgrade function. The upgrade function may enable user selection to obtain the license code and upon user selection to obtain the license code, establish the network connection to the licensing server and obtain the license code from the licensing server 21*a*, 21*b*.

The at least one demonstration factor may be applied to selected symbologies or all symbologies. Different demonstration factors may be applied to different symbologies.

The barcode-reading application 24 may transition from the base state 470 to a license key retrieval state 471. Reading a barcode to which a demonstration factor applies may trigger transition of the barcode-reading application 24 to the license key retrieval state 471. Alternatively, the barcode-reading application 24 may transition to the license key retrieval state 471 upon user selection of the license key retrieval state 471.

When in the license key retrieval state 471 the barcode-reading application 24 may connect to a licensing server 21*a*, 21*b* to obtain a license key. After obtaining the license key, the barcode-reading application 24 may transition to a licensed operation state 472 (i.e., an enhanced operation state).

The licensed operation state 472 may enable the barcode-reading application 24 to function without limitations of the at least one demonstration factor such that the barcode-reading application 24 may be capable of capturing an image of a barcode for image processing and decoding, decoding the image of the barcode to generate decoded data, and performing, as applicable: i) a data processing function which, if decoded data is generated, would process the decoded data as part of a useful workflow, and ii) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16), in each case without being impeded by the demonstration factor.

As described with respect to the licensed operation state 476 in FIG. 4A, there may be two sub-embodiments of the licensed operation state 472. In a first sub-embodiment, all of the functions of the barcode-reading application 24 may be enabled. In a second sub-embodiment, all functions of the barcode-reading application 24 may be enabled except restrictions on the output of useful decoded data may be implemented. The restrictions may be specified in the license key which transitions the barcode-reading application 24 to the licensed operation state 472. The restrictions may be symbology restrictions, time restrictions, and/or quantity restrictions.

Figure 6A:
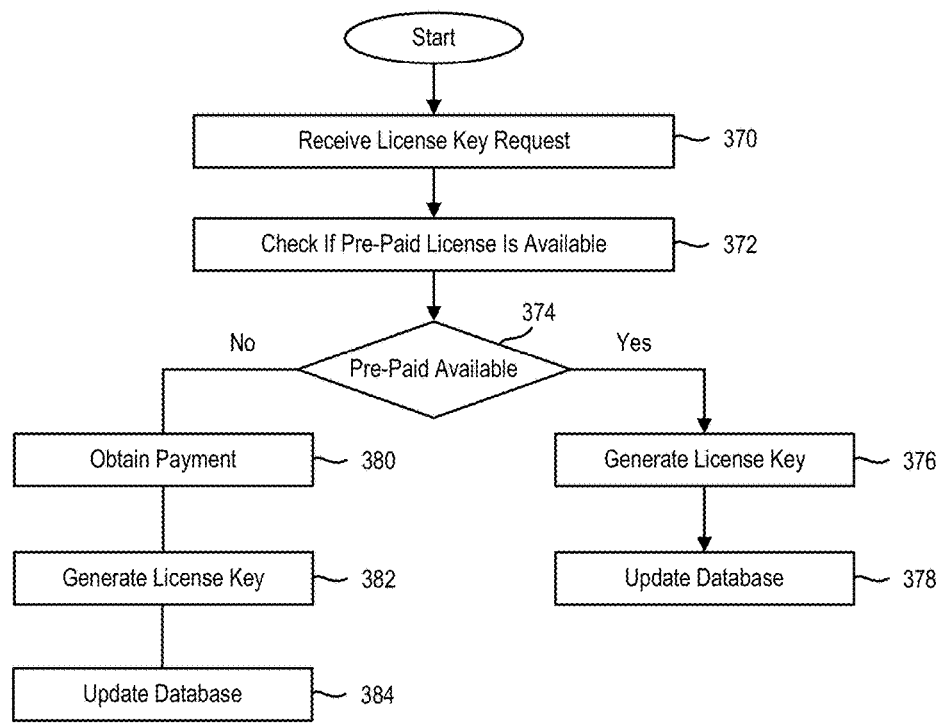
FIG. 6A depicts an exemplary operation of a license server.

FIG. 6A depicts an exemplary operation of a license server 21a, 21b. Step 370 represents receiving a license key request from the barcode-reading application 24 (or other application) of the mobile device 18. Receiving the license key request may include authenticating the user of the mobile device 18. Authenticating the user of the mobile device 18 may include: i) authenticating the individual to which the mobile device is assigned or the individual using the mobile device (or the individual who controls the mobile device), for example utilizing a combination of a user ID and a password or similar schemes for authenticating an individual, and/or ii) authenticating an organization, company, or other group of users to which the mobile device is assigned, for example utilizing a combination of a user ID and a password or other similar schemes for identifying whether the device has been assigned to the organization, company, or group and authenticating the assignment. The user ID may be unique to the device or common for all mobile devices 18 assigned to the organization, company, or group.

Step 372 represents the license server 21a, 21b checking whether a pre-paid license is available for the mobile device 18. More specifically, the identity of the individual, organization, company, or other group of users identified during the authentication may be used to look up (e.g., in a license database) licenses available to that individual, organization, company, or other group of users (if any). For a particular individual, organization, company, or other group of users, a certain quantity of licenses may have been pre-purchased.

Figure 6B:
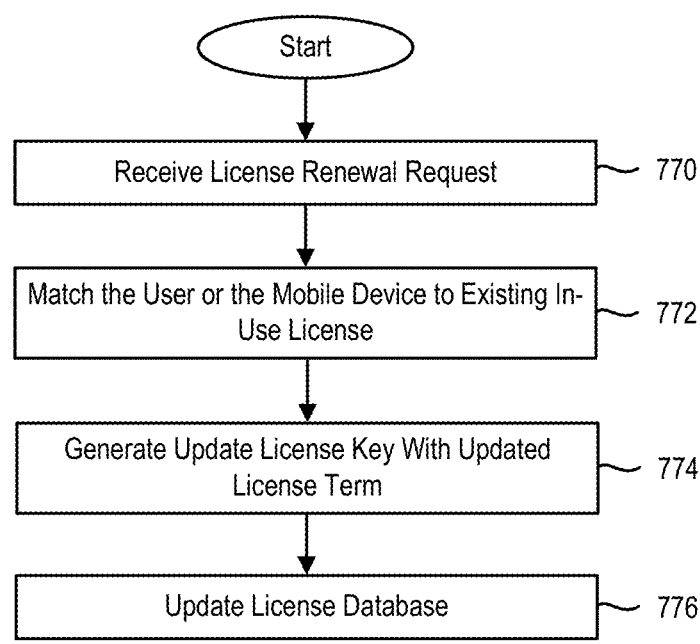
FIG. 6B depicts an exemplary operation of a license server for renewing a license for a mobile device prior to expiration of the license.
Figure 6C:
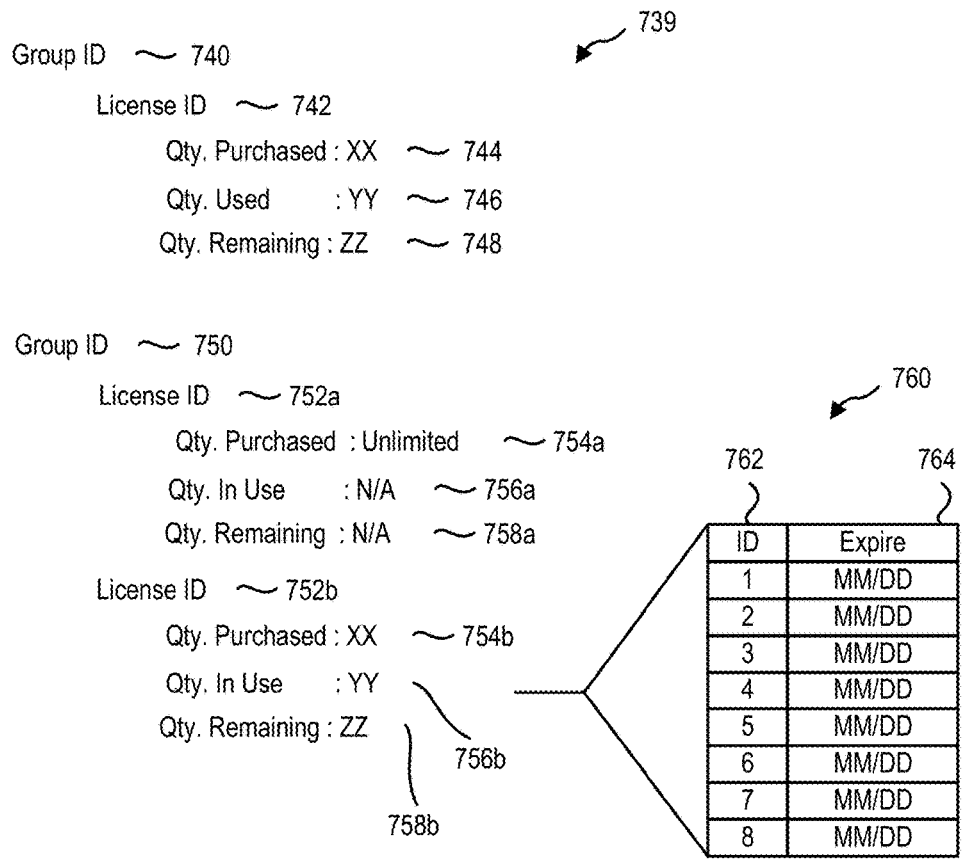
FIG. 6C depicts an exemplary database for recording pre-paid licenses that may have been purchased by an individual, organization, company or other group of users.

FIG. 6C depicts an exemplary database 739 for recording pre-paid licenses that may have been purchased by an individual, organization, company or other group of users. Each such individual, organization, company or other group of users may be identified by a group ID 740, 750. Associated with each group ID is one or more license IDs 742, 752a, 752b, each of which identifies a license type for the barcode-reading application 24 which may have been purchased in quantities of one or more. Each license type may be, as an example, one of the license types identified by the license keys 702, 704, 706 of FIG. 5.

Each license ID 742, 752a, 752b may be associated with identification of: i) the quantity of the license type purchased 744, 754a, 754b, ii) the quantity used 746 or the quantity in use 756a, 756b, and/or iii) the quantity remaining 748, 758a, 758b for issuance to mobile devices 18. It should be appreciated that recording both the quantity used 746 or the quantity in use 756a, 756b as well as the quantity remaining 748, 758a, 758b for issuance to mobile devices is duplicative as either value can be calculated from the quantity purchased 744, 754a, 754b and the other value.

Recording the quantity used 746 is useful when licenses are purchased for a single mobile device, and once a license is issued to a particular mobile device it is permanently associated with that mobile device and may not be re-assigned to another mobile device without manual intervention.

Recording the quantity in use 756a, 756b is useful when the licenses are concurrent-use licenses, and when a license assigned to a mobile device expires it is considered no longer in-use and can be reassigned to another mobile device 18.

It should also be appreciated that if the quantity of licenses purchased is unlimited 754a, it is irrelevant to track in-use licenses 756a, 756b and remaining licenses 758a, 758b. When utilizing the concurrent-use licenses, for the in-use licenses 756b, the database may include an in-use table 760 which records, for each license 762, the time 764 at which it expires (e.g., the lease term 710 from FIG. 5) such that upon expiration (if the expiration is not updated by way of renewal), the license will revert to remaining inventory 758b and can be issued to a different mobile device 18.

It should be appreciated that this licensing scheme enables a mobile device 18 to obtain a license for a specific term, and so long as the mobile device 18 obtains a renewal license prior to expiration, the barcode-reading application 24 can operate under the license even if the mobile device is (periodically) uncoupled from any network and unable to contact the license server 21a, 21b.

Returning to FIG. 6A, step 374 represents determining whether a pre-paid license is available. If a prepaid license is available at step 374, a license key for the pre-paid license is generated at step 376 and the database 739 is updated at step 378. Updating the database may include recording the license as used 746 or in use 756b.

If it is determined at step 374 that a pre-paid license is not available, payment is obtained for a license at step 380. Step 380 may involve determining the type of license being requested (e.g., as identified by license keys 702, 704, 706), including the licensed symbology(ies) as well as license term(s) and license quantity(ies) for each symbology(ies). In one embodiment, the barcode-reading application 24 may, under the control of the license server 21a, 21b, generate a menu for user selection of these license parameters (i.e., symbologies, license terms and license quantities) and display on a screen of the mobile device 18 pricing alternatives for desired license parameters.

After payment is obtained, a license key for the license is generated at step 382 and the database 739 is updated at step 384 to reflect a newly purchased license for a user (group ID). If the newly purchased license is a concurrent-use license, updating the database may include recording the license as well as its expiration.

As stated, this licensing scheme enables a mobile device 18 to obtain a license for a specific term, and so long as the mobile device 18 obtains a renewal license prior to expiration, the barcode-reading application 24 can continue operation under the license even if the mobile device 18 is uncoupled from any network and unable to contact the license server 21a, 21b.

FIG. 6B depicts an exemplary operation of a license server 21a, 21b for renewing a license for a mobile device 18 prior to the expiration of the license (e.g., prior to the in-use license 756b reverting to a remaining license 758b).

Step 770 represents receiving a license key renewal request from the barcode-reading application 24 (or other application) of the mobile device 18. Receiving the license key renewal request may include authenticating the user of the mobile device 18. Authenticating the user of the mobile device 18, as discussed, may include: i) authenticating the individual to which the mobile device is assigned, or the individual using the mobile device (or the individual who controls the mobile device), for example utilizing a combination of a user ID and a password, or similar schemes for authenticating an individual, and/or ii) authenticating an organization, company, or other group of users to which the mobile device is assigned, for example utilizing a combination of a user ID and a password or other similar schemes for identifying whether the device has been assigned to the organization, company, or group and authenticating the assignment. The user ID may be unique to the device or common for all mobile devices 18 assigned to the individual, organization, company, or group. The mobile device 18 (e.g., the barcode-reading application) may communicate to the licensing server i) a unique identification code of the mobile device 18 or ii) a user identification code identifying a controller of the mobile device 18.

Step 772 represents the license server 21*a*, 21*b* matching the user or the mobile device 18 to the existing in-use license, which may be recorded in an in-use table (for example, the in-use table 760 shown in FIG. 6C).

Step 774 represents generating, and providing to the mobile device 18, an update license key which, as depicted by license key 702 of FIG. 5, may include an updated license term.

Step 776 represents updating the license database such that the expiration date of the license in the in-use table 760 is updated.

Embodiments for a barcode-reading enhancement accessory are disclosed hereafter. As used herein, the terms "attachment" and "accessory" are used synonymously and interchangeably, and may refer to an apparatus attached, coupled, or secured to a mobile device. An attachment for a mobile device may include just a single component that improves the barcode-reading capabilities of the mobile device. Alternatively, an attachment may include multiple components that improve the barcode-reading capabilities of the mobile device. In addition, an attachment for a mobile device may provide additional functionality that is unrelated to improving the barcode-reading capabilities of the mobile device. In some embodiments, the attachment improves the ability of the mobile device to read a barcode utilizing the camera assembly and/or the flash/torch illumination system of the mobile device. In some embodiments, the attachment may include a supplemental camera system and/or one or more supplemental illumination systems which provide barcode-reading capability for the mobile device.

In accordance with some embodiments, a barcode-reading system for a mobile device may include a barcode-reading enhancement accessory secured to the mobile device, which will be explained in detail hereafter, and a barcode-reading application stored in a memory of the mobile device 18, which is disclosed above. The barcode-reading enhancement accessory may include at least one optic system that is positioned either within a field of illumination of a light source of the mobile device for modifying the field of illumination projected by the light source or within a field of view of a camera of the mobile device for modifying illumination reflected from objects within the field of view of the camera.

An attachment for a mobile device 18 may cover a relatively small portion of the mobile device. Alternatively, an attachment for a mobile device may be a protective case that covers a substantial portion of the mobile device. Attachments may be designed for attachment to mobile devices in a wide variety of ways, including but not limited to a corner-positioned attachment, an encapsulating attachment, and a mounting attachment. These attachment modes will be explained in detail below.

Figure 7:
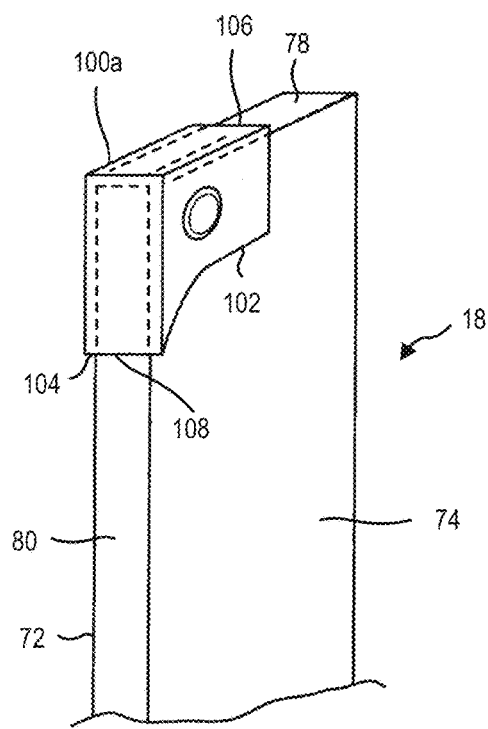
FIGS. 7 and 8 illustrate an exemplary corner-positioned attachment useful in a barcode-reading enhancement system.
Figure 8:
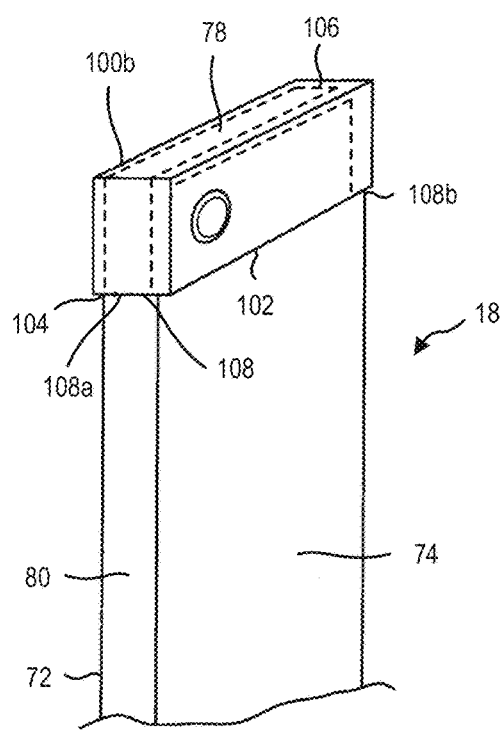

FIGS. 7 and 8 depict examples of a corner-positioned attachment that covers a relatively small portion of the mobile device 18. A corner-positioned attachment may cover one or more (but not all) corners of a mobile device.

The corner-positioned attachment 100*a* shown in FIG. 7 secures to, and covers, a single corner of a mobile device 18. More specifically, the corner-positioned attachment 100*a* may have an interior back surface 102, an interior front surface 104, an interior top surface 106, and an interior side surface 108. When installed on the corner of the mobile device 18: i) the interior back surface 102 faces, and abuts, the back surface 74 of the mobile device 18; ii) the interior front surface 104 faces, and abuts, the face surface 73 of the mobile device 18; iii) the interior top surface 106 faces, and abuts, the top edge 78 of the mobile device 18; and iv) the interior side surface 108 faces, and abuts, the right edge 80 of the mobile device 18. The distance between the interior back surface 102 and the interior front surface 104 may be sufficiently large to permit the corner-positioned attachment 100*a* to be inserted onto the corner of the mobile device 18 without excessive difficulty, but also small enough that, once installed, the corner-positioned attachment 100*a* will not slide free of the mobile device 18 due to friction fit between: i) the interior back surface 102 and the back surface 74; and ii) the interior front surface 104 and the face surface 73. Because the corner-positioned attachment 100*a* covers a single corner of the mobile device 18, the attachment 100*a* may be installed on the mobile device 18 by sliding the attachment 100*a* along the top edge 78 (e.g. the interior top surface 106 in contact with the top edge 78) until the interior side surface 108 abuts the right edge 80 of the mobile device. FIG. 7 shows, as an example, a corner-positioned attachment covering the right top corner of the mobile device 18. However, the corner-positioned attachment may cover the left top corner or any other corner of the mobile device 18.

The corner-positioned attachment 100*b* secures to, and covers, two top corners of the mobile device 18 as well as the entire top edge 78. More specifically, the corner-positioned attachment 100*b* may have an interior back surface 102, an interior front surface 104, an interior top surface 106, and two interior side surfaces 108*a* and 108*b*. When installed on the corner of the mobile device 18: i) the interior back surface 102 faces, and abuts, the back surface 74 of the mobile device 18; ii) the interior front surface 104 faces, and abuts, the face surface 73 of the mobile device 18; iii) the interior top surface 106 faces, and abuts, the top edge 78 of the mobile device 18; and iv) the interior side surfaces 108*a* and 108*b* face, and abut, the right edge 80 and the left edge 82 of the mobile device 18, respectively.

The distance between the interior back surface 102 and the interior front surface 104 may be sufficiently large to permit the corner-positioned attachment 100*a* to be inserted onto the corner of the mobile device 18 without excessive difficulty, but also small enough that, once installed, the corner-positioned attachment 100*b* will not slide free of the mobile device 18 due to friction fit between: i) the interior back surface 102 and the back surface 74, and ii) the interior front surface 104 and the face surface 73.

Additionally, or alternatively, the distance between the interior side surface 108*a* and the interior side surface 108*b* may be sufficiently large to permit the corner-positioned attachment 100*b* to be inserted onto the corner of the mobile device 18 without excessive difficulty, but also small enough that, once installed, the corner-positioned attachment 100*b* will not slide free of the mobile device 18 due to friction fit between: i) the interior side surface 108a and the right edge 80, and ii) the interior side surface 108b and the left edge 82.

Because the corner-positioned attachment 100b covers two corners of the mobile device 18, the attachment 100b may be installed on the mobile device 18 by sliding the attachment 100b along each of the left edge 82 and the right edge 80 (e.g. the interior side surface 108a in contact with the right edge 80, the interior side surface 108b in contact with the left edge 82, the interior back surface 102 in contact with the back surface 74, and the interior front surface 104 in contact with the face surface 73) until the interior top surface 106 abuts the top edge 78 of the mobile device 18.

With respect to either attachment 100a or 100b (or any type of corner-positioned attachment), as an alternative to frictional engagement between the attachment 100a, 100b and the mobile device 18, the attachment 100a, 100b may be secured to the mobile device 18 through the use of various other attachment methods. Such attachment methods include, but are not limited to, mechanical fasteners, adhesives, and the like.

Encapsulating attachments may cover substantially the entirety of the back surface 74 of the mobile device 18 and may further cover substantially the entirety of one or more of the edges 76, 78, 80, and 82 of the mobile device 18. An encapsulating attachment i) may cover a perimeter edge of the face surface 73 (but does not cover the central portion of the face surface 73) or ii) may cover substantially the entire face surface 73 but include a transparent central portion, in each case to enable viewing of, and access to, the display screen 66 and touch panel of the mobile device 18. An encapsulating attachment may further exclude covering interface elements of the mobile device 18, such as buttons, electrical interfaces, infrared interfaces, and the like.

Figure 9A:
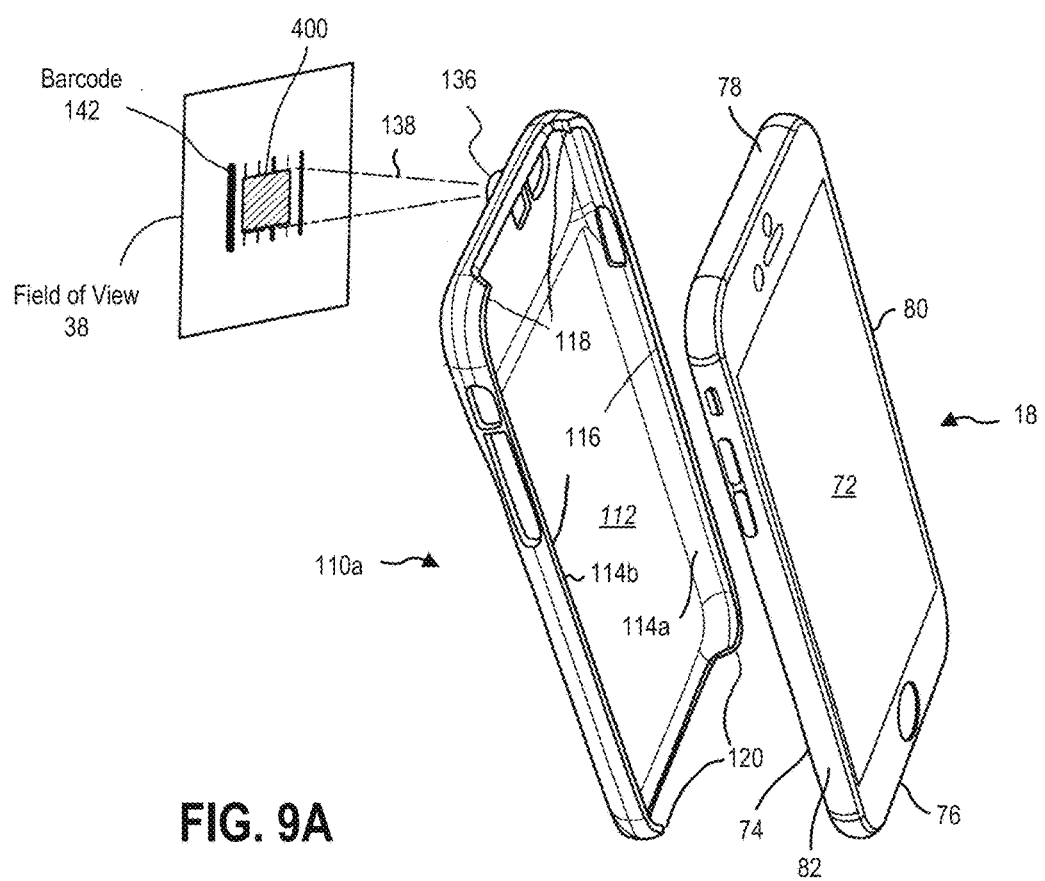
FIGS. 9A and 9B illustrate an exemplary encapsulating attachment useful in a barcode-reading enhancement system.

FIG. 9A depicts an exemplary encapsulating attachment 110a which covers substantially the entire back surface 74 and each of the right edge 80 and the left edge 82 of the mobile device 18 while covering portions of the top edge 78 and the bottom edge 76 near the right edge 80 and left edge 82 (e.g. the corners of the mobile device 18).

In more detail, the encapsulating attachment 110a may include: i) an interior back surface 112 which faces, and abuts, the back surface 74 of the mobile device 18; ii) interior side surfaces 114a and 114b which face, and abut, the right edge 80 and the left edge 82 of the mobile device 18, respectively; iii) an interior top surface 118 which faces, and abuts, the top edge 78 of the mobile device 18 (at the corners); and iv) an interior bottom surface 120 which faces, and abuts, the bottom edge 76 of the mobile device 18 (at the corners). The encapsulating attachment 110a may also include an interior side surface 116 which faces, and abuts, at least a portion of the periphery of the face surface 73 of the mobile device 18.

For installation of the encapsulating attachment 110a onto the mobile device 18, the walls of the encapsulating attachment 110a forming the interior side surfaces 114a and 114b may be sufficiently flexible such that, with pressure, the walls separate as the mobile device 18 is pressed towards the interior back surface 112, and the portions of the walls which form the interior side surface 116 pass along the right edge 80 and the left edge 82 of the mobile device 18, and come to rest abutting the periphery of the face surface 73 when the back surface 74 is in contact with the interior back surface 112.

The encapsulating attachment 110a, or more specifically a back side forming the interior back surface 112, may further include a camera aperture through which the camera assembly (not shown) of the mobile device 18 has the camera field of view 38 to the back surface 74 of the mobile device 18.

Figure 9B:
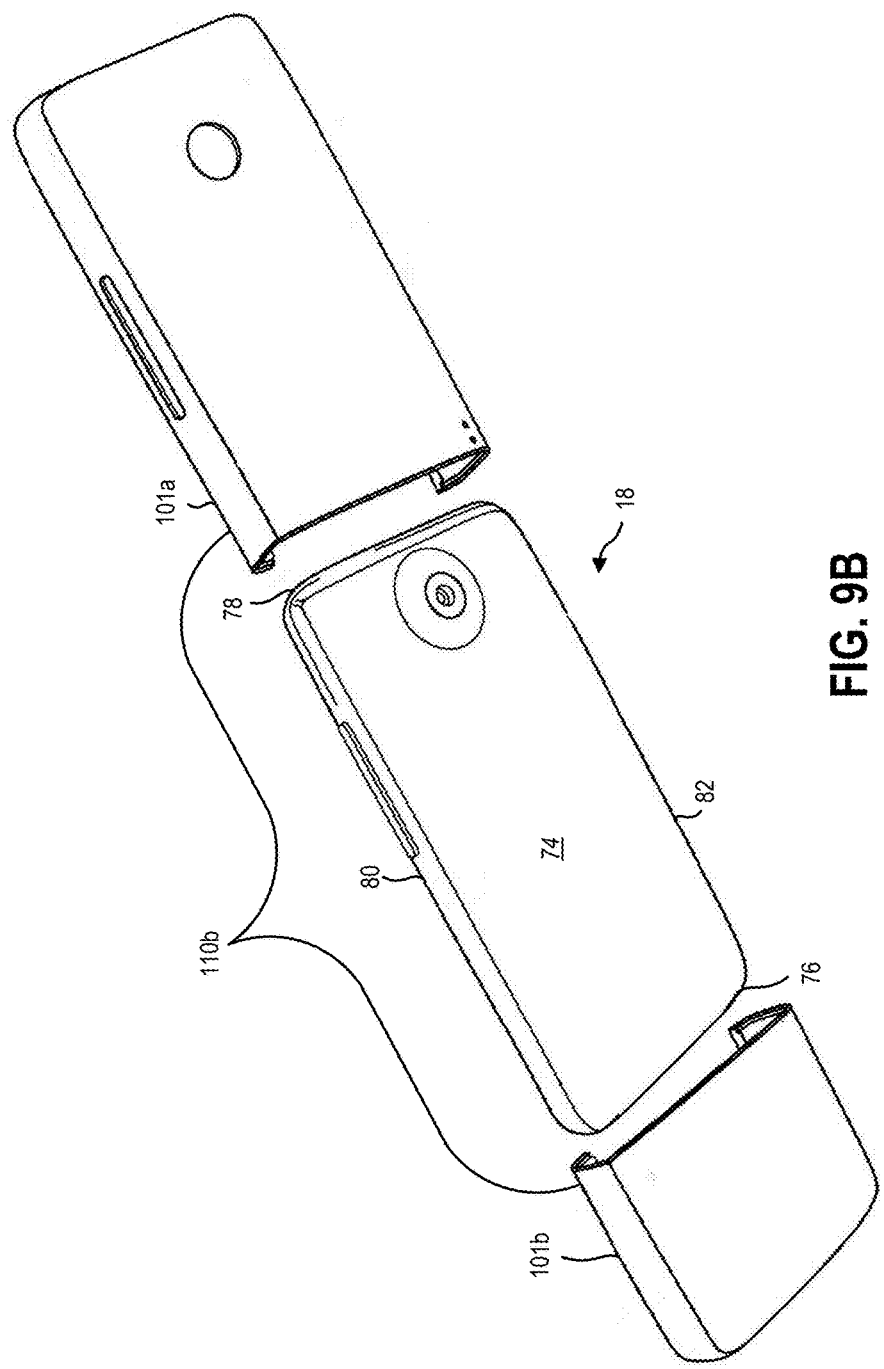

FIG. 9B depicts another example of an encapsulating attachment 100b. The encapsulating attachment 100b comprises a top corner-positioned attachment 101a (similar to 100b) which covers the top two corners of the mobile device 18 and a bottom corner-positioned attachment 101b which covers the bottom two corners of mobile device 18. The two corner-positioned attachments 101a and 101b, when installed, mate to encapsulate the mobile device 18. It should be appreciated that the interior front surface of each of the attachments 110b (e.g. each of the mating top and bottom corner-positioned attachments) covers a small portion of the periphery of the face surface 73 of the mobile device 18 such that an operator may access the display screen 66 and the touch panel when the mobile device 18 is encapsulated within the attachment 110b.

It should be appreciated that the encapsulating attachments 110a and 110b shown in FIGS. 9A and 9B are examples of encapsulating attachments, and the encapsulating attachments may be in any form or type.

Mounted attachments generally are attachments that are secured to one face and/or one edge of a mobile device 18. Mounted attachments may not cover any corner of the mobile device, and may not encapsulate the mobile device 18.

Figure 10A:
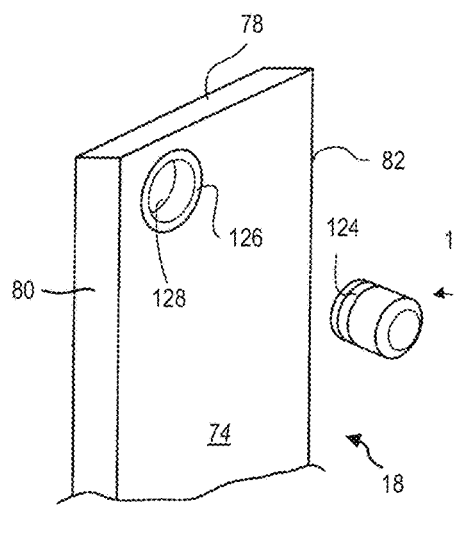
FIGS. 10A and 10B illustrate exemplary mounted attachments useful in a barcode-reading enhancement system.
Figure 10B:
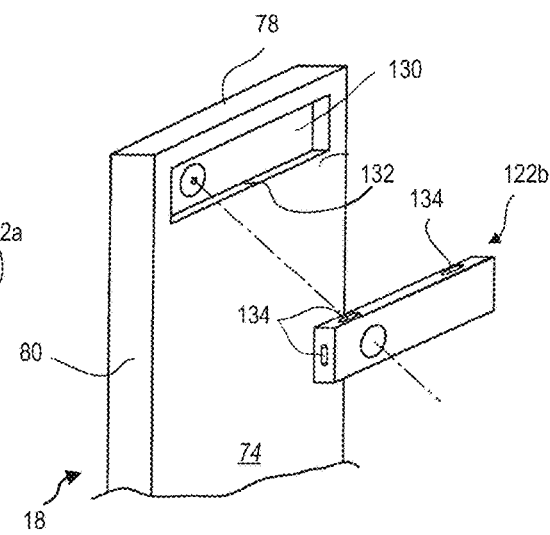

FIGS. 10A and 10B depict exemplary mounted attachments 122a, 122b which are secured to the back surface 74 of the mobile device 18. In FIG. 10A, the mounted attachment 122a may be a barrel shape and include a cylindrical male engagement surface 124 which inserts into a cylindrical recess 126 within the back surface 74 of the mobile device 18 and engages a periphery engagement surface 128 of the cylindrical recess 126 for mounting. The engagement between the engagement surface 124 and the engagement surface 128 may be, for example, by threading, bayonet fitting, or any other mounting structure which may utilize rotational movement between the mounted attachment 122a and the mobile device 18 for securing the mounted attachment 122a to, and releasing the mounted attachment 122a from, the mobile device 18.

In FIG. 10B the mounted attachment 122b may be a non-cylindrical shape and may be secured into a recess 130 within the back surface 74 of the mobile device 18. The recess 130 may be of the same shape as the mounted attachment 122b and may include an engagement lip or cavity 132 around at least a portion of the periphery of the recess 130 such that engagement clips 134 around the periphery of the mounted attachment 122b may secure the mounted attachment 122b within the recess 130.

In addition to the foregoing examples of corner-mounted attachments, encapsulating attachments, and mounted attachments, the barcode-reading enhancement systems and other features embodied in, or related to, attachments as described herein may utilize any (or multiple) attachment structure or means for attaching to the corresponding mobile device including, but not limited to: i) for attachments that cover some portion of the mobile device from two or more sides (e.g. corner-positioned attachments and encapsulating attachments), use of a frictional interface such as a modest interference fit between the interior dimension of the attachment and the exterior dimension of the portion of the mobile device that receives the attachment; ii) for encapsulating attachments, a wide variety of attachment features in known examples of cases, covers, and other protectors for mobile devices; and iii) for attachments that are attached to only one side of the mobile device attachment, features such as threaded fasteners, adhesives, snap-in interfaces, and the like.

Figure 11:
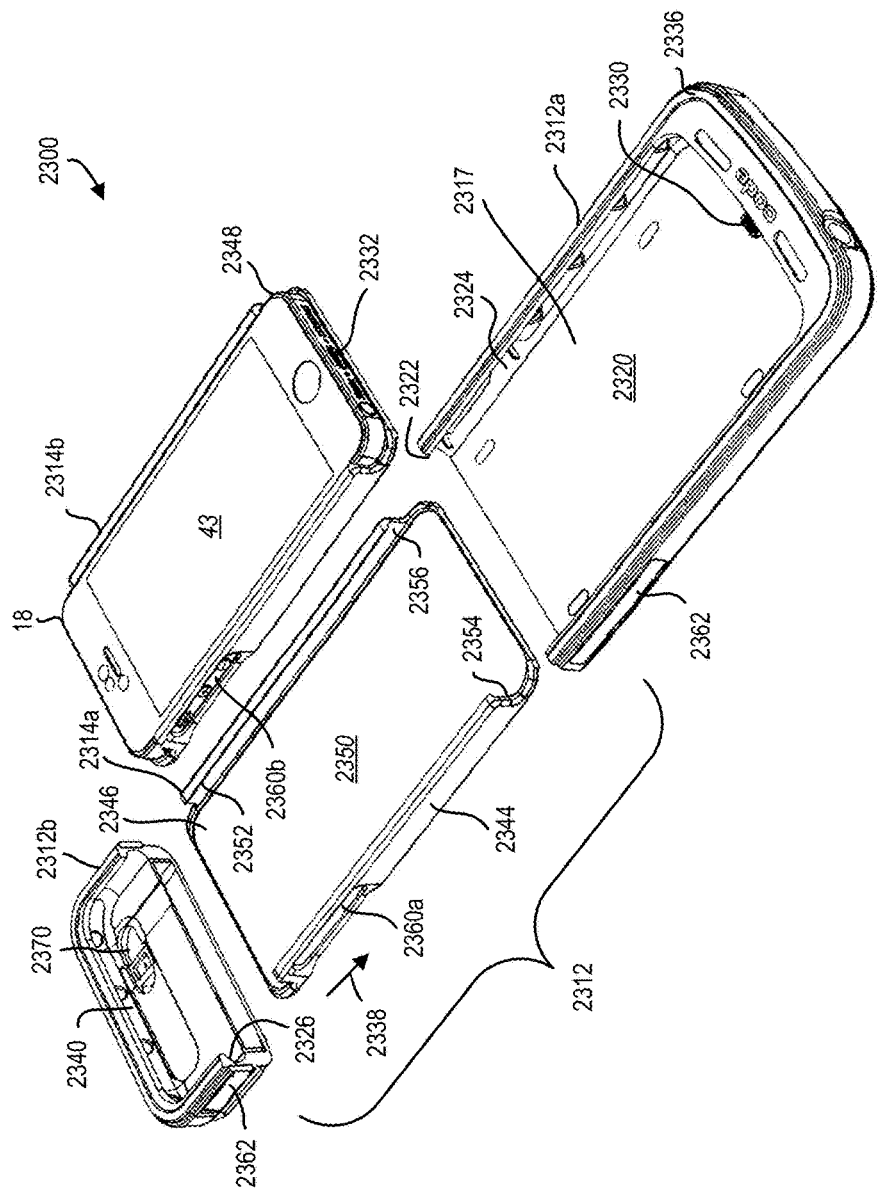
FIG. 11 is an exploded view of an exemplary barcode-reading enhancement accessory configured as an encapsulating attachment.

FIG. 11 is an exploded view of an exemplary barcode-reading enhancement accessory 2300 configured as an encapsulating attachment. The barcode-reading enhancement accessory 2300 may comprise an outer case 2312 and one or more inner carriages 2314a, 2314b. FIG. 11 depicts two inner carriages 2314a, 2314b as an example. However, the accessory 2300 may include just one inner carriage or more than two inner carriages. The accessory 2300 may further include an impact-absorbing cover 2336 positioned over, or molded over, at least a portion of the outer case 2312 to protect a mobile device 18 encased therein.

The outer case 2312 may comprise a cavity 2317 into which each one of the inner carriages 2314a, 2314b may be inserted. One inner carriage 2314a, 2314b may be accommodated in the outer case 2312 at one time. The cavity 2317 may be defined by the interior surfaces of the outer case 2312. More specifically, the cavity 2317 may be defined by a back side interior surface 2320, a face interior surface 2322 which is generally parallel to the back side interior surface 2320, a top edge interior surface 2340, a bottom edge interior surface (not shown in FIG. 11), which is opposite, and parallel, to the top edge interior surface 2340, a left edge interior surface 2326, and a right edge interior surface 2324, which is opposite, and parallel, to the left edge interior surface 2326. Each of the top edge interior surface 2340, the bottom edge interior surface, the left edge interior surface 2326, and the right edge interior surface 2324 may be generally planar and extend between the back side interior surface 2320 and the face interior surface 2322, and define a perimeter of each of the back side interior surface 2320 and the face interior surface 2322. The top edge interior surface 2340 and the bottom edge interior surface may each be orthogonal to each of the left edge interior surface 2326 and the right edge interior surface 2324. The face interior surface 2322 may include an aperture through which a display screen 43 of a mobile device 18 may be viewed and as such the face interior surface 2322 may be a thin band which extends around the periphery defined by the top edge interior surface 2340, the bottom edge interior surface, the left edge interior surface 2326, and the right edge interior surface 2324.

The outer case 2312 may be open to enable the inner carriage 2314a, 2314b to be inserted into, and removed from, the outer case 2312. For example, as shown in FIG. 11, the outer case 2312 may comprise two mating parts 2312a, 2312b, which can be secured to each other to form the outer case 2312. The two mating parts 2312a, 2312b may be secured to each other, for example, by sliding one mating part 2312b in a mating direction 2338 towards the other mating part 2312a until the two mating parts 2312a, 2312b are secured by a latching (fastening or clamping) mechanism. The latching mechanism may be provided on the side walls or a back side surface of the outer case 2312. Any conventional latching, fastening, or clamping mechanism may be employed to secure the two mating parts 2312a, 2312b. Similarly the outer case 2312 may be opened by releasing the latching mechanism and sliding the two mating parts 2312a, 2312b apart.

Figure 18:
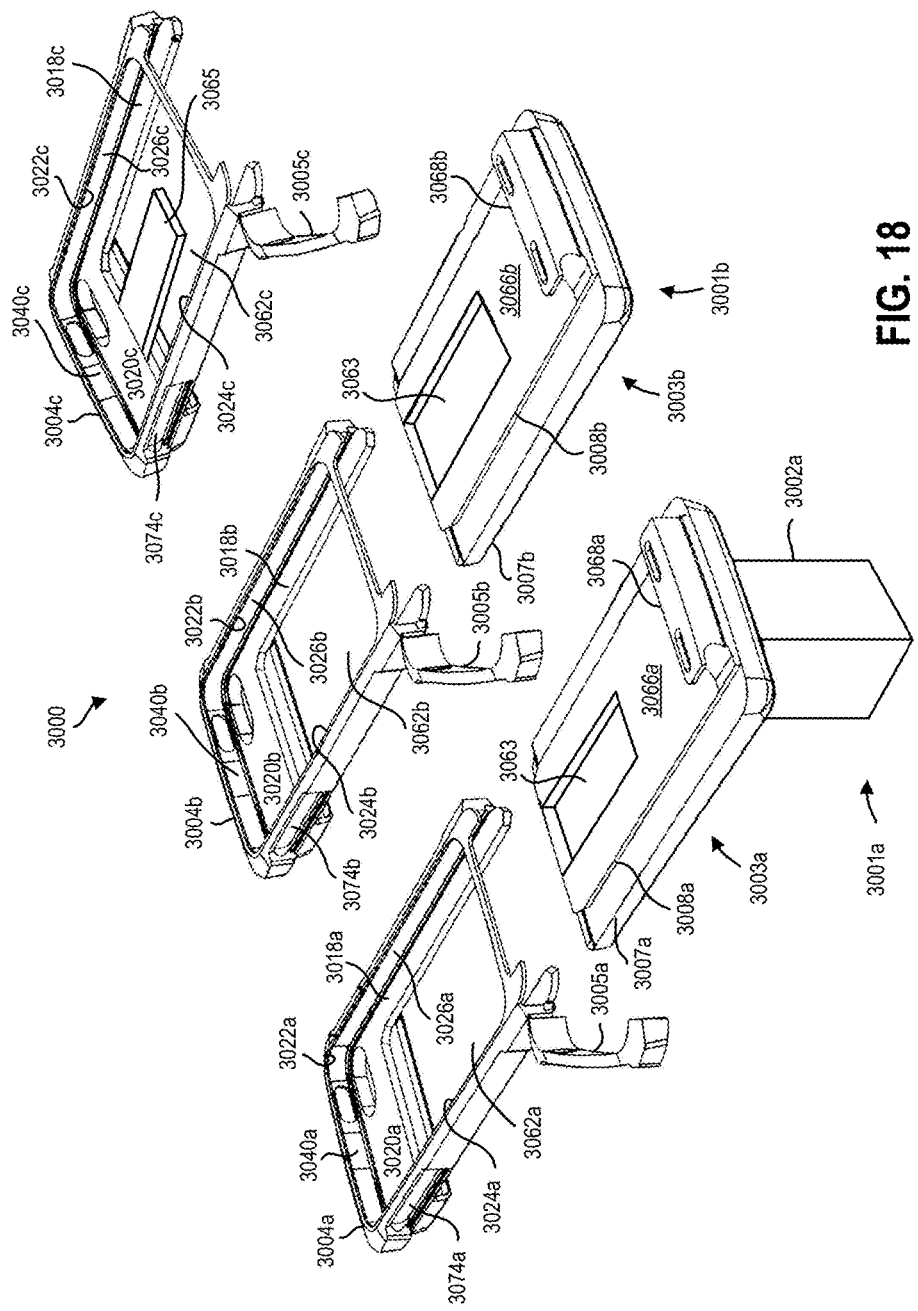
FIG. 18 shows another exemplary barcode-reading enhancement accessory configured as an encapsulating attachment in accordance with another embodiment.
Figure 19:
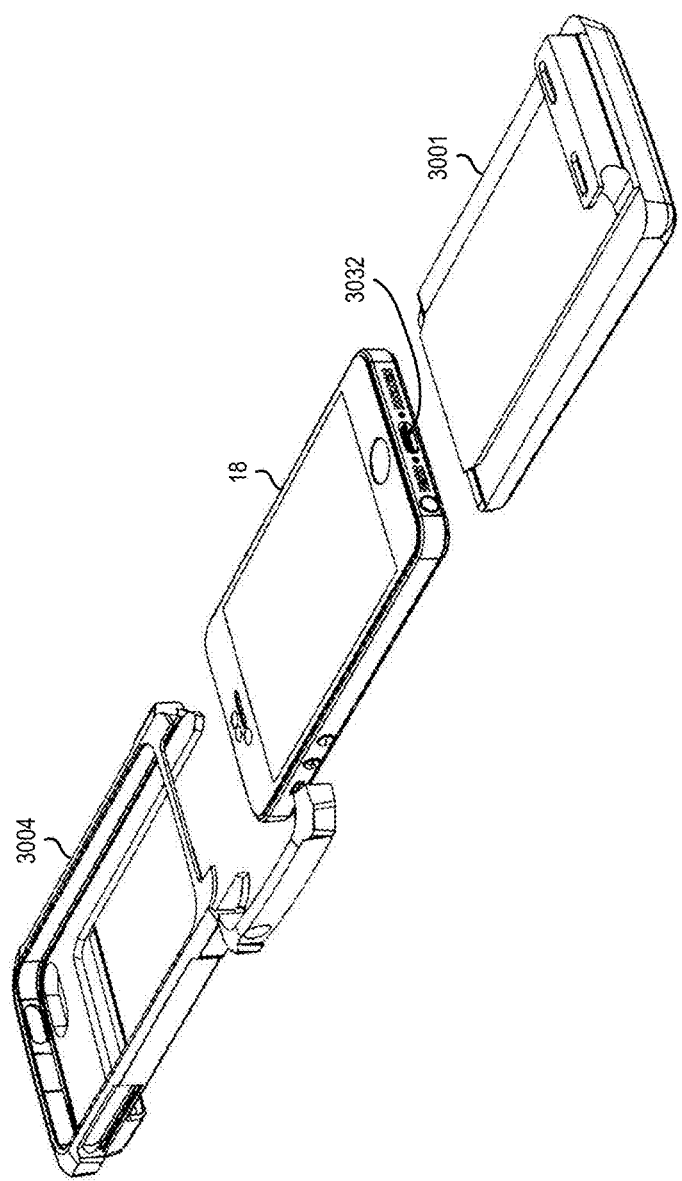
FIG. 19 depicts a case and a platform of another exemplary barcode-reading enhancement accessory along with a mobile device.
Figure 20:
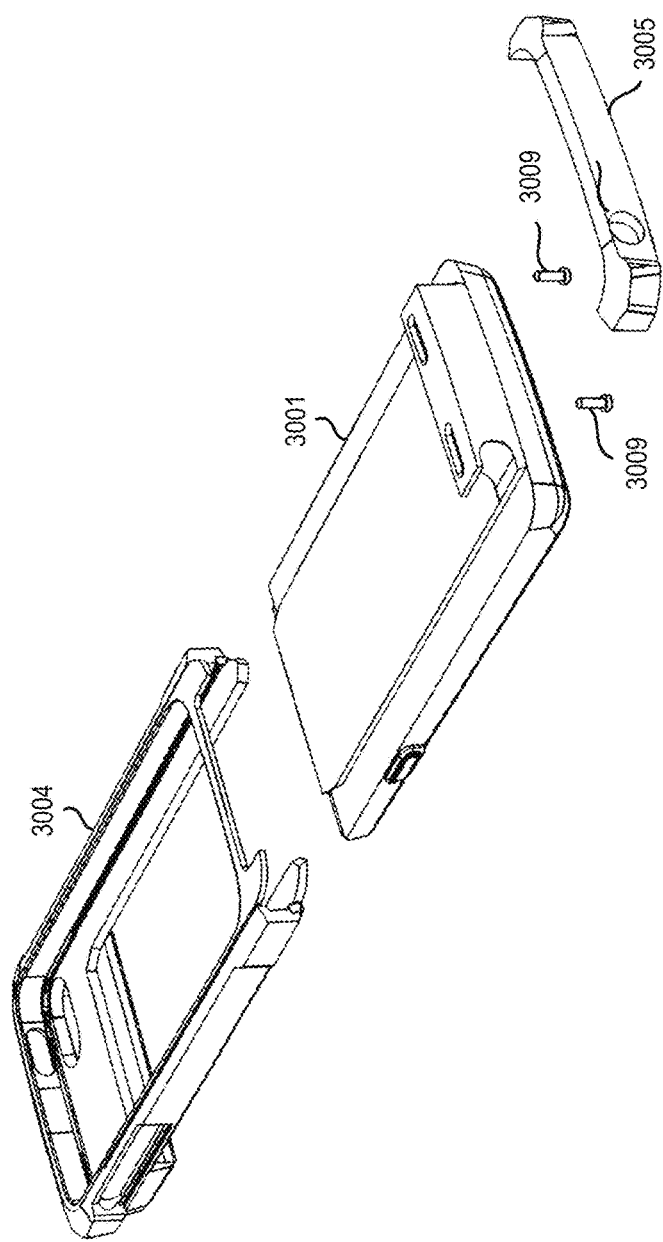
FIG. 20 shows an exemplary barcode-reading enhancement accessory with a different latching mechanism.

Alternatively, the two mating parts may be connected together by a hinge at one corner of the outer case 2312 and may be secured at the other corner by a latching mechanism, similar to the embodiment shown in FIGS. 18 and 19, or may be connected by screws or pins, similar to the embodiment shown in FIG. 20. Alternatively, the outer case 2312 may be a one-piece component and the combination of the inner carriage 2314a, 2314b and the mobile device 18 may be simply pushed into the cavity of the outer case 2312.

Each inner carriage 2314a, 2314b may include a cavity 2346 to accommodate a mobile device 18 therein. FIG. 11 shows the inner carriage 2314b with a mobile device 18 accommodated therein. Each inner carriage 2314a, 2314b may accommodate a particular size or model of a mobile device 18 for which each inner carriage 2314a, 2314b is designed.

The cavity 2346 of the inner carriage 2314a, 2314b may be defined by the interior surfaces of the inner carriage 2314a, 2314b. For example, the cavity 2346 of the inner carriage 2314a, 2314b may be defined by a back side interior surface 2350, a face interior surface 2352 (if present), which is generally parallel to the back side interior surface 2350, and i) a left edge interior surface 2354 and a right edge interior surface 2356, which is opposite, and parallel, to the left edge interior surface 2354, and/or ii) a top edge interior surface (not depicted in FIG. 11) and a bottom edge interior surface (not depicted in FIG. 11). FIG. 11 shows the inner carriage 2314a, 2314b having a left edge interior surface 2354 and a right edge interior surface 2356. However, it should be noted that the inner carriage 2314a, 2314b may have all four edge interior surfaces or may only have a top edge interior surface and a bottom edge interior surface.

Each of the top edge interior surface (if present), the bottom edge interior surface (if present), the left edge interior surface 2354 (if present), and the right edge interior surface 2356 (if present) may be generally planar and extend between the back side interior surface 2350 (and the face interior surface 2352 if present), and define a perimeter of each of the back side interior surface 2350 and the face interior surface 2352. The top edge interior surface (if present) and the bottom edge interior surface (if present) may each be orthogonal to each of the left edge interior surface 2354 and the right edge interior surface 2356. The face interior surface 2352 (if present) may include an aperture (or otherwise be open) through which a display screen 43 of a mobile device 18 may be viewed and as such the face interior surface may be a thin band which extends around along each of the left edge interior surface 2354 and right edge interior surface 2356.

At least a portion of the interior surface of the inner carriage 2314a, 2314b conforms to at least a portion of an exterior surface 2348 of a mobile device 18 for which the inner carriage 2314a, 2314b is designed. Each inner carriage 2314a, 2314b may have dimensions of its interior surface different from other inner carriages 2314a, 2314b. Each inner carriage 2314a, 2314b has its interior dimensions sized to fit the exterior dimensions of a mobile device 18 of a different size or model such that a mobile device 18 of a different size or model may be accommodated in the outer case 2312 using a corresponding inner carriage 2314a, 2314b designed for the mobile device 18.

At least a portion of the exterior surface 2344 of the inner carriage 2314a, 2314b conforms to at least a portion of one or more of the interior surfaces of the outer case 2312. The inner carriage 2314a, 2314b, when inserted into the cavity 2317, may be secured in position without room for movement in at least one of the directions: i) between the top edge interior surface 2340 and the bottom edge interior surface; ii) between the left edge interior surface 2326 and the right edge interior surface 2324; and iii) between the back side interior surface 2320 and the face interior surface 2322. In directions where the fit between portions of the exterior surface 2344 of the inner carriage 2314a, 2314b and the interior surfaces of the outer case 2312 may not fully secure the inner carriage 2314a, 2314b from movement, when a mobile device 18 is inserted into the inner carriage 2314a, 2314b and the combination is inserted into the cavity 2317, the combined exterior dimensions of the inner carriage 2314a, 2314b and the mobile device 18 may secure the inner carriage 2314a, 2314b from movement in at least one of the directions: i) between the top edge interior surface 2340 and the bottom edge interior surface; ii) between the left edge interior surface 2326 and the right edge interior surface 2324; and iii) between the back side interior surface 2320 and the face interior surface 2322.

The mobile device 18 is accommodated within the inner carriage 2314a, 2314b and the combination of the inner carriage 2314a, 2314b and the mobile device 18 is inserted into the cavity 2317 of the outer case 2312. The combined exterior dimensions of the inner carriage 2314a, 2314b and the mobile device 18 may fit the interior dimension of the cavity 2317 so that the combination of the inner carriage 2314a, 2314b and the mobile device 18 is secured from movement in all of directions: i) between the top edge interior surface 2340 and the bottom edge interior surface; ii) between the left edge interior surface 2326 and the right edge interior surface 2324; and iii) between the back side interior surface 2320 and the face interior surface 2322. When so secured, the position at which the mobile device 18 is positioned with respect to the outer case 2312 is referenced to as the "operating position."

The accessory 2300 also includes an optic system 2370. The optic system 2370 is secured to the outer case 2312 and is configured to fold an optical path (extending to the back side of the mobile device 18 to a direction extending into the area beyond the top edge of the mobile device 18) of at least one of a field of illumination of a light source of the mobile device 18 or a field of view of a camera of the mobile device 18 when the mobile device 18 is accommodated in the outer case 2312 using the inner carriage 2314a, 2314b.

When the mobile device 18 is in the operating position, the optic system 2370 of the accessory 2300 may be within at least one of the field of illumination of the white light source of the mobile device 18 and/or the field of view of the camera of the mobile device 18. The dimensions of the inner carriage 2314a, 2314b are selected so that the mobile device 18 is positioned within the cavity 2317 of the outer case 2312 so that the optic system 2370 is within at least one of the field of illumination of the white light source of the mobile device 18 and/or the field of view of the camera of the mobile device 18.

The optic system 2370 may include, or be configured similarly to, any of the optic systems, or components thereof, described with respect to FIGS. 27A, 27B, 27C, 27D, 30A, 30B, 30C, and 30D.

The outer case 2312 may include a connector 2330 on the interior surface (e.g., on the bottom interior surface of the outer case 2312) for connection to the mating connector 2332 of the mobile device 18 when the mobile device is secured in the outer case 2312. The outer case 2312 may include a trigger switch (not shown) for an operator to trigger capturing of a barcode with the mobile device 18. A trigger circuit included in the outer case 2312 may send a trigger signal to the mobile device via the connector 2330 as described herein.

When the mobile device 18 is in the operating position, the connector 2330 within the interior of the outer case 2312 is aligned both vertically and horizontally with the mating connector 2332 on the mobile device 18. The dimensions and shape of the inner carriage 2314a, 2314b are selected so that when the combination of the inner carriage 2314a, 2314b and the mobile device 18 is secured in the outer case 2312, the connector 2330 in the outer case 2312 is aligned both vertically and horizontally with the mating connector 2332 on the mobile device 18.

Figure 12A:
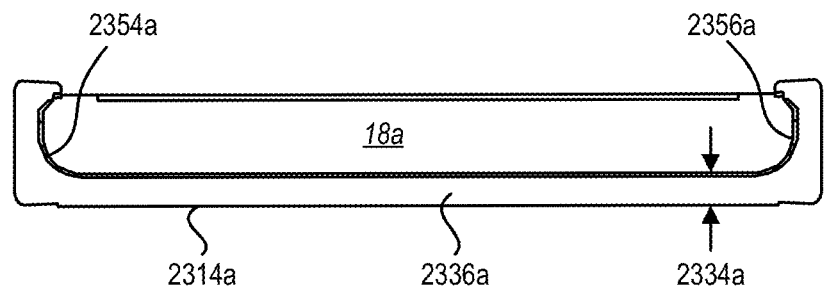
FIGS. 12A and 12B are sectional views of the case encasing a mobile device.
Figure 12B:
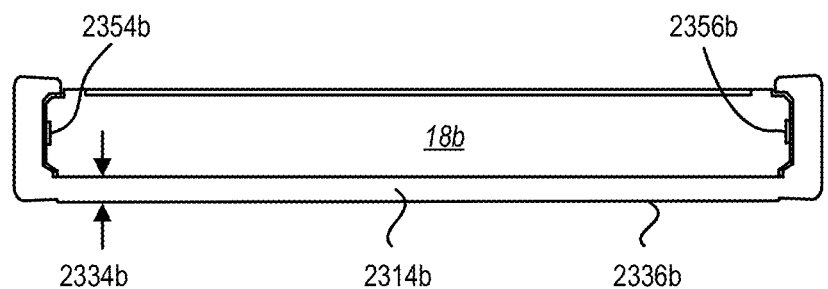

FIGS. 12A and 12B are sectional views of exemplary inner carriages 2314a, 2314b with a mobile device 18 inserted therein. The dimensions including the thickness 2334a, 2334b of the back panel 2336a, 2336b of each inner carriage 2314a, 2314b and the shape of the internal surfaces of each inner carriage 2314a, 2314b are selected for a particular model or size of a mobile device 18a, 18b, respectively, so that when the combination of the mobile device 18a, 18b and the corresponding inner carriage 2314a, 2314b is inserted into the outer case 2312, the connector 2330 in the outer case 2312 and the mating connector 2332 on the mobile device 18 are aligned.

Each inner carriage 2314a, 2314b may include one or more apertures 2360a, 2360b within one or more of its walls to expose control buttons or switches on the mobile device 18 when the mobile device 18 is inserted into the inner carriage 2314a, 2314b. Each inner carriage 2314a, 2314b is designed for a mobile device 18 of a particular model or size so that each aperture 2360a, 2360b is positioned for the control buttons or switches on the mobile device 18 of a particular model or size for which the inner carriage 2314a, 2314b is designed. Alternatively, instead of the aperture(s) 2360a, 2360b, a flexible button or switch may be formed in the corresponding position in the wall(s) of the inner carriage 2314a, 2314b so that the control buttons or switches on the mobile device 18 may be operated through the flexible button or switch formed in the wall(s) of the inner carriage 2314a, 2314b.

The outer case 2312 may include one or more apertures 2362 in one or more of its walls in a location(s) corresponding to the aperture 2360a, 2360b in the inner carriage 2314a, 2314b. The aperture(s) 2362 may include a superset of the apertures 2360a, 2360b of some or all of inner carriages 2314a, 2314b that the outer case 2312 may accommodate. Stated another way, since the outer case 2312 may accommodate a number of different inner carriages 2314a, 2314b designed for different mobile devices, an aperture 2362 may be formed within the wall(s) of the outer case 2312 to cover apertures 2360a, 2360b of some or all of the inner carriages 2314a, 2314b that may be inserted into the outer case 2312. As such, the control buttons or switches of each mobile device 18 may be accessed through the aperture 2360a, 2360b in the inner carriage 2314a, 2314b and the aperture 2362 in the outer case 2312. The aperture 2362 in the outer case 2312 may be larger than the aperture 2360a, 2360b in the inner carriage 2314a, 2314b. Alternatively, instead of aperture(s) 2362, a flexible button(s) or switch(es) may be formed in the wall(s) of the outer case 2312 so that the control buttons or switches on the mobile device may be operated through the flexible buttons or switches.

Figure 13:
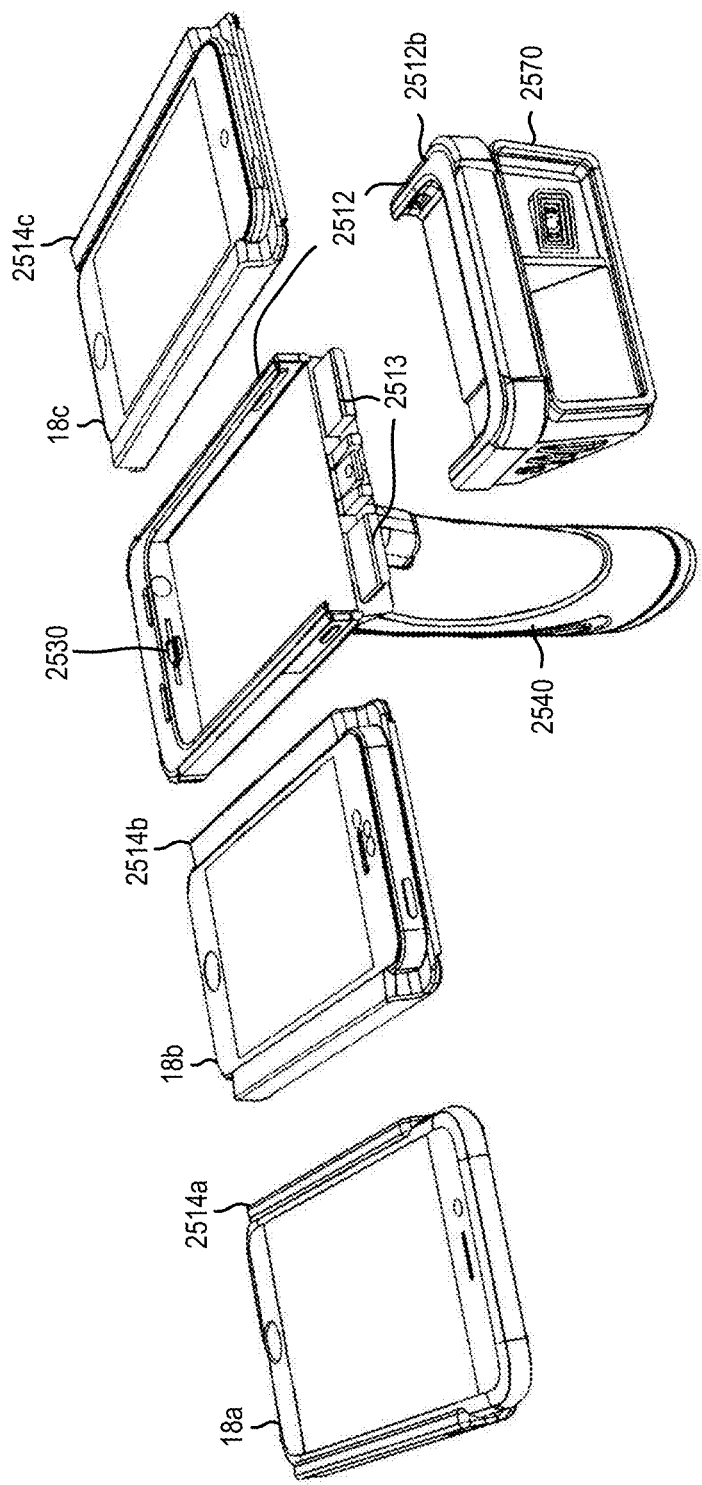
FIG. 13 shows an exemplary outer case and exemplary inner carriages that may be accommodated in the outer case.

FIG. 13 shows an exemplary outer case 2512 and exemplary inner carriages 2514a-2514c with structural components similar to those described with respect to FIG. 11. The outer case 2512 may comprise two mating parts 2512a, 2512b that are combined to form the outer case 2512. For example, one of the mating parts 2512a, 2512b may include a tongue(s) 2513 and the other may include a groove (not shown) for connecting the two mating parts 2512a, 2512b. Alternatively, any other connecting and locking mechanism may be employed to combine the two mating parts 2512a, 2512b.

Each inner carriage 2514a-2514c is designed for accommodating a mobile device 18a-18c of a different model or size. Each combination of an inner carriage 2514a-2514c and a mobile device 18a-18c is inserted into the cavity of the outer case 2512. The outer case 2512 includes a connector 2530 for connecting with a mating connector on the mobile device 18a-18c.

A handle 2540 may be attached to, or be a part of, the outer case 2512. The handle 2540 may be attachable and detachable. The handle 2540 extends downward away from the back exterior surface of the outer case 2512 and is sized and shaped to be gripped by an operator with the operator's hand. When held by the operator, the face surface of the mobile device 18a-18c is visible to the operator looking downward. The handle 2540 may have a trigger switch to enable the operator to initiate reading of a barcode with the mobile device 18a-18c. The trigger switch activates a trigger circuit in the handle 2540 which sends a trigger signal to the mobile device 18 via the connector 2530. The handle 2540 may include a battery for supplying power to the components in the handle 2540 and a charging power to the mobile device 18.

An optic system 2570 may be attached to, or be a part of, the outer case 2512. When the mobile device 18 is inserted into the outer case 2512, the optic system 2570, similar to the attachment 110 disclosed with respect to FIGS. 27C and 27D, may fold the optical path of the field of illumination of the light source of the mobile device 18 and/or the field of view of the camera of the mobile device 18 such that the field of illumination of the light source or the field of view of the camera is folded from the back side of the mobile device 18 towards the target area positioned at the top side of the mobile device 18.

The optic system 2570 may include, or be configured similarly to, any of the optic systems, or components thereof, described with respect to FIGS. 27A, 27B, 27C, 27D, 30A, 30B, 30C, and 30D.

Figure 14:
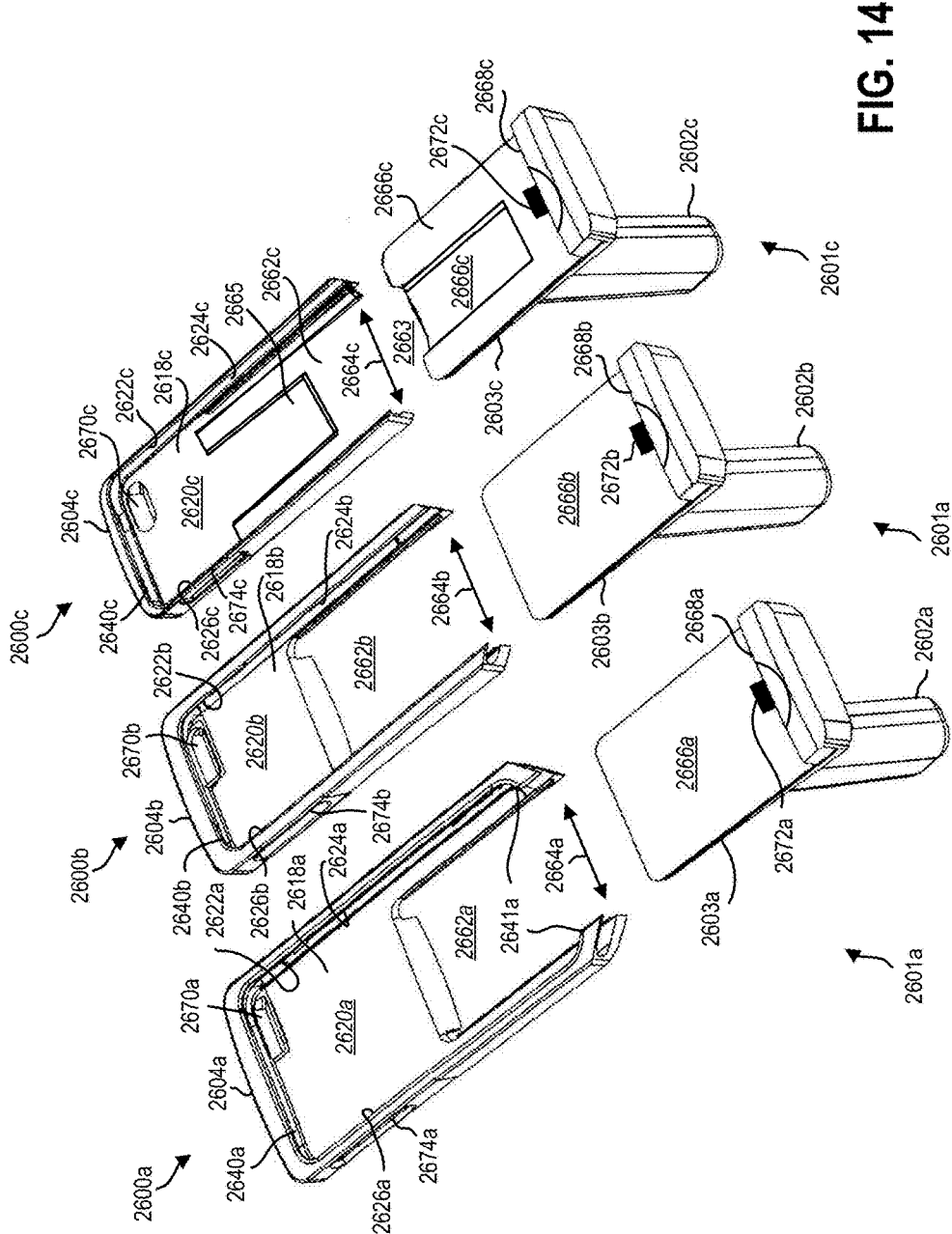
FIG. 14 shows an exemplary barcode-reading enhancement accessory configured as an encapsulating attachment in accordance with another embodiment.
Figure 15:
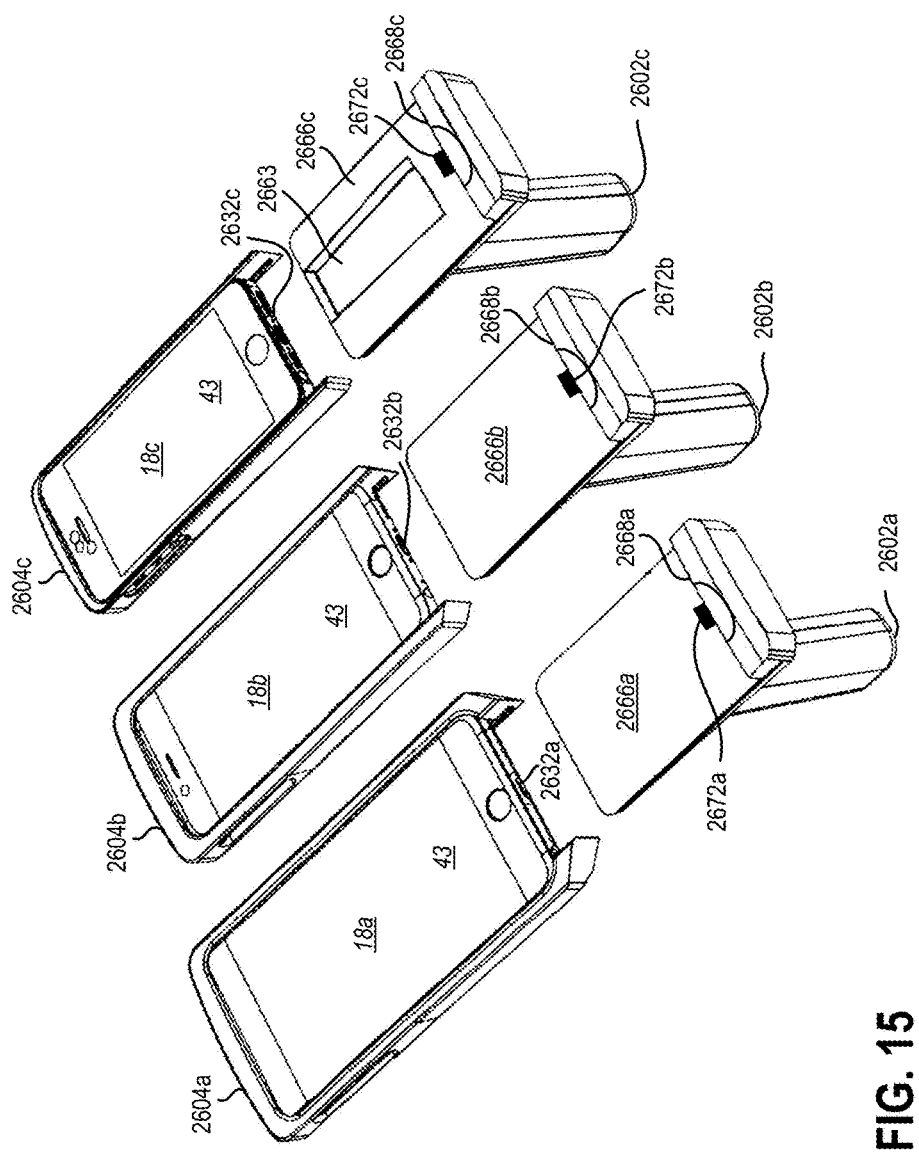
FIG. 15 shows the barcode-reading enhancement accessory of FIG. 14 with a mobile device encased into the cavity of the case.
Figure 16:
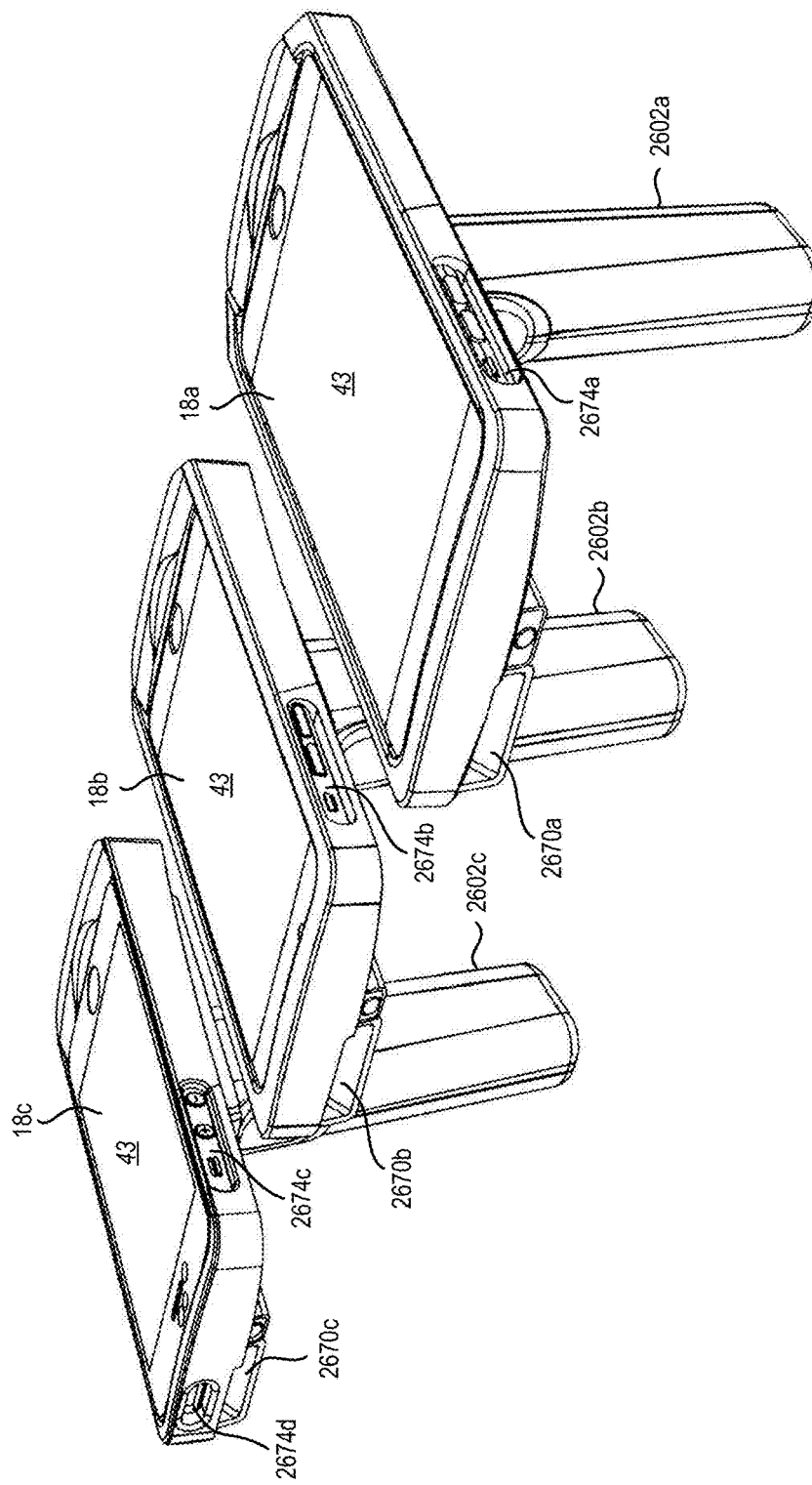
FIG. 16 shows the combined state of the case and the handle assembly of the barcode-reading enhancement accessory of FIG. 14.

FIG. 14 shows an exemplary barcode-reading enhancement accessory 2600a, 2600b, 2600c configured as an encapsulating attachment in accordance with another embodiment. FIG. 15 shows the barcode-reading enhancement accessory of FIG. 14 with a mobile device encased into the cavity of the case. FIG. 16 shows the combined state of the case and the handle assembly of the barcode-reading enhancement accessory of FIG. 14.

A barcode-reading enhancement accessory 2600a, 2600b, 2600c may comprise a handle assembly 2601a, 2601b, 2601c and a case 2604a, 2604b, 2604c. Each case 2604a, 2604b, 2604c is configured for encasing a mobile device 18a, 18b, 18c of a different model or size. The interior and/or exterior dimensions of each case 2604a, 2604b, 2604c is designed differently for accommodating a particular model or size of a mobile device 18a, 18b, 18c. The handle assembly may be generic to all or some of the cases 2604a, 2604b, 2604c so that the same handle assembly may be used with multiple cases 2604a, 2604b, 2604c. Alternatively, each handle assembly 2601a, 2601b, 2601c may be designed for a particular mobile device and may be used with a corresponding case designed for the particular mobile device.

The case 2604a, 2604b, 2604c may comprise a cavity 2618a, 2618b, 2618c into which a mobile device 18a, 18b, 18c is inserted. The cavity 2618a, 2618b, 2618c may be defined by interior surfaces comprising a back side interior surface 2620a, 2620b, 2620c, a face interior surface 2622a, 2622b, 2622c, which is generally parallel to the back side interior surface 2620a, 2620b, 2620c, a top edge interior surface 2640a, 2640b, 2640c, a left edge interior surface 2626a, 2626b, 2626c, and a right edge interior surface 2624a, 2624b, 2624c, which is opposite, and parallel, to the left edge interior surface 2626a, 2626b, 2626c.

The case (e.g., case 2604a) may also include a bottom edge interior surface 2641a, which is opposite, and parallel, to the top edge interior surface 2640a. The case (e.g., case 2604b, 2604c) may not have the bottom edge interior surface. In this case, a docking surface 2668b, 2668c of the handle assembly 2601b, 2601c closes the cavity 2618b, 2618c.

Each of the top edge interior surface 2640a, 2640b, 2640c, the bottom edge interior surface 2641a (or the docking surface 2668a, 2668b, 2668c), the left edge interior surface 2626a, 2626b, 2626c, and the right edge interior surface 2624a, 2624b, 2624c may be generally planar and extend between the back side interior surface 2620a, 2620b, 2620c and the face interior surface 2622a, 2622b, 2622c, and define a perimeter (perimeter edges) of each of the back side interior surface 2620a, 2620b, 2620c and the face interior surface 2622a, 2622b, 2622c. The top edge interior surface 2640a, 2640b, 2640c and the bottom edge interior surface 2641a (or the docking surface 2668a, 2668b, 2668c) may each be orthogonal to each of the left edge interior surface 2626a, 2626b, 2626c and the right edge interior surface 2624a, 2624b, 2624c.

The back side interior surface 2620a, 2620b, 2620c and the bottom edge interior surface 2641a may each include apertures 2662a, 2662b, 2662c and 2664a, respectively. The lack of the bottom edge interior surface in cases 2604b and 2604c forms apertures 2664b and 2664c.

The handle assembly 2601a, 2601b, 2601c may include a handle 2602a, 2602b, 2602c and a platform 2603a, 2603b, 2603c. The platform 2603a, 2603b, 2603c includes a platform surface 2666a, 2666b, 2666c and a docking surface 2668a, 2668b, 2668c. When the case 2604a, 2604b, 2604c is coupled to the handle assembly 2601a, 2601b, 2601c, the platform surface 2666a, 2666b, 2666c may: i) be flush (alternatively may not be flush) with the back side interior surface 2620a, 2620b, and 2620c, and ii) fill (or substantially fill) the aperture 2662a, 2662b, 2662c. Similarly the docking surface 2668a, 2668b, 2668c may: i) be flush (alternatively may not be flush) with the bottom edge interior surface 2641a, and fill (or substantially fill) the aperture 2664a, 2664b, 2664c thereby completing the partial bottom edge interior surface 2641a of the case 2604a or becoming the entire bottom edge interior surface of the case 2604b, 2604c.

As shown in FIG. 16, the case 2604a, 2604b, 2604c (with the mobile device 18a, 18b, 18c encased in it) is coupled to the handle assembly 2601a, 2601b, 2601c before using as a barcode-reading device. For coupling the case 2604a, 2604b, 2604c to the handle assembly 2601a, 2601b, 2601c, a coupling structure may be provided in the case 2604a, 2604b, 2604c and the handle assembly 2601a, 2601b, 2601c. For example, a tongue (or a groove) may be formed along the left and right edges of the platform surface 2666a, 2666b, 2666c and a groove (or a tongue) may be formed along the left and right edges of the aperture 2662a, 2662b, 2662c of the back side interior surface of the case 2604a, 2604b, 2604c so that the case 2604a, 2604b, 2604c may be coupled to the handle assembly 2601a, 2601b, 2601c by sliding the tongue along the groove. Alternatively or additionally, a ridge and a rail may be formed along the left and right edges of the platform surface 2666a, 2666b, 2666c and the left and right edges of the aperture 2662a, 2662b, 2662c. The ridge/rail combination may provide additional strength for securing the case 2604a, 2604b, 2604c to the handle assembly 2601a, 2601b, 2601c and provide greater strength against torsional forces in the direction 2692 shown in FIG. 17 than if the case 2604a, 2604b, 2604c is simply mounted to the handle assembly 2601a, 2601b, 2601c by a mechanical structure on its bottom edge.

The face interior surface 2622a, 2622b, 2622c may also include an aperture through which a display screen 43 of a mobile device 18a, 18b, 18c (as shown in FIG. 15) may be viewed and as such the face interior surface 2622a, 2622b, 2622c may be a thin band which extends around the periphery defined by the top edge interior surface 2640a, 2640b, 2640c, the bottom edge interior surface 2641a (or the docking surface 2668a, 2668b, 2668c), the left edge interior surface 2626a, 2626b, 2626c, and the right edge interior surface 2624a, 2624b, 2624c.

The handle assembly 2601a, 2601b, 2601c and the case 2604a, 2604b, 2604c are separable as depicted in FIG. 15 to enable the mobile device 18a, 18b, 18c to be inserted into, and removed from, the case 2604a, 2604b, 2604c. The handle assembly 2601a, 2601b, 2601c and the case 2604a, 2604b, 2604c may be coupled to each other by sliding the case 2604a, 2604b, 2604c towards the docking surface 2668a, 2668b, 2668c of the handle assembly 2601a, 2601b, 2601c (while the bottom edge interior surface 2620a, 2620b, 2620c is flush with the platform surface 2666a, 2666b, 2666c) and engaging a latching mechanism (not shown). Any conventional latching, fastening, or clamping mechanism may be used to secure the case 2604a, 2604b, 2604c to the handle assembly 2601a, 2601b, 2601c.

At least a portion of the interior surfaces (shown in FIG. 14) of the case 2604a, 2604b, 2604c (including the docking surface 2668a, 2668b, 2668c of the handle assembly 2601a, 2601b, 2601c) conform to at least a portion of an exterior surface of the mobile device 18a, 18b, 18b for which the case 2604a, 2604b, 2604c is configured. Each case 2604a, 2604b, 2604c may have different dimensions of its interior surfaces to fit a mobile device 18a, 18b, 18c of a different model or size. More specifically, each case 2604a, 2604b, 2604c may comprise interior surfaces into which a particular model or size of a mobile device 18a, 18b, 18c will securely fit. For example, case 2604a may be configured to fit the Apple iPhone 6 Plus®, case 2604b may be configured to fit the Apple iPhone 6®, and case 2604c may be configured to fit the Apple iPhone 5/5s®.

When the case 2604a, 2604b, 2604c carrying a mobile device 18a, 18b, 18c is coupled to the handle assembly 2601a, 2601b, 2601c, the position of the mobile device 18a, 18b, 18c with respect to the accessory 2600a, 2600b, 2600c is referred to as the "operating position," which is depicted in FIG. 16.

The accessory 2600a, 2600b, 2600c may include an optic system 2670a, 2670b, 2670c. The optic system 2670a, 2670b, 2670c is secured to the case 2604a, 2604b, 2604c and is configured to fold an optical path of at least one of a field of illumination of a light source of the mobile device 18a, 18b, 18c or a field of view of a camera of the mobile device 18a, 18b, 18c when the mobile device 18a, 18b, 18c is accommodated in the case 2604a, 2604b, 2604c.

When the mobile device 18a, 18b, 18c is in the operating position, the optic system 2670a, 2670b, 2670c of the accessory 2600a, 2600b, 2600c may be within at least one of the field of illumination of the white light source of the mobile device 18a, 18b, 18c and/or the field of view of the camera of the mobile device 18a, 18b, 18c. The dimensions of the case 2604a, 2604b, 2604c are selected so that the mobile device 18a, 18b, 18c is positioned within the cavity 2618a, 2618b, 2618c of the case 2604a, 2604b, 2604c so that the optic system 2670a, 2670b, 2670c is within at least one of the field of illumination of the white light source of the mobile device 18a, 18b, 18c and/or the field of view of the camera of the mobile device 18a, 18b, 18c.

In all embodiments, the operating system 48 or barcode-reading application may process and decode an image captured by the camera of the mobile device as such image is modified by the optic system, including optic systems 2370, 2570 and 2670.

A connector 2672a, 2672b, 2672c (e.g., Apple Lightning Connector®) may be provided on the docking surface 2668a, 2668b, 2668c of the handle assembly for connection to the mating connector 2632a, 2632b, 2632c of the mobile device 18a, 18b, 18c when the combined mobile device and case is coupled to the handle assembly 2601a, 2601b, 2601c. When the mobile device 18a, 18b, 18c is in the operating position, the connector 2672a, 2672b, 2672c on the handle assembly is aligned both vertically and horizontally with the mating connector 2632a, 2632b, 2632c on the mobile device 18a, 18b, 18c. The dimensions and shape of the case 2604a, 2604b, 2604c are selected so that when the combination of the case and the mobile device is coupled to the handle assembly 2601a, 2601b, 2601c, the connector 2672a, 2672b, 2672c on the handle assembly is aligned both vertically and horizontally with the mating connector 2632a, 2632b, 2632c on the mobile device 18a, 18b, 18c.

Typically the mating connector 2632a, 2632b, 2632c on the mobile device 18a, 18b, 18c will be in the center (between the left and right sides when the mobile device 18a, 18b, 18c is viewed in a portrait mode) of the mobile device 18a, 18b, 18c on its bottom surface. There are certain scenarios where all of the mobile devices 18a, 18b, 18c for which the cases 2604a, 2604b, 2604c are designed may have the mating connector 2632a, 2632b, 2632c positioned at the same distance from the back side exterior surface of the mobile device 18a, 18b, 18c. In these scenarios, that distance can be used for the distance between the platform surface 2666a, 2666b, 2666c and the connector 2672a, 2672b, 2672c of the handle assembly 2601a, 2601b, 2601c and the back side interior surface 2620a, 2620b, 2620c of each case 2604a, 2604b, 2604c may be flush with the platform surface 2666a, 2666b, 2666c.

However, there may be other cases where the distance between the mating connector 2632a, 2632b, 2632c on a mobile device 18a, 18b, 18c and the mobile device's back side exterior surface varies among the mobile devices 18a, 18b, 18c for which cases are designed. In these cases, the back side interior surface 2620a, 2620b, 2620c of the case 2604a, 2604b, 2604c may not be flush with the platform surface 2666a, 2666b, 2666c and the mobile device 18a, 18b, 18c should be raised above the platform surface 2666a, 2666b, 2666c to align the mating connector 2632a, 2632b, 2632c of the mobile device 18a, 18b, 18c to the connector 2672a, 2672b, 2672c on the docking surface 2668a, 2668b, 2668c. For example, as shown in the third example (case 2604c and handle assembly 2601c) in FIG. 14, a tongue 2665 may be provided in the back side interior surface 2620c of the case and a matching slot 2663 may be formed in the platform surface 2666c of the handle assembly 2601c. The thickness of the tongue 2665 can vary to raise the mobile device 18c above the platform surface 2666c to ensure alignment of the connector 2672c on the docking surface 2668c with the mating connector 2632c on the mobile device 18c.

Each case 2604a, 2604b, 2604c may include one or more apertures 2674a, 2674b, 2674c, 2674d within one or more of its walls to expose control buttons or switches on the mobile device 18a, 18b, 18c when the mobile device 18a, 18b, 18c is inserted into the case 2604a, 2604b, 2604c. Each case 2604a, 2604b, 2604c is designed for a mobile device 18a, 18b, 18c of a particular model or size so that each aperture 2674a, 2674b, 2674c, 2674d is positioned for the control buttons or switches on the corresponding mobile device 18a, 18b, 18c. Alternatively, instead of the aperture(s), a flexible button or switch may be formed in the corresponding position in the wall(s) of the case 2604a, 2604b, 2604c so that the control buttons or switches on the mobile device 18a, 18b, 18c may be operated through the flexible button or switch formed in the wall(s) of the case 2604a, 2604b, 2604c.

Figure 17:
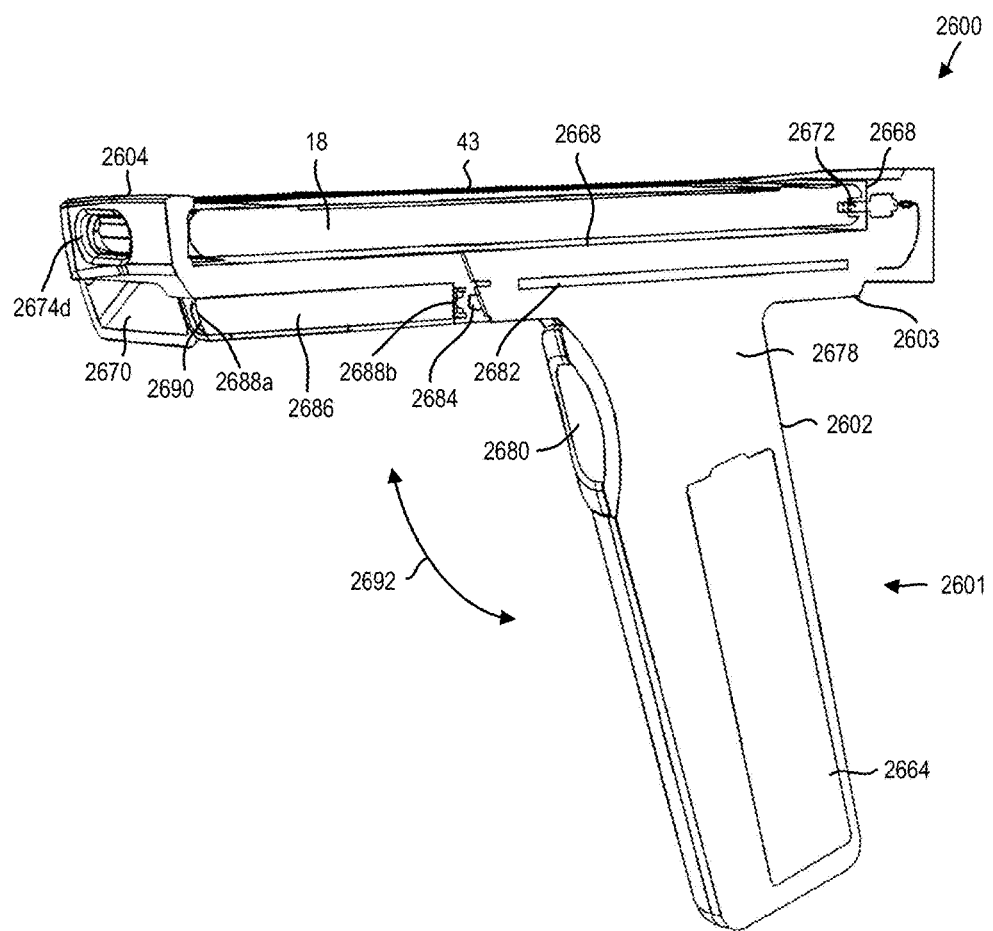
FIG. 17 is a cutaway view of an accessory with the handle assembly assembled with a case to encase a mobile device.

FIG. 17 is a cutaway view of an accessory 2600 with the handle assembly 2601 assembled with a case 2604 to encase a mobile device 18. The handle assembly 2601 includes a handle 2602 extending downward away from the platform 2603. The handle 2602 is sized and shaped to be gripped by an operator with the operator's thumb and forefinger being positioned at a shoulder 2678 where the handle 2602 meets the platform 2603. When held in this manner the display screen 43 of the mobile device 18 is visible to an operator looking downward.

A trigger switch 2680 is positioned at the shoulder 2678 and is intended to enable the operator to trigger reading of a barcode utilizing the same ergonomics of a typical "gun" type of barcode reader. The trigger switch 2680 activates a trigger or barcode rendering circuit 2682 in the handle assembly 2601.

The handle assembly 2601 may include a battery 2664 for supplying power to the components in the handle assembly 2601 as well as providing operating power and/or charging power to the mobile device 18 through the connector 2672 on the docking surface 2668.

Figure 27B:
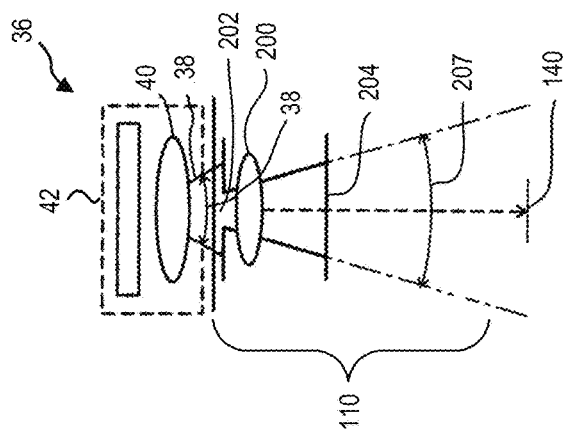
FIGS. 27A-27D illustrate exemplary supplementary optics useful for implementing in an attachment of a barcode-reading enhancement system.
Figure 27A:
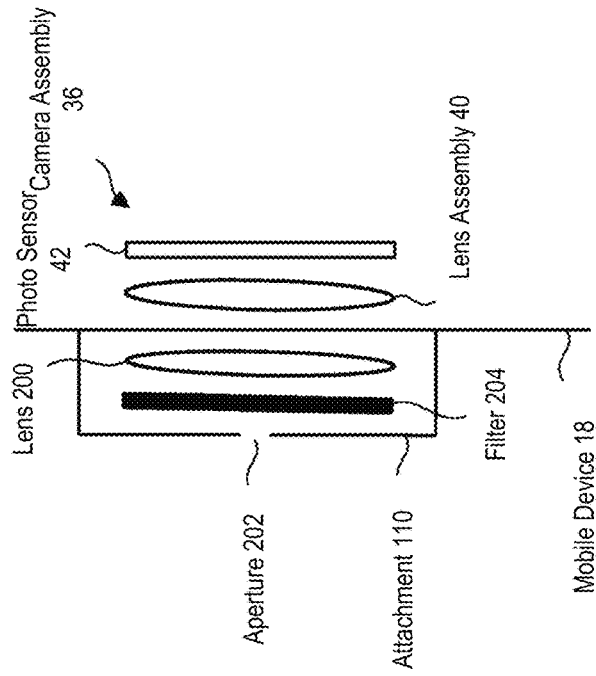
Figure 27C:
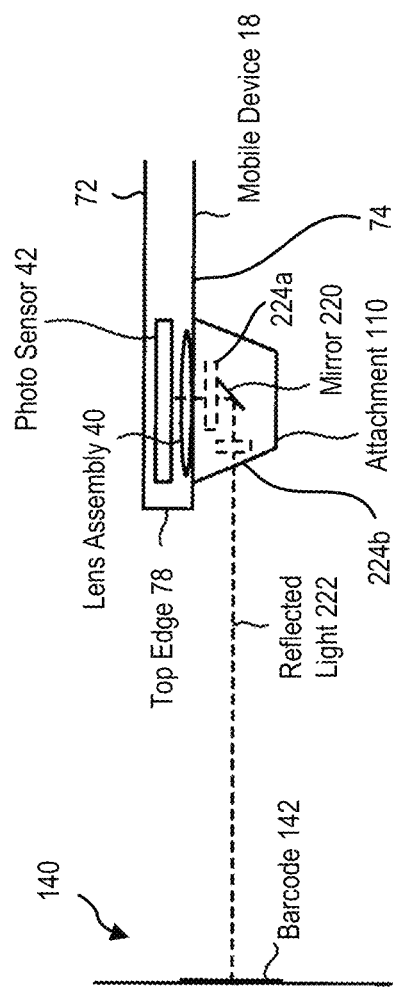
Figure 27D:
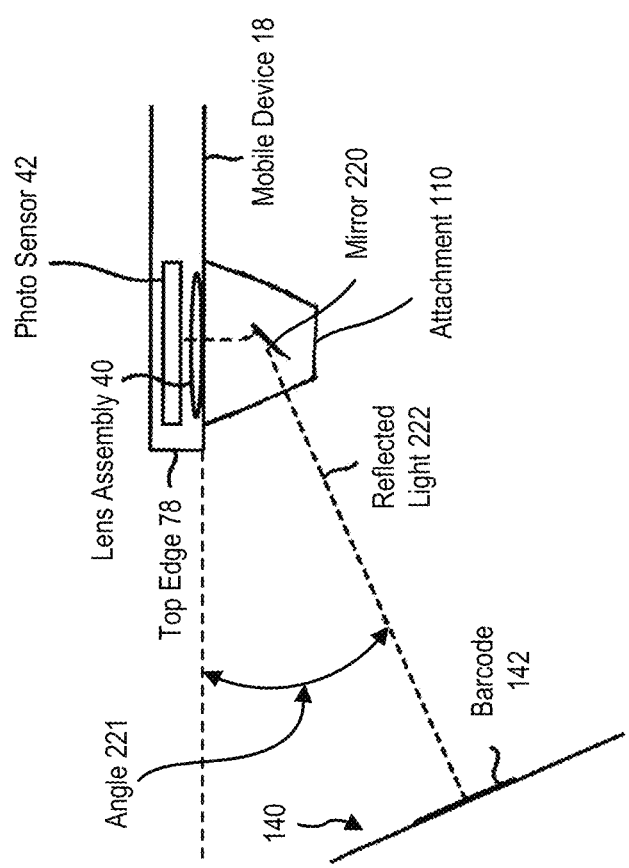

The optic system 2670 secured to the case 2604 may include a structure described with respect to FIG. 27C or 27D for purposes of folding the optical path of at least one of a field of illumination of a light source of the mobile device 18 or a field of view of a camera of the mobile device 18 when the mobile device 18 is accommodated in the case 2604. The field of illumination of a light source of the mobile device 18 or the field of view of a camera of the mobile device 18 is folded from the back surface of the mobile device 18 towards the target area positioned at the top side of the mobile device 18.

The optic system 2670 may include, or be configured similarly to, any of the optic systems, or components thereof, described with respect to FIGS. 27A, 27B, 27C, 27D, 30A, 30B, 30C, and 30D.

The handle assembly 2601 may further include a supplemental illumination system 2684. The supplemental illumination system 2684 may include one or more LED illuminators for emitting illumination towards the front of the handle assembly 2601 (e.g., towards the top of the mobile device 18 when the mobile device 18 is encased within the case 2604). The supplemental illumination system 2684 may emit targeting illumination (illumination for generating a targeting pattern) and/or exposure illumination (illumination for capturing a barcode).

The supplemental illumination system 2684 may be positioned at the front edge of, or below, the platform 2603 and around a central point of the mobile device 18 when the mobile device 18 is encased within the case 2604. The distance from the supplemental illumination system 2684 to the top side of the case 2604 may be different from case to case. As such, as shown in FIG. 17, the case 2604 may include a light pipe 2686 which extends between an illumination receiving end 2688b and an illumination emitting end 2688a. The illumination receiving end 2688b is positioned within the field of illumination of the supplemental illumination system 2684 (e.g., one or more LEDs) and input illumination generated by the supplemental illumination system 2684 into the light pipe 2686. The illumination emitting end 2688a is positioned adjacent to the optic system 2670 and emits illumination into the system field of view to illuminate a barcode therein. Light received at the illumination receiving end 2688b generally propagates through the light pipe 2686 to the illumination emitting end 2688a based on the principle of total internal reflection. The illumination emitting end 2688a may include an optic system 2690 of: i) the curvature of the illumination emitting end 2688a, ii) one or more lenses, and/or iii) one or more apertures to modify the intensity distribution of the emitted illumination which is projected into the target area as one of exposure illumination and/or targeting illumination.

If emitted as exposure illumination, the optic system 2690 may function to reduce variation of the intensity of the illumination over the field of view (e.g., even illumination across the field of view). If emitted as targeting illumination the optic system 2690 may function to increase variation of the intensity of the illumination within portions of the field of view to form a visible target pattern. In another embodiment, if emitted as a combination of both targeting illumination and exposure illumination, the optic system 2690 may function to decrease variation in the intensity of the illumination across the field of view (e.g., even illumination across the field of view) with a very sharp and noticeable decrease in the intensity of illumination at approximately the edges of the field of view such that the illumination pattern appears to be a particular shape (e.g., square or rectangular) with even intensity within the field of view and noticeably less illumination, if any, being emitted outside the field of view.

The one or more LEDs of the supplemental illumination system 2684 may comprise one or more LEDs of the same color (such as white LEDs, red LEDs, or blue LEDs) or may comprise LEDs of multiple colors such as white LEDs combined with amber LEDs. The LEDs may be the same color as, or different than, the one or more LEDs of the one or more illumination systems of the mobile device 18.

In one embodiment, the operating system or other software executing on the mobile device 18 may hinder the use of the light source (e.g., an LED) of the mobile device 18 as targeting illumination if it does not support a sequence of turning the light source on for targeting, off for image capture, and on for targeting at a rate rapid enough for a good user experience. In one embodiment, i) the light source (i.e., a torch) of the mobile device 18 may be used for exposure illumination and the optic system 2670 may function to reduce variation of the intensity of illumination emitted by the light source of the mobile device 18; and ii) the supplemental illumination system 2684 may be used for targeting illumination.

Alternatively, the light source of the mobile device 18 may be used for targeting and exposure illumination and the optic system 2670 may function to reduce variation of the intensity of illumination emitted by the light source of the mobile device 18 across the field of view with a distinct drop in intensity at approximately the edges of the field of view to yield a particular illumination pattern (e.g., square or rectangular) suitable for targeting a barcode and exposing the barcode during image capture.

Alternatively, the light source of the mobile device 18 may be used for exposure illumination and targeting illumination (e.g., a square or rectangular pattern) and the supplemental illumination system 2684 may be used as additional diffuse bright field illumination or really bright far field illumination. Alternatively, the light source of the mobile device 18 may be used for targeting (e.g., bright field illumination in a square or rectangular pattern) but may be turned off if there is too much glare for exposure. The supplemental illumination system 2684 may be used as diffuse bright field illumination and/or dark field illumination.

Figure 21:
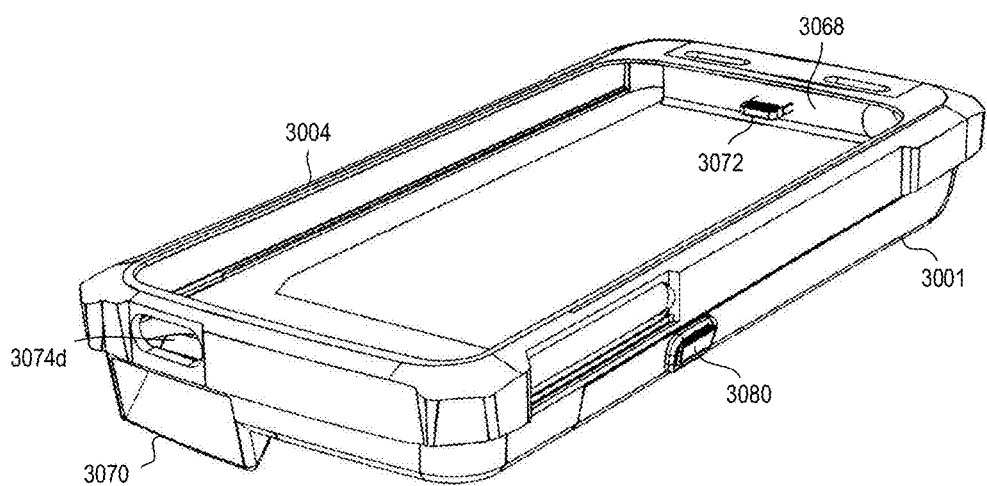
FIG. 21 shows an exemplary case coupled to a platform, which is configured as an encapsulating attachment.

FIG. 18 shows another exemplary barcode-reading enhancement accessory 3000 configured as an encapsulating attachment in accordance with another embodiment. FIG. 19 depicts a case and a platform of the exemplary barcode-reading enhancement accessory along with a mobile device. FIG. 20 shows an exemplary barcode-reading enhancement accessory with a different latching mechanism. FIG. 21 shows an exemplary case coupled to a platform, which is configured as an encapsulating attachment.

The barcode-reading enhancement accessory 3000 may comprise a handle assembly 3001a, 3001b and a case 3004a, 3004b, 3004c. Each case 3004a, 3004b, 3004c is configured for encasing a mobile device (not shown) of a different model or size. The interior and/or exterior dimensions of each case 3004a, 3004b, 3004c may be designed differently for accommodating a particular model or size of a mobile device. The handle assembly 3001a, 3001b may be generic to all or some of the cases 3004a, 3004b, 3004c so that the same handle assembly may be used with multiple cases 3004a, 3004b, 3004c. Alternatively, each handle assembly 3001a, 3001b may be designed for a particular mobile device and may be used with a corresponding case designed for the particular mobile device. It should be noted that FIG. 18 depicts three cases 3004a, 3004b, 3004c and two handle assemblies 3001a, 3001b as an example, and the accessory 3000 may comprise one or more than one cases and one or more than one handle assembly.

The case 3004a, 3004b, 3004c may comprise a cavity 3018a, 3018b, 3018c into which a mobile device 18 is inserted. The cavity 3018a, 3018b, 3018c may be defined by interior surfaces comprising a back side interior surface 3020a, 3020b, 3020c, a face interior surface 3022a, 3022b, 3022c, which is generally parallel to the back side interior surface 3020a, 3020b, 3020c, a top edge interior surface 3040a, 3040b, 3040c, a left edge interior surface 3026a, 3026b, 3026c, and a right edge interior surface 3024a, 3024b, 3024c, which is opposite, and parallel, to the left edge interior surface 3026a, 3026b, 3026c.

The case may have a bottom wall 3005a, 3005b, 3005c as a separate piece. The bottom wall 3005a, 3005b, 3005c is secured to the remaining piece of the case 3004a, 3004b, 3004c with a connecting mechanism to complete the case 3004a, 3004b, 3004c. The case 3004a, 3004b, 3004c is combined with the handle assembly 3001a, 3001b, more particularly, with the platform 3003a, 3003b of the handle assembly 3001a, 3001b. After the case 3004a, 3004b, 3004c is coupled to the handle assembly 3001a, 3001b, the docking surface 3068a, 3068b of the handle assembly 3001a, 3001b may close the cavity 3018a, 3018b, 3018c.

The case 3004a, 3004b, 3004c and the platform 3003a, 3003b may be combined by sliding the case 3004a, 3004b, 3004c towards the docking surface 3068a, 3068b of the platform 3003a, 3003b. The bottom wall 3005a, 3005b, 3005c of the case 3004a, 3004b, 3004c is then closed and locked after the case 3004a, 3004b, 3004c and the platform 3003a, 3003b are combined. FIG. 21 shows the complete case combined with the platform.

As shown in FIG. 18, one end of the bottom wall 3005a, 3005b, 3005c and one corner of the case 3004a, 3004b, 3004c may be coupled with a pin so that the bottom wall 3005a, 3005b, 3005c may freely rotate and a latching (fastening or clamping) mechanism may be provided at the other corner of the case 3004a, 3004b, 3004c so that the other end of the bottom wall 3005a, 3005b, 3005c may be secured by the latching mechanism. Alternatively, as shown in FIG. 20, the bottom wall 3005a, 3005b, 3005c may be coupled to the case 3004a, 3004b, 3004c with screws or pins 3009. Any other conventional means may be used to secure the bottom wall 3005a, 3005b, 3005c to the case 3004a, 3004b, 3004c.

Each of the top edge interior surface 3040a, 3040b, 3040c, the docking surface 3068a, 3068b of the handle assembly 3001a, 3001b, the left edge interior surface 3026a, 3026b, 3026c, and the right edge interior surface 3024a, 3024b, 3024c may be generally planar and extend between the back side interior surface 3020a, 3020b, 3020c and the face interior surface 3022a, 3022b, 3022c, and define a perimeter (perimeter edges) of each of the back side interior surface 3020a, 3020b, 3020c and the face interior surface 3022a, 3022b, 3022c. The top edge interior surface 3040a, 3040b, 3040c and the docking surface 3068a, 3068b of the handle assembly 3001a, 3001b may each be orthogonal to each of the left edge interior surface 3026a, 3026b, 3026c and the right edge interior surface 3024a, 3024b, 3024c.

The back side interior surface 3020a, 3020b, 3020c may include an aperture 3062a, 3062b, 3062c. The aperture 3062a, 3062b, 3062c may be formed in the center portion of the back side interior surface 3020a, 3020b, 3020c leaving a band in the top, left, and right sides of the back side interior surface 3020a, 3020b, 3020c.

In one embodiment, the handle assembly 3001a may include a handle 3002a and a platform 3003a. In another embodiment, the handle assembly 3001b may include a platform 3003b and may not have a handle. The handle 3001a may be attachable and detachable to the platform 3003a.

The platform 3003a, 3003b includes a platform surface 3066a, 3066b and a docking surface 3068a, 3068b. The platform 3003a, 3003b may have two decks. When the case 3004a, 3004b, 3004c is coupled to the handle assembly 3001a, 3001b, the case 3004a, 3004b, 3004c is placed on top of the lower deck 3007a, 3007b and the top surface (the platform surface 3066a, 3066b) of the upper deck 3008a, 3008b may: i) be flush (or alternatively may not be flush) with the back side interior surface 3020a, 3020b, and 3020c, and ii) fill (or substantially fill) the aperture 3062a, 3062b, 3062c. After the case 3004a, 3004b, 3004c is coupled to the platform 3003a, 3003b, the docking surface 3068a, 3068b becomes a partial bottom edge interior surface of the case 3004a, 3004b, 3004c.

As shown in FIG. 19, the case 3004a, 3004b, 3004c (with the mobile device 18 encased in it) is coupled to the handle assembly 3001a, 3001b before using as a barcode-reading device. For coupling the case 3004a, 3004b, 3004c to the handle assembly 3001a, 3001b, a coupling structure may be provided in the case 3004a, 3004b, 3004c and the handle assembly 3001a, 3001b. For example, a tongue (or a groove) may be formed along the left and right edges of the platform surface 3066a, 3066b and a groove (or a tongue) may be formed along the left and right edges of the aperture 3062a, 3062b, 3062c of the back side interior surface of the case 3004a, 3004b, 3004c so that the case 3004a, 3004b, 3004c may be coupled to the handle assembly 3001a, 3001b by sliding the tongue along the groove. Alternatively, the left and right edges of the platform surface 3066a, 3066b and the aperture 3062a, 3062b, 3062c may have the matching cross-section (e.g., a slanted edge) so that the platform 3003a, 3003b and the case 3004a, 3004b, 3004c may be secured by simply sliding the case 3004a, 3004b, 3004c towards the docking surface 3068a, 3068b along the matched edges of the platform surface 3066a, 3066b and the aperture 3062a, 3062b, 3062c. Alternatively or additionally, a ridge and a rail may be formed along the left and right edges of the platform surface 3066a, 3066b, and the left and right edges of the aperture 3062a, 3062b, 3062c. The ridge/rail combination may provide additional strength for securing the case 3004a, 3004b, 3004c to the handle assembly 3001a, 3001b and provide greater strength against torsional forces (in the direction 2692 as shown in FIG. 17) than if the case 3004a, 3004b, 3004c is simply mounted to the handle assembly 3001a, 3001b.

The face interior surface 3022a, 3022b, 3022c may also include an aperture through which a display screen 43 of a mobile device 18 may be viewed and as such the face interior surface 3022a, 3022b, 3022c may be a thin band which extends around the periphery defined by the top edge interior surface 3040a, 3040b, 3040c, the docking surface 3068a, 3068b, the left edge interior surface 3026a, 3026b, 3026c, and the right edge interior surface 3024a, 3024b, 3024c.

At least a portion of the interior surfaces (shown in FIG. 18) of the case 3004a, 3004b, 3004c (including the docking surface 3068a, 3068b of the handle assembly 3001a, 3001b) conform to at least a portion of an exterior surface of the mobile device 18 for which the case 3004a, 3004b, 3004c is configured. Each case 3004a, 3004b, 3004c may have different dimensions of its interior surfaces to fit a mobile device 18 of a different model or size. More specifically, each case 3004a, 3004b, 3004c may comprise interior surfaces into which a particular model or size of a mobile device 18 will securely fit. For example, case 3004a may be configured to fit the Apple iPhone 6 Plus®, case 3004b may be configured to fit the Apple iPhone 6®, and case 3004c may be configured to fit the Apple iPhone 5/5s®.

When the case 3004a, 3004b, 3004c carrying a mobile device 18 is coupled to the handle assembly 3001a, 3001b, the position of the mobile device 18 with respect to the accessory is referred to as the "operating position."

An optic system 3070 (as shown in FIG. 21) may be secured to the case 3004a, 3004b, 3004c. The optic system 3070 is configured to fold an optical path of at least one of a field of illumination of a light source of the mobile device 18 or a field of view of a camera of the mobile device 18 when the mobile device 18 is accommodated in the case 3004a, 3004b, 3004c.

When the mobile device 18 is in the operating position, the optic system 3070 may be within at least one of the field of illumination of the white light source of the mobile device 18 and/or the field of view of the camera of the mobile device 18. The dimensions of the case 3004a, 3004b, 3004c are selected so that the mobile device 18 is positioned within the cavity 3018a, 3018b, 3018c of the case 3004a, 3004b, 3004c so that the optic system 3070 is within at least one of the field of illumination of the white light source of the mobile device 18 and/or the field of view of the camera of the mobile device 18.

The optic system 2070 may include, or be configured similarly to, any of the optic systems, or components thereof, described with respect to FIGS. 27A, 27B, 27C, 27D, 30A, 30B, 30C, and 30D.

A connector 3072 (e.g., the Apple Lightning Connector®), as shown in FIG. 21, may be provided on the docking surface 3068a, 3068b of the handle assembly 3001a, 3001b for connection to the mating connector 3032 (shown in FIG. 19) of the mobile device 18 when the combined mobile device and case is coupled to the handle assembly 3001a, 3001b. When the mobile device 18 is in the operating position, the connector 3072 on the handle assembly is aligned both vertically and horizontally with the mating connector 3032 on the mobile device 18. The dimensions and shape of the case 3004a, 3004b, 3004c are selected so that when the combination of the case and the mobile device is coupled to the handle assembly 3001a, 3001b, the connector 3072 on the handle assembly is aligned both vertically and horizontally with the mating connector 3032 on the mobile device 18.

Typically the mating connector 3032 on the mobile device 18 will be in the center (between the left and right sides when the mobile device 18 is viewed in a portrait mode) of the mobile device 18 on its bottom surface. There are certain scenarios where all of the mobile devices 18 for which the cases 3004a, 3004b, 3004c are designed may have the mating connector 3032 positioned at the same distance from the back side exterior surface of the mobile device 18. In these scenarios, that distance can be used for the distance between the platform surface 3066a, 3066b and the connector 3072 of the handle assembly 3001a, 3001b, and the back side interior surface 3020a, 3020b, 3020c of each case 3004a, 3004b, 3004c may be flush with the platform surface 3066a, 3066b.

However, there may be other cases where the distance between the mating connector 3032 on a mobile device 18 and the mobile device's back side exterior surface varies among the mobile devices for which cases are designed. In these cases, the back side interior surface 3020a, 3020b, 3020c of each case 3004a, 3004b, 3004c may not be flush with the platform surface 3066a, 3066b and the mobile device 18 should be raised above the platform surface 3066a, 3066b to align the mating connector 3032 of the mobile device 18 to the connector 3072 on the docking surface 3068a, 3068b. For example, a tongue 3065 may be provided in the back side interior surface 3020c of the case and a matching slot 3063 may be formed in the upper deck 3008a, 3008b of the platform 3003a, 3003b. The thickness of the tongue 3065 can vary to raise the mobile device 18 above the platform surface 3066a, 3066b to ensure alignment of the connector 3072 on the docking surface 3068a, 3068b with the mating connector 3032 on the mobile device 18.

Each case 3004a, 3004b, 3004c may include one or more apertures 3074a, 3074b, 3074c, 3074d within one or more of its walls to expose control buttons or switches on the mobile device 18 when the mobile device 18 is inserted into the case 3004a, 3004b, 3004c. Each case 3004a, 3004b, 3004c is designed for a mobile device 18 of a particular model or size so that each aperture 3074a, 3074b, 3074c, 3074d is positioned for the control buttons or switches on the corresponding mobile device 18. Alternatively, instead of the aperture(s), a flexible button or switch may be formed in the corresponding position in the wall(s) of the case 3004a, 3004b, 3004c so that the control buttons or switches on the mobile device 18 may be operated through the flexible button or switch formed in the wall(s) of the case 3004a, 3004b, 3004c.

The handle 3002a extends downward away from the platform 3003a. The handle 3002a is sized and shaped to be gripped by an operator. When held by the operator, the display screen 43 of the mobile device 18 is visible to an operator looking downward. A trigger switch (not shown in FIG. 18 but similar to the trigger switch 2680 shown in FIG. 17) may be provided on the handle 3002a to enable the operator to trigger reading of a barcode. In case where the handle assembly 3001b does not include a handle, a trigger switch 3080 may be provided, for example, on the side of the case, as shown in FIG. 21. The trigger switch activates a trigger or barcode rendering circuit in the handle assembly 3001a, 3001b. The handle assembly 3001a, 3001b may include a battery for supplying power to the components in the handle assembly 3001a, 3001b as well as providing operating power and/or charging power to the mobile device 18 through the connector 3072.

Referring to FIG. 21, the optic system 3070 secured to the case 3004 may include a structure described with respect to FIG. 27C or 27D for purposes of folding the optical path of at least one of a field of illumination of a light source of the mobile device 18 or a field of view of a camera of the mobile device 18 when the mobile device 18 is accommodated in the case 3004. The field of illumination of a light source of the mobile device 18 or the field of view of a camera of the mobile device 18 is folded from the back surface of the mobile device 18 towards the target area positioned at the top side of the mobile device 18.

Referring to FIG. 18, the handle assembly 3001a, 3001b may further include a supplemental illumination system that is similar to the supplemental illumination system 2684 in FIG. 17. The optic system including the light pipe 2686, the illumination emitting and receiving ends 2688a, 2688b, and the optic system 2690 may also be provided to the case. Details of the supplemental illumination system and the optic systems will not be provided here for simplicity. The supplemental illumination system may include one or more LED illuminators for emitting illumination towards the front of the handle assembly 3001a, 3001b (e.g., towards the top of the mobile device 18 when the mobile device 18 is encased within the case 3004a, 3004b, 3004c). The supplemental illumination system may be targeting illumination (illumination for generating a targeting pattern) and/or exposure illumination (illumination for capturing a barcode).

The barcode-reading enhancement system of the present invention may include a barcode-reading application 500 that may be obtained from the application delivery server 22a, 22b (shown in FIG. 1) and installed on the mobile device 18 as described with respect to FIG. 3A.

Figure 22A:
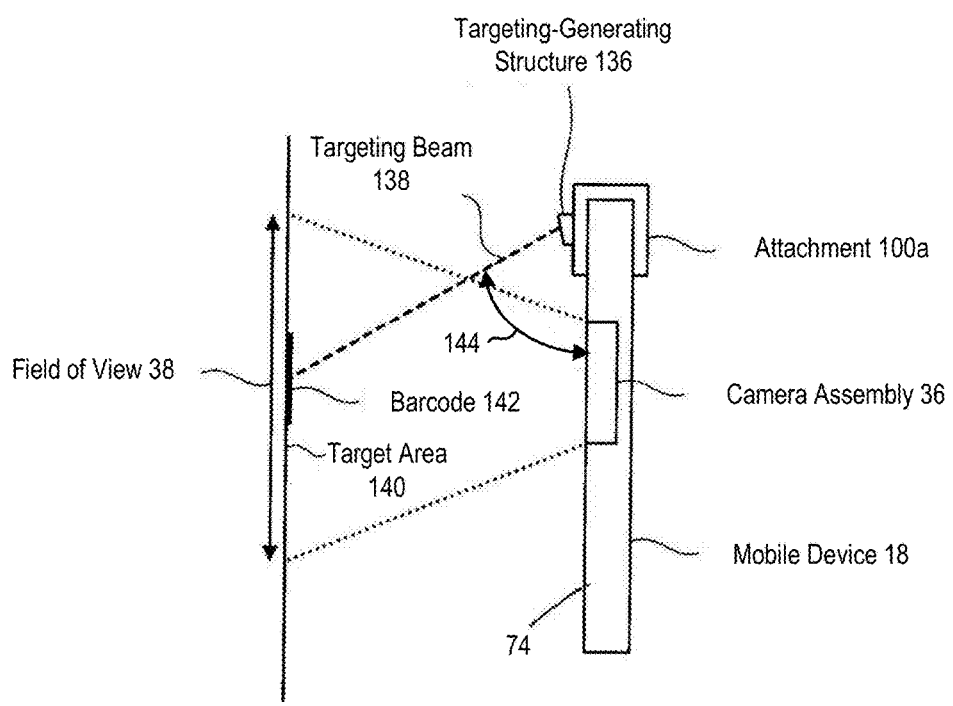
FIGS. 22A and 22B illustrate an exemplary target-generating mechanism useful for implementing in an attachment in a barcode-reading enhancement system.

The attachments described herein may include target-generating mechanisms as a component of the barcode-reading enhancement system for a mobile device. FIG. 22A depicts a side cutaway view of an example corner- or edge-mounted attachment (shown as attachment 100a covering a single edge of the mobile device 18 as an example) that includes a target-generating structure 136 (i.e., a target-generating mechanism). The target-generating structure 136 projects a targeting beam 138 into a target area 140 (corresponding to a central portion of a field of view 38 of the camera assembly 36 of the mobile device 18) and may be utilized to facilitate rapid and optimal positioning of a barcode 142 within the camera field of view 38 of the mobile device 18. The targeting beam 138 is projected at an acute angle 144 with respect to the back surface 74 of the mobile device 18 in a first direction such that the targeting beam 138 intersects the central portion of the camera field of view 38 at a distance from the camera assembly 36 that is useful for barcode-reading. The distance useful for barcode-reading means that a barcode 142 within the camera field of view 38 would be imaged by the lens assembly 40 with sufficient sharpness (focus) and resolution (size) to enable reading of the barcode 142. This targeting beam 138 is especially useful when the mobile device 18 does not have a display, or the display is dimmed or turned off to conserve battery power.

Figure 22B:
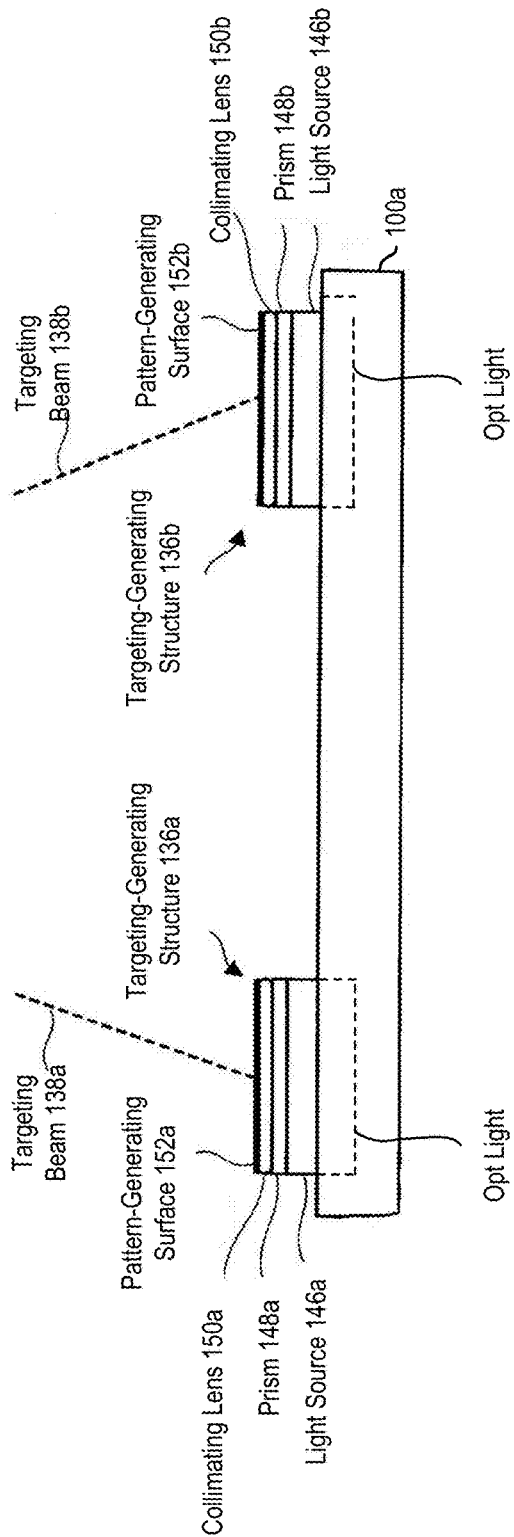

FIG. 22B shows (as a top view, which may be orthogonal to the side view depicted in FIG. 22A) an example of a target-generating mechanism. The target-generating mechanism may include multiple target-generating structures 136a and 136b. The target-generating structures 136a and 136b may project non-parallel targeting beams 138a and 138b of a distinct illumination pattern, each at an acute angle with respect to the back surface 74 of the mobile device 18 in a second direction orthogonal to the first direction and each of which form a point or a pattern within the target area 140. The target-generating structures 136a and 136b may be configured so that (1) at a distance useful for barcode-reading (i.e. the optimal distance from the camera assembly 36), the targeting beams 138a and 138b converge so that the projected patterns and/or points meet at the center of the camera field of view 38, and (2) at any distance from the camera assembly 36 other than the optimal distance, the projected patterns and/or points are spaced apart. Thus, when the mobile device 18 is being used to read a barcode 142, the user may move the mobile device 18 until the projected patterns and/or points meet, indicating that the mobile device 18 is at the optimal distance from the barcode 142 and that the barcode 142 is positioned within the center of the camera field of view 38.

The target-generating mechanism depicted in FIG. 22B may include a light source 146a, 146b and permutations of any of a prism 148a, 148b; a collimating lens 150a, 150b; and a pattern-generating surface 152a, 152b such as an interference pattern-generating element; a diffractive pattern-generating element, such as a holographic element that may include one or more diffractive gratings; or a Fresnel-type pattern-generating element that has been fabricated with the desired targeting beam pattern.

The light source 146a, 146b may be laser diodes, light-emitting diodes (LEDs), etc. embodied in the attachment or within the mobile device 18. The targeting beams 138a, 138b may be generated by shaping the illumination from the white light source of the mobile device by the applicable permutations of the prism 148a, 148b, a collimating lens 150a, 150b, and a pattern-generating surface 152a, 152b.

Although FIGS. 22A and 22B depict the target-generating mechanism embodied in a corner- or edge-mounted attachment 100a, the target-generating mechanism may be secured to the mobile device 18 by other means including, but not limited to, embodying the target-generating structure 136 into an encapsulating attachment as depicted in FIG. 9A in alignment with a white light source 84 of the mobile device such that the white light source 84 of the mobile device may be used as the light source 146 of the target-generating structure 136.

In this application, a "distinct illumination pattern" is an illumination pattern produced by light that is focused to provide relatively crisp lines or other shapes. Thus, the illumination produced by a laser is an example of light that would typically produce a distinct illumination pattern. By contrast, a "diffuse illumination pattern" is an illumination pattern produced by light that is not focused at any particular location, but rather emanating into a broad area. Thus, the illumination produced by a typical light bulb is an example of light that would typically produce a diffuse illumination pattern.

Figure 23A:
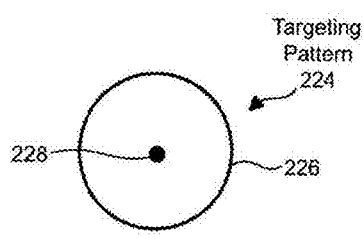
FIGS. 23A-23D illustrate exemplary targeting patterns useful for implementing in an attachment of a barcode-reading enhancement system.

FIGS. 23A-23D illustrate various targeting patterns (distinct illumination patterns) that may be projected by the target-generating structures 136 into the target area 140. FIG. 23A shows an example of a targeting pattern 224 that may be projected by the target-generating structure 136. The targeting pattern 224 includes a circle 226 with a dot 228 in the center. One target-generating structure (136*a* for example) may generate the circle 226, while the other target-generating structure (136*b* for example) may generate the dot 228. The target-generating structures 136*a*, 136*b* may be configured so that when the mobile device 18 is at an optimal distance from the barcode 142, the dot 228 is substantially in the center of the circle 226 to form the depicted targeting pattern 224.

Figure 23B:
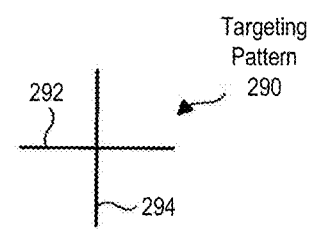

FIG. 23B shows another example of a targeting pattern 290 that may be projected by the target-generating structures 136. The targeting pattern 290 includes a cross comprising a horizontal bar 292 and a vertical bar 294. One target-generating structure (136*a* for example) may generate the horizontal bar 292, while the other target-generating structure (136*b* for example) may generate the vertical bar 294. The target-generating structures 136*a*, 136*b* may be configured so that when the mobile device 18 is at an optimal distance from the barcode 142, the horizontal bar 292 and the vertical bar 294 intersect each other within the target area 140 to form the depicted targeting pattern 290.

Figure 23C:
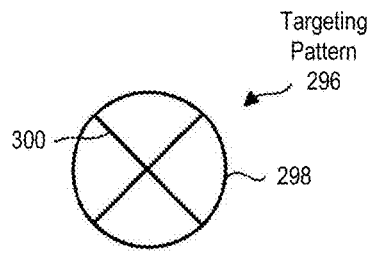

FIG. 23C shows another example of a targeting pattern 296 that may be projected by the target-generating structures 136. The targeting pattern 296 includes a circle 298 comprising an X pattern 300 within the circle 298. One target-generating structure (136*a* for example) may generate the circle 298, while the other target-generating structure (136*b* for example) may generate the X pattern 300. The target-generating structures 136*a*, 136*b* may be configured so that when the mobile device 18 is at an optimal distance from the barcode 142, the circle 298 and the X pattern 300 may intersect each other to form the depicted targeting pattern 296.

Figure 23D:
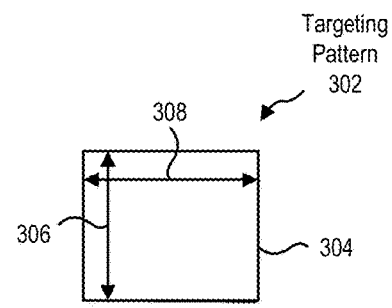

FIG. 23D shows another example of a targeting pattern 302 generated by the target-generating structures 136. The targeting pattern 302 may include an intense illumination in a pattern of one or more quadrilaterals such as a rectangular or square quadrilateral 304 which is/are bounded by a distinct drop in intensity (e.g. a sharp contrast at the edges of the rectangular or square quadrilateral 304). More specifically, the area around the perimeter of the illuminated rectangular or square quadrilateral 304 may be illuminated (if at all) at an intensity much less than the intensity of illumination within the rectangular or square quadrilateral 304.

The illuminated rectangular or square quadrilateral 304 may be, for example, illuminated by LEDs projecting (or appearing) blue or white and in the shape of the rectangular or square quadrilateral 304. The length of the rectangular or square quadrilateral 304 in a first direction (direction 308) may approximately coincide with the width of the field of view of the camera assembly 36 of the mobile device 18 (or the width of the system field of view if the attachment alters the field of view of the camera assembly 36); and the length of the rectangular or square quadrilateral 304 in a second direction (direction 306), orthogonal to the first direction 308, may approximately coincide with the height of the field of view of the camera assembly 36 of the mobile device 18 (or the height of the system field of view if the attachment alters the field of view of the camera assembly 36); and, in each case, may be within a central portion of the field of view of the camera assembly 36 of the mobile device 18 as depicted in FIG. 9A.

Stated another way, the angle at which the illumination diverges from the target-generating structure 136 in the first direction 308 may be approximately the same angle as the field of view of the camera assembly 36 in the first direction 308 (or the same angle as the system field of view if the attachment alters the field of view of the camera assembly 36). Similarly, the angle at which the illumination diverges from the target-generating structure 136 in the second direction 306 may be approximately the same angle as the field of view of the camera assembly 36 in the second direction 306 (or the same angle as the system field of view if the attachment alters the field of view of the camera assembly 36). As such, the targeting pattern 302 not only provides the user with an indication of the field of view of the camera assembly 36 (or the system field of view), in both the first direction 308 and the second direction 306, but the targeting pattern 302 also illuminates substantially all of the field of view in one or both of the first direction and the second direction with an intensity of illumination that does not significantly vary within the targeting pattern 302 but drops significantly at the perimeter of the targeting pattern 302.

As discussed, the target-generating structure 136 may include its own light source 146*a*, 146*b* (as shown in FIG. 22B) and collimate illumination therefrom to produce the applicable distinct targeting pattern. The illumination source may be of a particular wavelength (e.g. red or blue light) or may be white illumination (broad spectrum) and may include a filter 214*a*, 214*b* (which will be explained in detail with reference to FIG. 26) to pass only the particular wavelength used to generate the distinct targeting pattern by attenuating other wavelengths.

Figure 26:
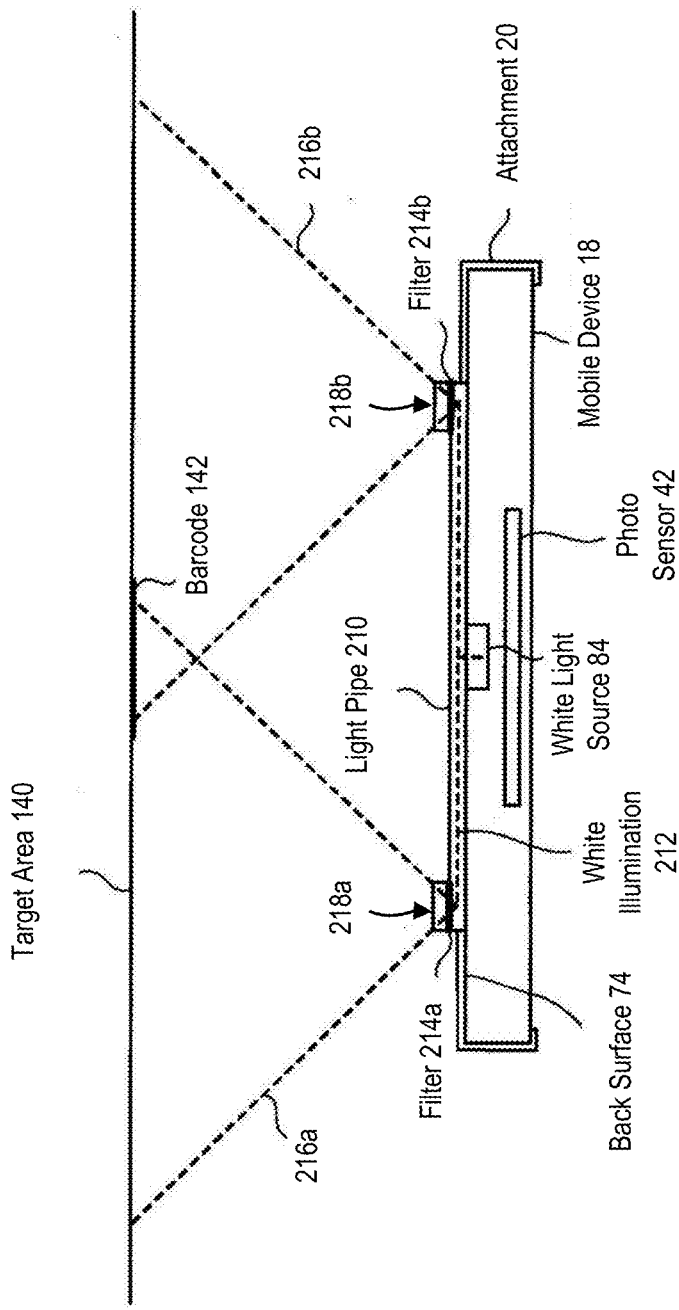
FIG. 26 illustrates an exemplary exposure illumination system useful for implementing in an attachment of a barcode-reading enhancement system.

Alternatively, the target-generating structure 136 may collimate and otherwise shape illumination from the white light source 84 of the mobile device 18 utilizing a collimating lens and/or a pattern-generating surface in both the first direction and the second direction to project the applicable targeting pattern into the target area 140. In such a case, as shown in FIG. 26, the target-generating structure 136 may include filters (214*a*, 214*b*) which pass a narrow band of the visible illumination spectrum, such as red illumination or blue illumination, such that the white illumination (broad spectrum) from the mobile device 18 is filtered and the targeting pattern generated by the combination of the white illumination source and the filter is a specific color, such as blue or red.

The attachments described herein may include supplementary exposure illumination systems as a component of the barcode-reading enhancement system for a mobile device. More specifically, the supplementary exposure illumination systems may include one or more elements which project (or alter the projection of) diffuse illumination into the target area 140 in such a manner that illumination reflected from a barcode 142 and imaged onto the photo sensor 42 produces image characteristics that improve the decode-ability of the image. Image characteristics which improve the decode-ability of the image include: i) increased contrast between illumination reflected from bars (e.g., first modules in a 2D code) versus illumination reflected from spaces (e.g., second modules in a 2D code), and ii) even contrast (e.g., no hot spots, dead zones, or other significant contrast difference) of illumination reflected from bars (or first modules) across the entire barcode 142 and similarly even contrast of illumination reflected from spaces (or second modules) across the entire barcode 142.

As discussed with respect to FIG. 2D, the digital image output 162 may be in an RGB format or processed grayscale values 165. FIGS. 24A-24D represent processing of a color image (for example RGB format) which may be performed by the application 24 if the output 162 is in the RGB format or may be performed by the systems 93 to generate processed grayscale values 165.

Figure 24A:
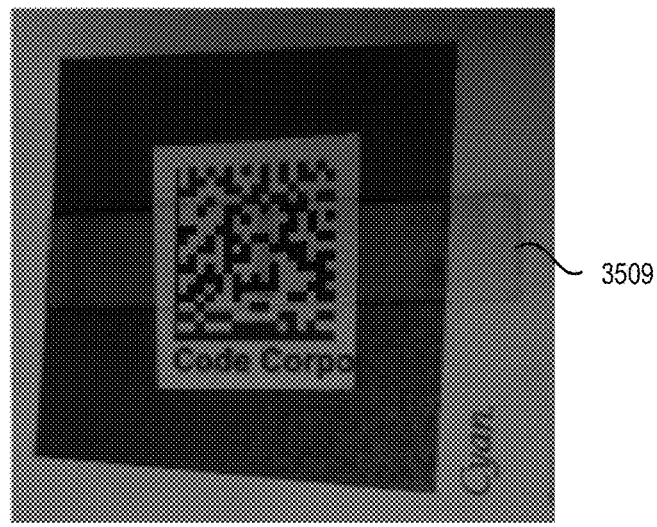
FIGS. 24A and 24B show a grayscale image resulting from combining the first, second, and third channel images with different combining ratios.

Depicted in FIG. 24A is a grayscale image resulting from summing, for each pixel of the image: i) the pixel value of the first channel image (blue) multiplied by the first channel ratio (0%); ii) the pixel value of the second channel image (green) multiplied by the second channel ratio (30%); and iii) the pixel value of the third channel image (red) multiplied by the third channel ratio (70%).

Figure 24B:
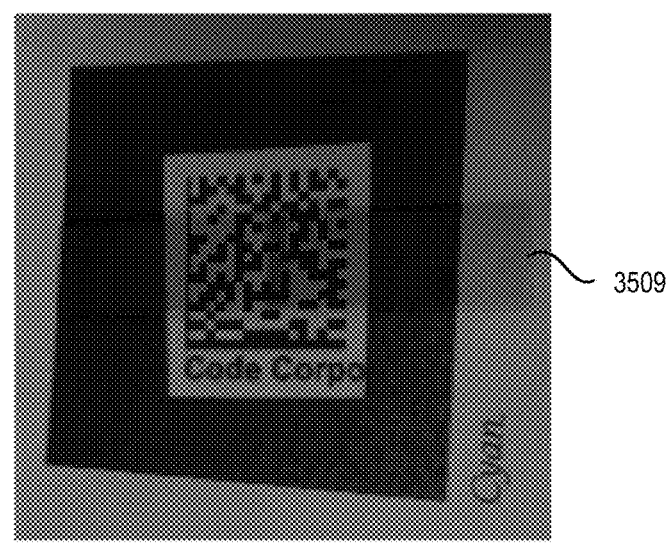

Depicted in FIG. 24B is a grayscale image resulting from summing, for each pixel of the image: i) the pixel value of the first channel image (blue) multiplied by the first channel ratio (0%); ii) the pixel value of the second channel image (green) multiplied by the second channel ratio (15%); and iii) the pixel value of the third channel image (red) multiplied by the third channel ratio (85%).

Figure 24C:
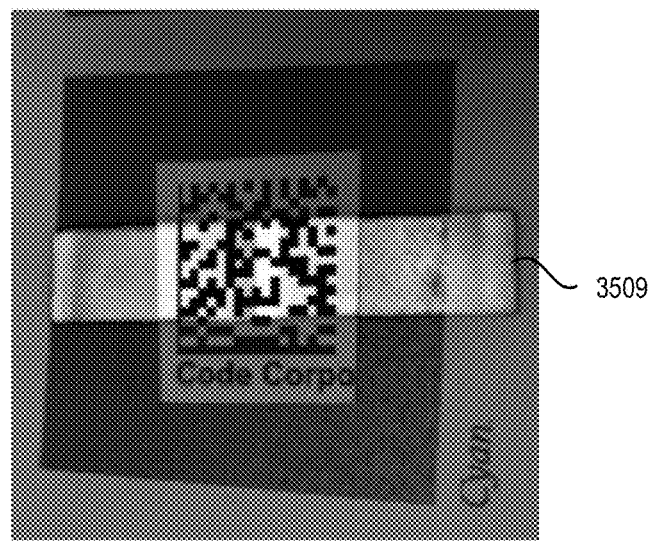
FIGS. 24C and 24D show second channel and third channel images, respectively.
Figure 24D:
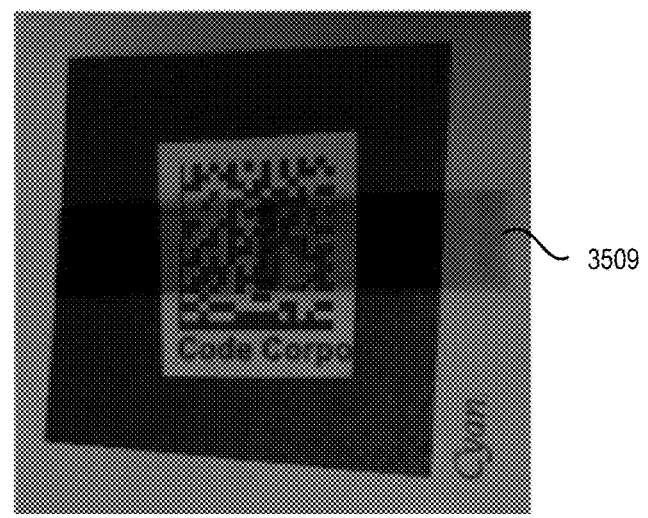

FIG. 24C and FIG. 24D depict the second channel image (the green channel image) and the third channel image (the red channel image), respectively. The green channel image is more sensitive to the blue illumination because it is closer within the visible light spectrum to blue than is the red channel image. The image processing function of the barcode-reading application may create a grayscale composite image of the barcode within the target area by combining the first sub-image, the second sub-image, and/or the third sub-image.

Figure 25A:
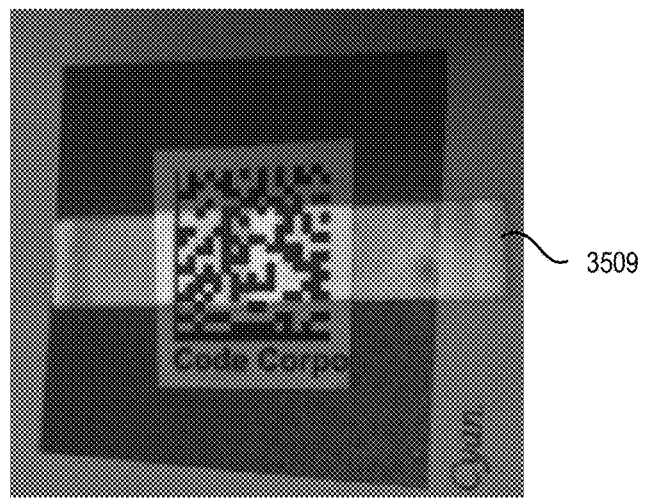
FIG. 25A shows a composite image of the first, second, and third channel images.

Referring to FIG. 25A, the color image (shown in grayscale) is a composite image of each of the first, second, and third channel images. The reflection of the rectangular targeting bar 3509 (e.g., the targeting illumination) is clearly shown in FIG. 25A with the brightness and contrast on the regions of the barcode under the targeting bar 3509 being brighter and higher contrast than the regions of the barcode that are not within the targeting bar 3509.

Figure 25B:
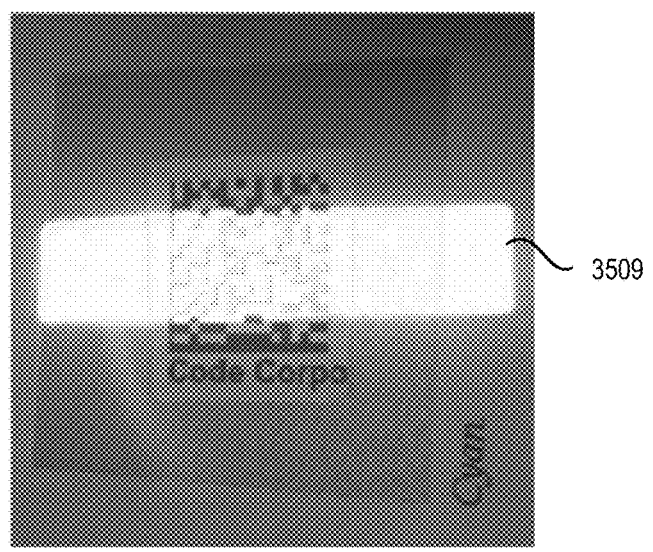
FIG. 25B shows a first channel image.

In the example shown in FIGS. 25A, 25B, 24C, and 24D, the targeting illumination is generated in blue color. However, it should be noted that the embodiments disclosed herein are applicable to targeting illumination of any color. FIG. 25B depicts the first channel image (the blue channel image). In this example, because the blue channel is most sensitive to the targeting illumination when the targeting illumination is filtered by a band-pass filter passing mostly blue illumination, the targeting bar 3509 within the first channel image is extremely bright and saturated, exceeding the dynamic range of the A/D converters used for digitizing the image.

FIG. 26 depicts an example of a mobile device attachment 110 (shown as a cross section of an encapsulating attachment) that includes illumination elements for optimizing illumination for barcode-reading. The mobile device 18 includes a white light source 84. The attachment 110 may include a light pipe 210 that redirects white illumination 212 provided by the white light source 84 of the mobile device 18. More specifically, utilizing total internal reflection, the light pipe 210 propagates the white illumination 212 in a direction parallel to the back surface 74 of the mobile device 18 towards one or more illumination emanating structures 218a, 218b which are displaced from the white light source 84 within the plane defined by the back surface 74 of the mobile device 18.

Each illumination emanating structure 218a, 218b redirects at least a portion of the white illumination 212 propagating through the light pipe 210 towards a barcode 142 present within the target area 140 as exposure illumination 216a, 216b. Each emanating structure 218a, 218b may include any permutation of the prism 148a, 148b (not shown in FIG. 26 but discussed with respect to FIG. 22B), collimating lens 150a, 150b (not shown in FIG. 26 but discussed with respect to FIG. 22B), pattern-generating surface 152a, 152b (not shown in FIG. 26 but discussed with respect to FIG. 22B), and one or more filters 214a, 214b. The one or more filter(s) 214a, 214b may include: i) a narrow band filter (e.g. a single-color filter passing a single color of illumination such as red, blue, or another color); ii) a low pass filter passing all color bands below a predetermined wavelength; and/or iii) a high pass filter passing all color bands above a predetermined wavelength. When the one or more filters 214a, 214b are a narrow band filter (e.g. a single color filter), the exposure illumination 216a, 216b may be a single color (e.g., red, blue, or another single color). The redirection of illumination by the illumination emanating structures 218a, 218b may occur by reflection from a chamfered end of the light pipe 210 positioned directly below the illumination emanating structures 218a, 218b.

In some embodiments, the light pipe 210 and the illumination emanating structures 218a, 218b may be configured (positioned) such that the exposure illumination 216a, 216b is offset from the camera's photo sensor 42 (in the plane defined by the back surface 74 of the mobile device 18) in order to prevent glare. In other words, the exposure illumination 216a, 216b may be directed toward the target area 140 from locations that are not directly in front of the camera's photo sensor 42.

FIG. 26 depicts just one example of a supplementary exposure illumination system as a component of the barcode-reading enhancement system for a mobile device. Other supplementary exposure illumination systems may include any of the optic elements (including illumination-generating LEDs) which form a direct bright field illumination system, a diffuse bright field illumination system, and a dark field illumination system as described in U.S. patent application Ser. No. 14/510,341, entitled "DIFFUSE BRIGHT FIELD ILLUMINATION SYSTEM FOR A BARCODE READER," filed on Oct. 9, 2014, and commonly assigned with the present application. The content of the Ser. No. 14/510,341 application is hereby incorporated by reference in its entirety. It should further be appreciated that the supplementary exposure illumination systems utilizing the optic elements of the direct bright field illumination system, the diffuse bright field illumination system, and the dark field illumination system from the Ser. No. 14/510,341 application may further utilize the corresponding illumination sources in conjunction with such optics.

The attachments described herein may include a supplementary optic system as a component of the barcode-reading enhancement system for a mobile device. An "optic system" may be any set of one or more components positioned in the field of view 38 of a camera assembly 36 to modify one or more parameters regarding the light received by the camera, such as the quantity of the light received, the optical pathway along which the light is received, the angular size of the field of view, the depth of field, the focus distance, the f-number, and/or the wavelength(s) of the light received. Thus, an optic system, in various components, may include any of various components such as lenses, filters, mirrors, apertures, and the like. Stated another way, the one or more optical elements within the field of view 38 of the camera assembly 36, in combination with the lens assembly 40 of the camera, define a barcode-reading optic system (the combination) which provides superior barcode-reading capabilities over the lens assembly 40 alone.

FIGS. 27A and 27B depict examples of a mobile device attachment 110 (shown as a mounted attachment) that includes a supplementary lens system that includes permutations of: i) one or more lens(es) 200; ii) optical filter(s) 204; and iii) an aperture 202.

The aperture 202 limits the amount of light that reaches the camera's photo sensor 42 through the camera's lens assembly 40. More specifically, the aperture 202 may be an aperture within an opaque barrier material which defines the aperture (f-number) of the supplementary lens system and, when part of the barcode-reading optic system, may define the optical aperture (f-number) of the barcode-reading optical system.

The aperture of the barcode-reading optical system, as defined by the aperture 202, may provide for an increased depth of field (e.g. a system depth of field) over the depth of field provided by the lens assembly 40. With increased depth of field, an image on the photo sensor 42 sufficiently sharp (focused) for barcode-reading may be achieved without the need for autofocusing and therefore the decode response time may be improved because the barcode-reading process does not require a time-consuming autofocusing step.

The one or more lens(es) 200 may alter the field of view 38 of the camera assembly 36 and/or magnification of the camera assembly 36 (e.g. provide a system field of view 207 that is different from the field of view 38 of the camera assembly 36).

The one or more filter(s) 204 may include: i) a narrow band filter (e.g. a single-color filter passing a single color of illumination such as red, blue, or another color); ii) a low pass filter passing all color bands below a predetermined wavelength; and/or iii) a high pass filter passing all color bands above a predetermined wavelength.

For example, it may be desirable to capture predominantly light of a relatively narrow segment of the visible portion of the electromagnetic spectrum, such as red light with a wavelength of approximately 660 nm. The filter 204 may thus have a colored tint and/or polarization with a narrow wavelength band desired for image capture for effective barcode decoding.

As mentioned previously, the parameters of the camera assembly 36, such as the angular size of the camera field of view 38, the range of focus depths, and the depth of field of the camera assembly 36 may not be ideal for barcode capture and/or decoding. Thus, any or all of these parameters may be modified by the optic system of the attachment. Thus, the system field of view 207 may have an angular size that is significantly smaller than the angular size of the camera field of view 38. This may be because conventional photography often uses a wider lens angle than is needed for capturing barcode images.

The system field of view 207 may provide a system ratio of focal length to entrance pupil diameter that is greater than a camera ratio of focal length to entrance pupil diameter of the unmodified optic system of the camera assembly 36 such that the optic system of the attachment acts to increase the f-stop of the camera lens assembly 40.

Further, the mobile device 18 and the optic system of the attachment 100, combined, may have a depth of field (not shown), consisting of the depth along the system optical pathway 205 through which an object may remain in focus (to a degree acceptable for barcode capture and/or decoding) on either side of the system focus depth. A relatively large depth of field may advantageously permit barcode capture and/or decoding at a wider range of distances between the mobile device 18 and the barcode to be captured. Thus, the attachment lens may advantageously provide a relatively larger depth of field, particularly at shorter focus depths, than the camera assembly 36, unaided.

The system field of view 207 may be centered on a system optical pathway, which may be the same as the optical pathway 205 for the camera assembly 36 without the attachment. More specifically, the camera assembly 36 may be designed to capture images centered on an optical pathway 205 perpendicular to the back surface 74 of the mobile device 18. In certain embodiments this optical pathway is not modified by the attachment; thus, the system optical pathway 205 may be the same as the optical pathway for the camera assembly 36. In other embodiments, an attachment may provide a different optical pathway for barcode scanning, as will be shown and described with respect to FIGS. 27C and 27D.

FIG. 27C depicts an example of a mobile device attachment 110 (shown as a mounted attachment) that includes a mirror 220 that changes the optical path of illumination (i.e. reflected light) 222 reflected from the barcode to the mobile device 18 from a direction that is generally parallel to the face surface 73 and the back surface 74 of the mobile device 18 to a direction that is generally orthogonal to the lens assembly 40 and the photo sensor 42 of the camera assembly 36 of the mobile device 18.

The attachment 110 permits a user of the mobile device 18 to attempt to read a barcode 142 positioned within a field of view that is beyond the top edge 78 of the mobile device by aiming the top side (the top edge 78) of the mobile device 18 at the barcode 142. The reflected light 222 reflected from the barcode 142 is redirected by the mirror 220 toward the mobile device's focusing lens assembly 40, which focuses the reflected light 222 onto the photo sensor 42.

Stated another way, the field of view 38 of the camera assembly 36 would have a center line that is generally orthogonal to the planar back surface 74 of the mobile device 18 (and orthogonal to the planar display on the face surface 73 of the mobile device 18) and that extends towards a target area 140 from the back surface 74 of the mobile device 18. The mirror 220 is within such a field of view and folds the field of view such that its center line is parallel to the back surface 74 of the mobile device 18 (and the display on the face surface 73 of the mobile device 18) and extends towards a target area 140 from the top side of the mobile device 18.

In the depicted example, the mirror 220 is positioned so that the reflected light 222 is redirected by 90°. Alternatively, the mirror 220 may be positioned so that the reflected light 222 is redirected by a different angle. For example, FIG. 27D depicts a mirror 220 positioned so that the reflected light is redirected by an angle 221 between 30 and 60 degrees from perpendicular to the back surface 74.

It should be appreciated that, although not depicted in either FIG. 27C or 27D, the attachment 110, in addition to including the mirror 220 to redirect the reflected light 222, may further include any permutation of optic components discussed with respect to FIGS. 27A and 27B for purposes of altering one or more of the depth of field, the f-number, the angle of the field of view, or the focal plane of the lens assembly 40 of the camera assembly 36. Such optic components may be located within the region 224a of the attachment 110 or the region 224b of the attachment 110.

Figure 28A:
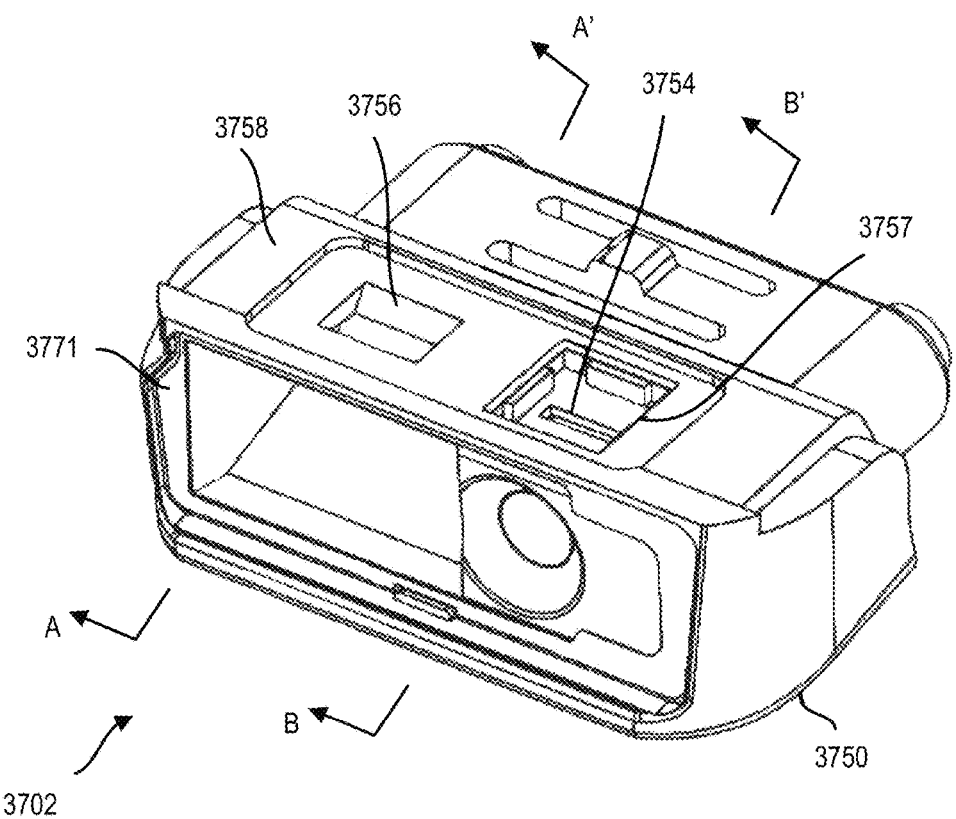
FIGS. 28A and 28B are an assembled view and an exploded view of an optics module, respectively.
Figure 28B:
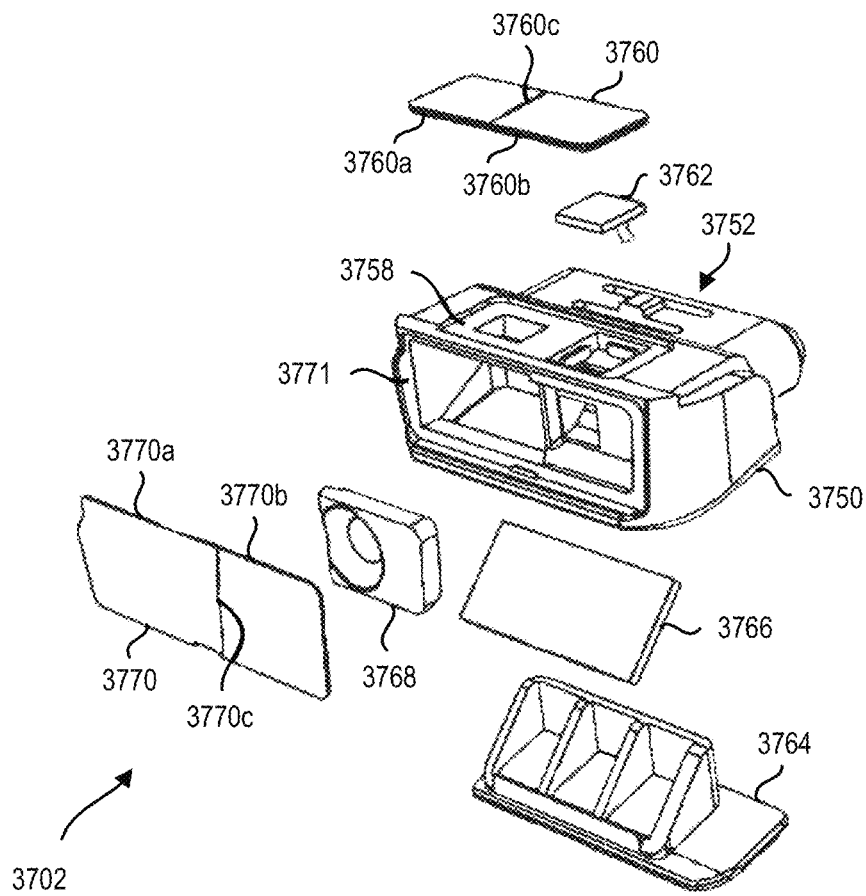
Figure 29A:
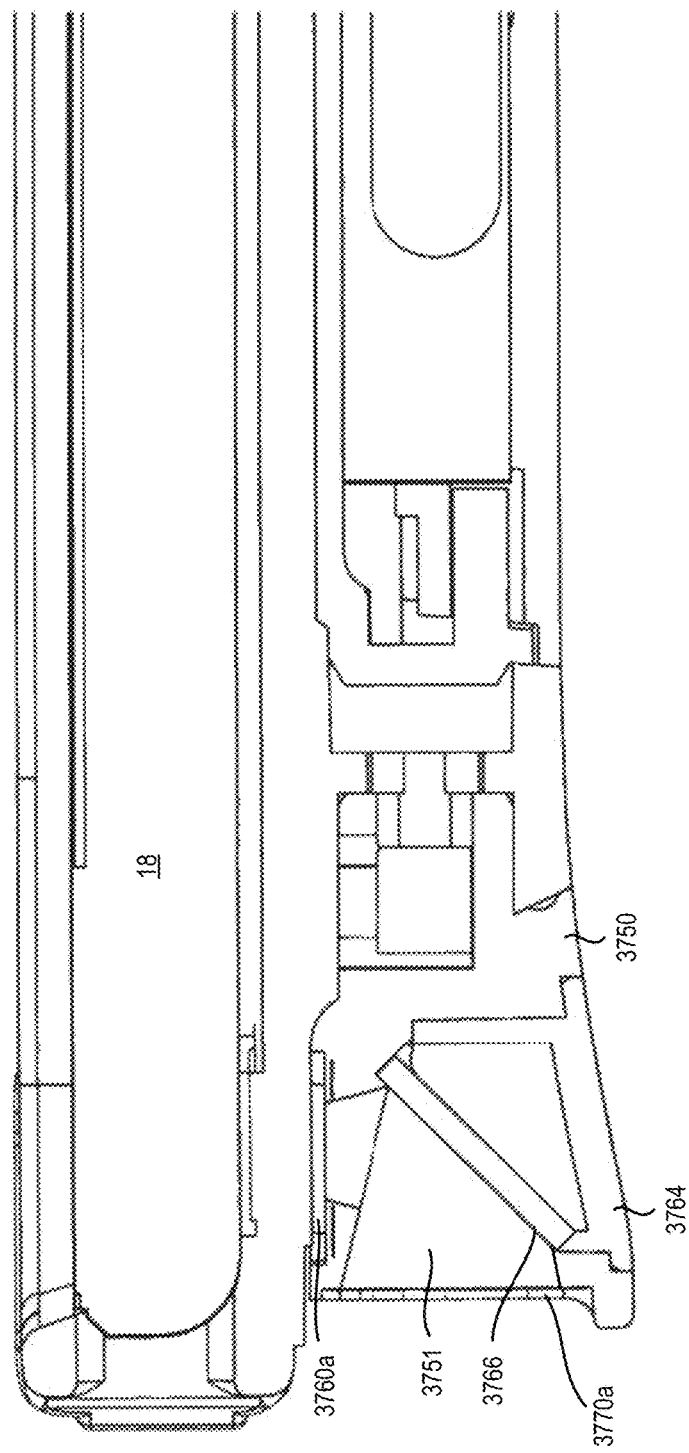

FIGS. 28A and 28B are an assembled view and an exploded view of the optics module 3702, respectively. FIGS. 29A and 29B are cross-sectional views of the optics module 3702 along the A-A' and B-B' sections (shown in FIG. 28A), respectively.

Referring to FIGS. 28A, 28B, 29A, and 29B, the optics module 3702 is explained in detail. The optics module 3702 includes a chassis 3750. The chassis 3750 includes a sliding structure (not shown) for engaging with the track 3704 and permitting sliding in the direction of the track 3704 but preventing the optics module 3702 from being removed from the track 3704 (i.e., the sliding structure restricts movement in any direction other than the direction of the track 3704). The chassis 3750 includes a cavity 3751 in which a mirror support 3764, a mirror 3766 (i.e., a reflective surface), a collimating lens 3768, and/or a filter 3762 are accommodated. The mirror support 3764 holds the mirror 3766 within the field of view of the camera assembly 36 and the field of illumination of the white light source 84 of the mobile device 18. In an embodiment, the mirror support 3764 may hold the mirror 3766 at a 45 degree angle with respect to the optical axis of the camera assembly 36 of the mobile device 18. The chassis 3750 may include an aperture 3756, 3757 which may extend around the periphery of the field of view of the camera assembly 36 and the field of illumination of the white light source 84, respectively. Through the aperture 3756, 3757 the field of view of the camera assembly 36 and the field of illumination of the white light source 84 may extend into the optics module 3702 when the optics module 3702 is in the active position.

To prevent dirt and debris from accumulating on the mirror 3766 and other components, the interior (e.g., the cavity 3751) of the optics module 3702 may be sealed with a clear top window 3760 and a clear front window 3770. In other words, the optics module 3702 may comprise a sealed enclosure. The top window 3760 may sit within a top recess 3758 of the chassis 3750. The front window 3770 may sit within a front recess 3771 of the chassis 3750.

The top window 3760 to the sealed enclosure may be generally parallel to the back surface 74 of the mobile device 18. Through the top window 3760, the illumination from the white light source 84 enters the sealed enclosure (e.g., via the cavity 3751) and the illumination from the target area (e.g., the light reflected from the target area including a barcode presented in the target area) exits the sealed enclosure and is incident on the camera assembly 36. The front window 3770 to the sealed enclosure may be generally perpendicular to the back surface 74 of the mobile device 18. Through the front window 3770, the illumination from the white light source 84 exits the sealed enclosure to the target area and the illumination from the target area enters the sealed enclosure and is incident on the mirror 3766.

The top window 3760 may comprise a first window portion 3760a and a second window portion 3760b. The first window portion 3760a may lie in the field of view of the camera assembly 36 and the second window portion 3760b may lie in the field of illumination of the white light source 84 of the mobile device 18. To prevent illumination from the white light source 84 of the mobile device 18 from affecting the image captured by the camera assembly 36, a baffle component 3760c (e.g., an optical barrier) may separate the first window portion 3760a and the second window portion 3760b. Because of the baffle component 3760c, the illumination from the white light source 84 projected through the second window portion 3760b does not, by total internal reflection, propagate to the first window portion 3760a and affect the image captured by the camera assembly 36.

The front window 3770 may comprise a first window portion 3770a and a second window portion 3770b. The first window portion 3770a may lie in the field of view of the camera assembly 36 and the second window portion 3770b may lie in the field of illumination of the white light source 84 of the mobile device 18. To prevent illumination from the white light source 84 of the mobile device 18 from affecting the image captured by the camera assembly 36, a baffle component 3770c (e.g., an optical barrier) may separate the first window portion 3770a and the second window portion 3770b. Because of the baffle component 3770c, the illumination from the white light source 84 projected through the second window portion 3770b does not, by total internal reflection, propagate to the first window portion 3770a and affect the image captured by the camera assembly 36.

Alternatively, the top window 3760 and the front window 3770 may comprise two separate windows, respectively. The cavity 3751 may also be separated with a barrier or a wall.

The optics module 3702 may include a collimating optic within the field of illumination of the white light source 84. The collimating optic is for forming the illumination from the white light source 84 to project a targeting illumination pattern to the target area when the optics module 3702 is in an active position. The collimating optic may comprise a collimating lens 3768 and an aperture 3754.

For purposes of using the white light source 84 of the mobile device 18 to generate a targeting illumination pattern, the chassis 3750 may include a rectangular-shaped aperture 3754 that restricts the field of illumination of the white light source 84 of the mobile device 18 to a shape that is generally rectangular and within the center of the field of illumination. The restricted rectangular field of illumination may be incident on the mirror 3766 and folded towards the target area. A collimating lens 3768 collimates the rectangular field of illumination to a sharp rectangle that is visible on a surface positioned within the target area.

The collimating optic may further include a filter 3762 for passing a limited spectrum of the illumination emitted by the white light source 84 whereby the targeting illumination pattern, when incident on a surface, appears a color of the limited spectrum. The filter 3762 may be a low pass filter, a band pass filter, a high pass filter, or any type of filter. The filter 3762 (e.g., a blue-colored narrow band filter) may be positioned within the field of illumination of the white light source 84 of the mobile device 18 (e.g., on the top of the chassis 3750 under the top window 3760) such that the targeting illumination visible within the target area may be primarily the color passed by the filter 3762 (e.g., the blue-colored illumination).

The collimating lens 3768 may be positioned on the front of the mirror 3766 behind the front window 3770. Alternatively, the collimating lens 3768 may be positioned between the top window 3760 and the mirror 3766. Alternatively, the collimating lens 3768 may be positioned between the mirror 3766 and the front window 3770.

As discussed, it is useful to be able to capture an image and decode the barcode while the targeting illumination remains on. However, the targeting illumination may be primarily a single color, and may be much brighter than areas adjacent to the rectangular field of targeting illumination. In addition, the size and shape of the rectangular field of targeting illumination may not be sufficient to illuminate an entire barcode. Image processing may be used to minimize those effects.

FIGS. 30A, 30B, 30C, and 30D depict additional examples of attachments which may be, or form, a part of the barcode-reading enhancement system for a mobile device. Although each attachment depicted in FIGS. 30A, 30B, 30C, and 30D is depicted in one of the general structures described with respect to FIG. 7, 8, 9A, 9B, 10A, or 10B, the arrangement of target-generating mechanisms, supplementary illumination systems, and supplementary optic systems described above with respect to FIGS. 22A, 22B, 23A-23D, 26, and 27A-27D may be utilized in any of the general structures.

Further as described with respect to FIGS. 27A and 27B, any permutation of the optics described with respect to FIGS. 27A and 27B may be positioned within the first chamber 232 for purposes of altering one or more of the depth of field, the f-number, the angle of the field of view, or the focal plane of the lens assembly 40 of the camera assembly 36.

The target-generating mechanism may include a second mirror 234, within a second chamber 236, generally parallel to the first mirror 220, but aligned with the white light source 84 on the back surface 74 of the mobile device 18, and may fold the illumination from the white light source 84 (by the same angle at which the first mirror 220 folds the field of view of the camera assembly 36) towards the target area 140 extending from the top edge 78 of the mobile device 18. The first chamber 232 may be separated from the second chamber 236 by an opaque wall or baffle to prevent illumination within the second chamber being incident on the first mirror 220 and reflected by the first mirror 220 onto the lens assembly 40 of the camera assembly 36 and thereby degrading the image quality of an image of a barcode 142 within the target area 140.

The target-generating mechanism may further include any of the target-generating structures 136 described with respect to FIGS. 22A and 22B for forming and projecting the targeting beams 138 of a distinct illumination pattern into the target area 140.

FIGS. 30A, 30B, 30C and 30D represent an attachment 110 (shown as an encapsulating attachment) with a target-generating structure 136 that may be repositioned and used for any embodiment described herein where the white light source 84 of the mobile device 18 provides illumination for the target-generating structure 136 (which as discussed with respect to FIG. 7D may also be the exposure illumination system). The repositionable target-generating structure 136 is useful for uses of the mobile device 18 where, in addition to utilizing the white light source 84 and the camera assembly 36 for barcode-reading, the white light source 84 and the camera assembly 36 are used for traditional photography.

Figure 30A:
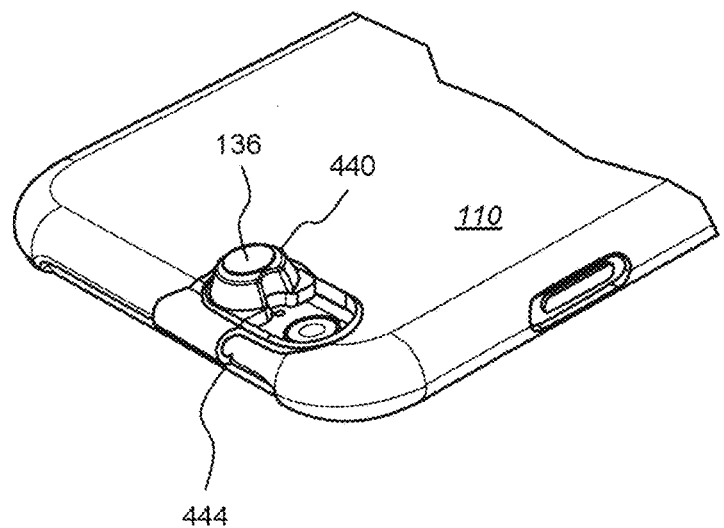
FIGS. 30A-30D illustrate an exemplary attachment for a barcode-reading enhancement system which includes a target-generating mechanism.
Figure 30B:
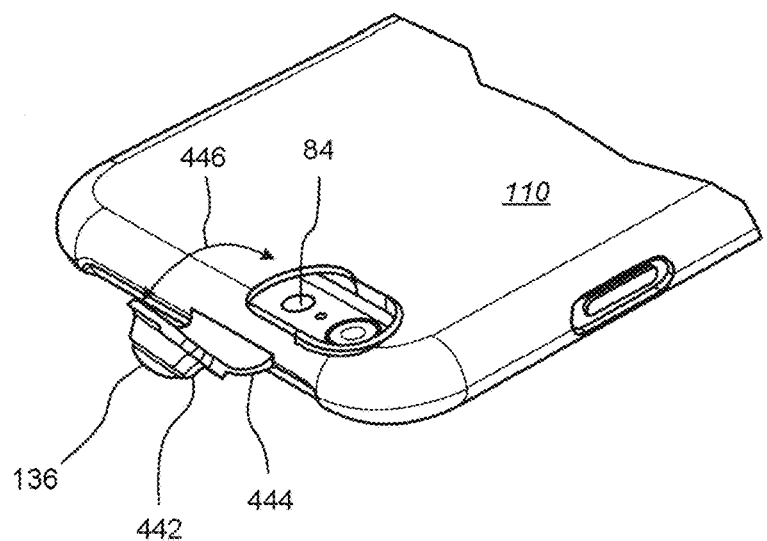

FIGS. 30A and 30B depict the target-generating structure 136 as being pivotally repositionable between: i) a first position 440 as depicted in FIG. 30A wherein the target-generating structure 136 is positioned in front of the white light source 84 (i.e. an illuminating torch) such that illumination from the white light source 84 is shaped by the target-generating structure 136 into a distinct targeting illumination pattern; and ii) a second position 442 as depicted in FIG. 30B wherein the target-generating structure 136 is positioned outside of the illumination field of the white light source 84 such that the illumination from the white light source 84 is unmodified by the target-generating structure 136 and can be used for illumination when using the camera assembly 36 of the mobile device 18 to take photographic pictures.

As depicted in FIGS. 30A and 30B, the target-generating structure 136 may be secured to the attachment 110 by a flexible band 444 such that the target-generating structure 136 may be pivoted in the direction 446 between position 440 and position 442 by flexure of the flexible band. It is also envisioned that a more traditional hinge/hinge pin structure may also provide for pivoting the target-generating structure 136 between position 440 and position 442 in alternative embodiments.

Figure 30C:
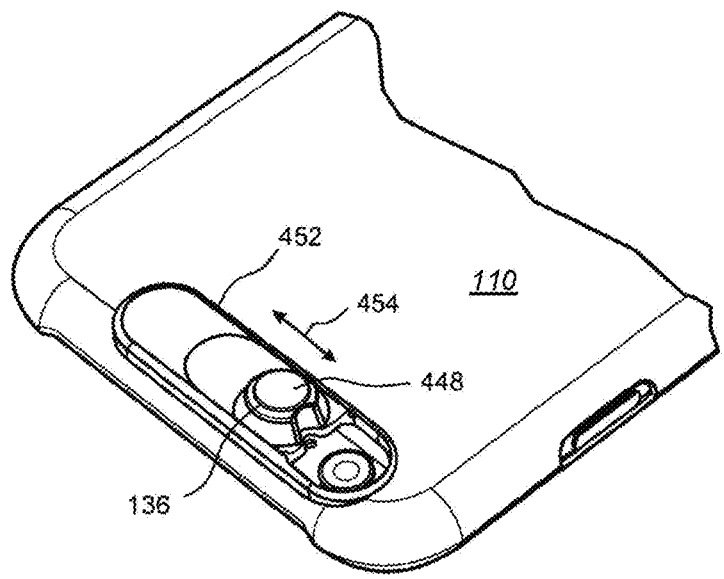
Figure 30D:
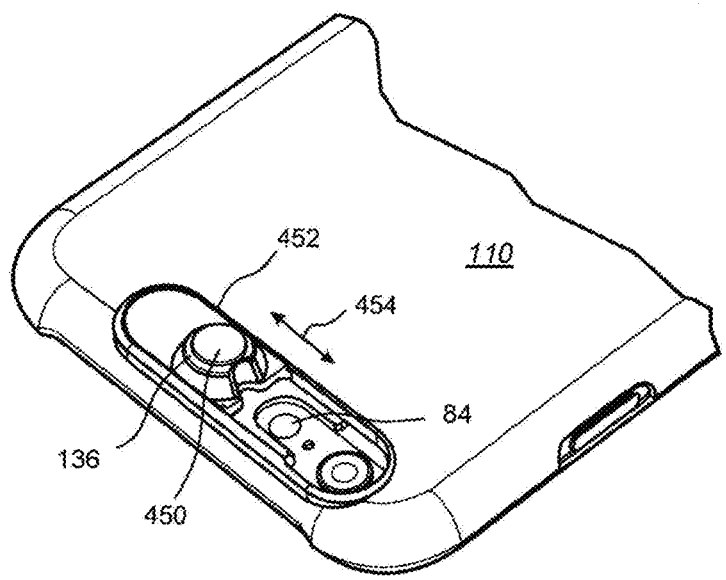

FIGS. 30C and 30D depict the target-generating structure 136 being laterally repositionable between: i) a first position 448 as depicted in FIG. 30C wherein the target-generating structure 136 is positioned in front of the white light source 84 (i.e. an illuminating torch) such that the illumination from the white light source 84 is shaped by the target-generating structure 136 into a targeting pattern; and ii) a second position 450 as depicted in FIG. 30D wherein the target-generating structure 136 is positioned outside of the illumination field of the white light source 84 such that the illumination from the white light source 84 is unmodified by the target-generating structure 136 and can be used for illumination when using the camera assembly 36 of the mobile device 18 to take photographic pictures. As depicted in FIGS. 30C and 30D, the target-generating structure 136 may be secured to the attachment 110 within a channel 452 such that the target-generating structure 136 may be laterally repositioned in the direction 454 between position 448 and position 450.

Figure 31A:
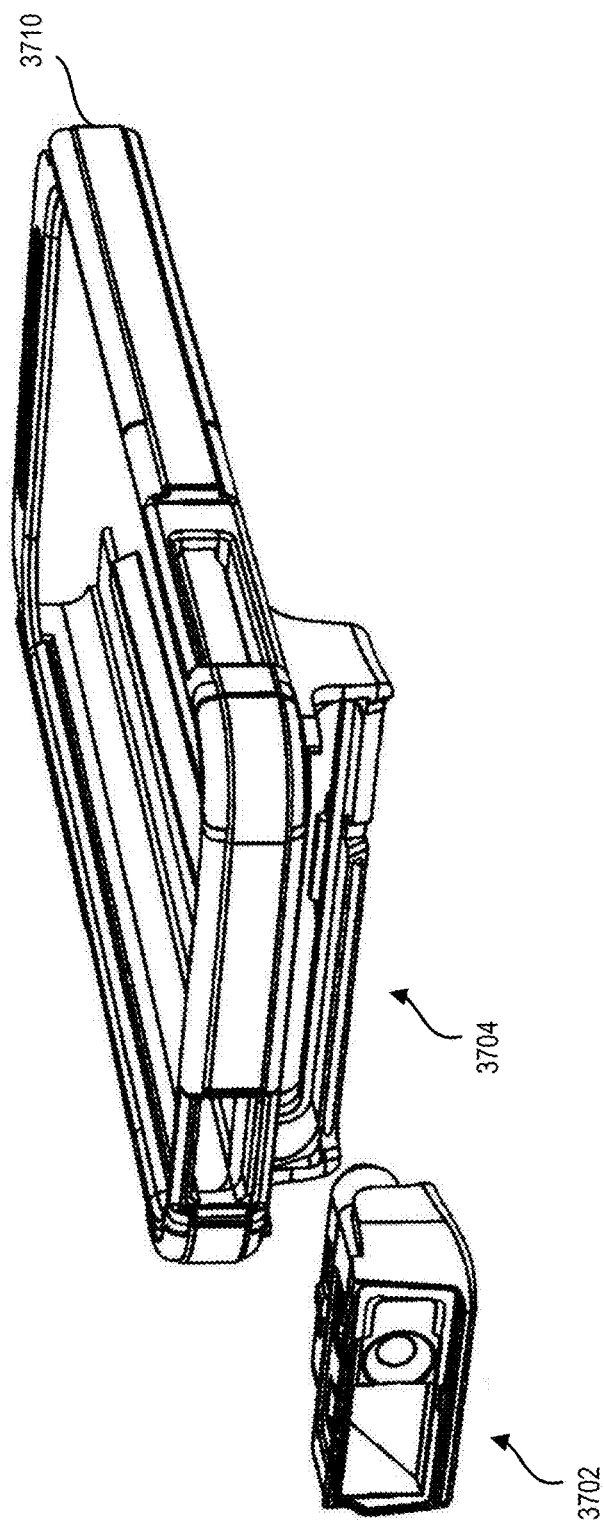
FIG. 31A depicts an encapsulating attachment in accordance with another embodiment.
Figure 31B:
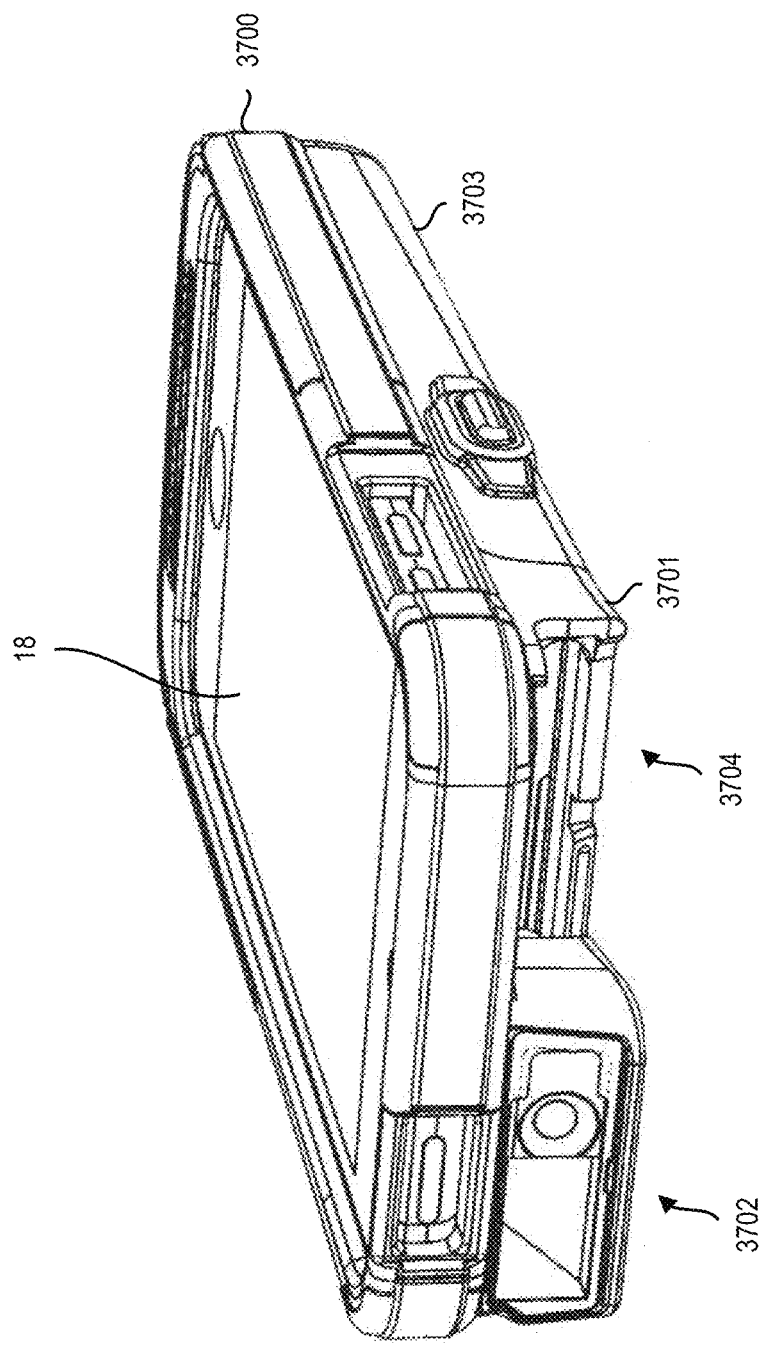
FIGS. 31B-31D depict a perspective view of a mobile device encapsulated within an encapsulating attachment in accordance with one embodiment.
Figure 31C:
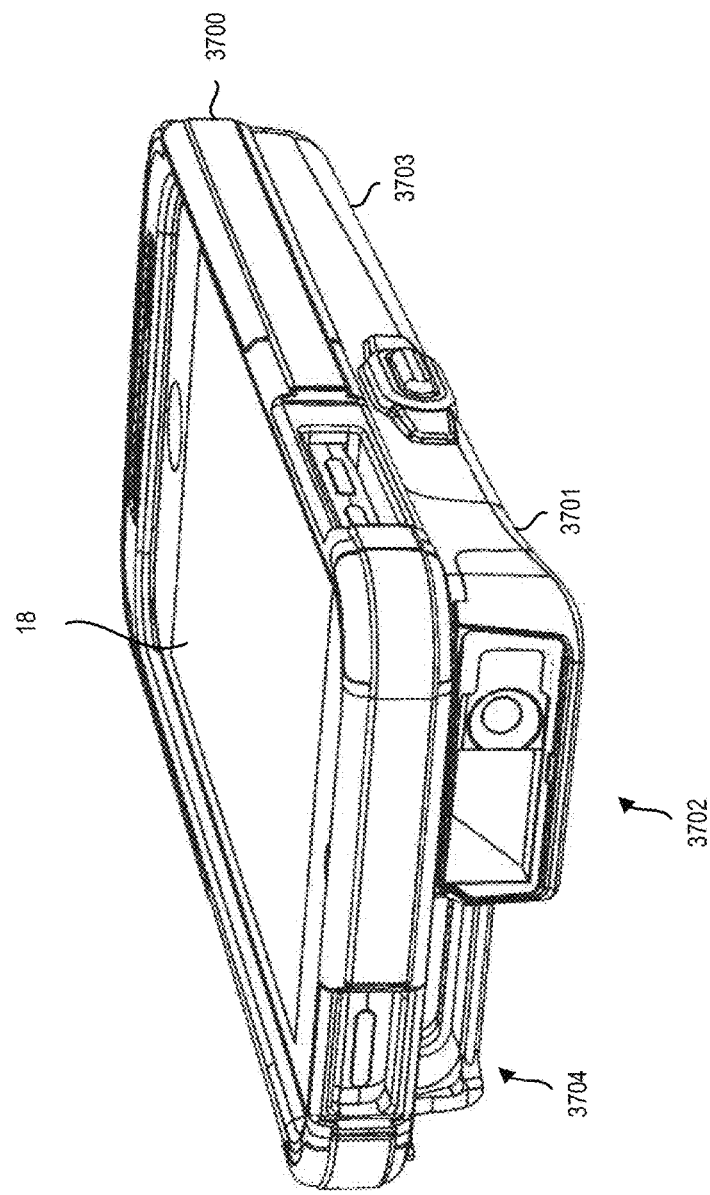

FIG. 31B depicts a perspective view of a mobile device 18 encapsulated within an encapsulating attachment 3700. The encapsulating attachment 3700 may encapsulate the mobile device 18 as described with respect to FIGS. 9A, 9B, 30A, 30B, 30C, and 30D. Alternatively, the encapsulating attachment 3700 may be a combination of an outer case and an inner carriage (or a handle assembly with an encapsulating case) as described with respect to FIGS. 11, 12A, 12B, 13, 14, 15, 16, 17, 18, 19, 20, and 21. The encapsulating attachment 3700 is used as a barcode-reading enhancement accessory (which may be simply referred to as an "accessory") to enhance a barcode-reading capability of a mobile device 18. The barcode-reading enhancement accessory and a barcode-reading application that may be downloaded from a remote server into the mobile device 18 and executed by a processor of the mobile device 18 may comprise a barcode-reading system. FIGS. 31B-31D and 38 do not show the details of the mobile device 18, but the mobile device 18 may be similar to the one depicted in FIGS. 2A-2C wherein a camera assembly 36 (including a lens assembly 40) and a white light source 84 are positioned, for example, near the upper left side of the back surface 74 of the mobile device 18.

The encapsulating attachment 3700 includes an optics module 3702 which folds both the field of view 38 of the camera assembly 36 of the mobile device 18 and the field of illumination of the white light source 84 of the mobile device 18 similar to the folded field of view and/or folded field of illumination described with respect to FIGS. 27C, 27D, 13, 16, 17, and 21. A barcode to be read is presented in the target area which is located around the top side of the mobile device 18.

The optics module 3702 is moveable with respect to the body 3701 of the encapsulating attachment 3700 such that the optics module 3702 may be repositionable between: i) a first position (i.e., an active position) where the optics module 3702 is positioned within the field of view of the camera assembly 36 of the mobile device 18 and the field of illumination of the white light source 84 of the mobile device 18; and ii) a second position (i.e., an inactive position) where the optics module 3702 is positioned outside of both the field of view of the camera assembly 36 of the mobile device 18 and the field of illumination of the white light source 84 of the mobile device 18. The field of view of the camera assembly 36 and the field of illumination of the white light source 84 may be unobstructed by the optics module 3702 in the second position.

The encapsulating attachment 3700 may include an aperture (not shown) extending around a periphery of both the field of view of the camera assembly 36 and the field of illumination of the white light source 84. Through the aperture, the field of view of the camera assembly 36 and the field of illumination of the white light source 84 may extend to be incident on the optics module 3702 when the optics module 3702 is in the first position, and the field of view and the field of illumination may extend beyond the back side of the mobile device 18 when the optics module 3702 is in the second position.

The optics module 3702 may be movable between the first position and the second position by sliding the optics module 3702 within a track 3704 (e.g., a linear track) formed in the body 3701 of the encapsulating attachment 3700, for example, in a way similar to that described with respect to FIGS. 30A, 30B, 30C, 30D.

FIG. 31B depicts that the optics module 3702 is in the first position such that the optics module 3702 is in the field of view of the camera assembly 36 and the field of illumination of the white light source 84 of the mobile device 18. FIG. 31B depicts that the optics module 3702 is in the second position such that the field of view of the camera assembly 36 of the mobile device 18 and the field of illumination of the white light source 84 of the mobile device 18 are unobstructed.

In one embodiment, the direction of the track 3704 and the direction in which the optics module 3702 slides in the track 3704 may be generally parallel to the top edge 78 of the mobile device 18, i.e., the optics module 3702 may slide generally parallel to the top edge 78 from the first position close to the right edge 80 to the second position close to the left edge 82, or vice versa. In another embodiment, the first position and the second position of the optics module 3702 may be displaced from each other in the direction parallel to the right edge 80 and the left edge 82 of the mobile device 18, such that the optics module 3702 may slide between the first position adjacent to the top edge 78 of the mobile device and a second position spaced farther away from the top edge 78 of the mobile device 18, or vice versa. In this embodiment, the track 3704 is generally parallel to the right edge 80 and the left edge 82 of the mobile device 18. This configuration may be useful when the camera assembly 36 and the white light source 84 of the mobile device 18 are positioned near the center of the back surface 74 (e.g. approximately centered between the right edge 80 and the left edge 82 of the mobile device 18).

The encapsulating attachment 3700 may include systems including attachment control circuitry 270, a trigger circuit 161, a battery 272, 163, a user control 288 to initiate the capture of a barcode, a trigger switch 157, links 276a, 276b, and/or a microphone connector 155. In one embodiment, the systems (including the attachment control circuitry 270, the trigger circuit 161, the battery 272, 163, the user control 288, the trigger switch 157, the links 276a, 276b, and/or the microphone connector 155) may be included in a separate detachable package 3703 that may be attached to the encapsulating attachment 3700. Alternatively, the encapsulating attachment 3700 including such systems may be a single piece.

Figure 31D:
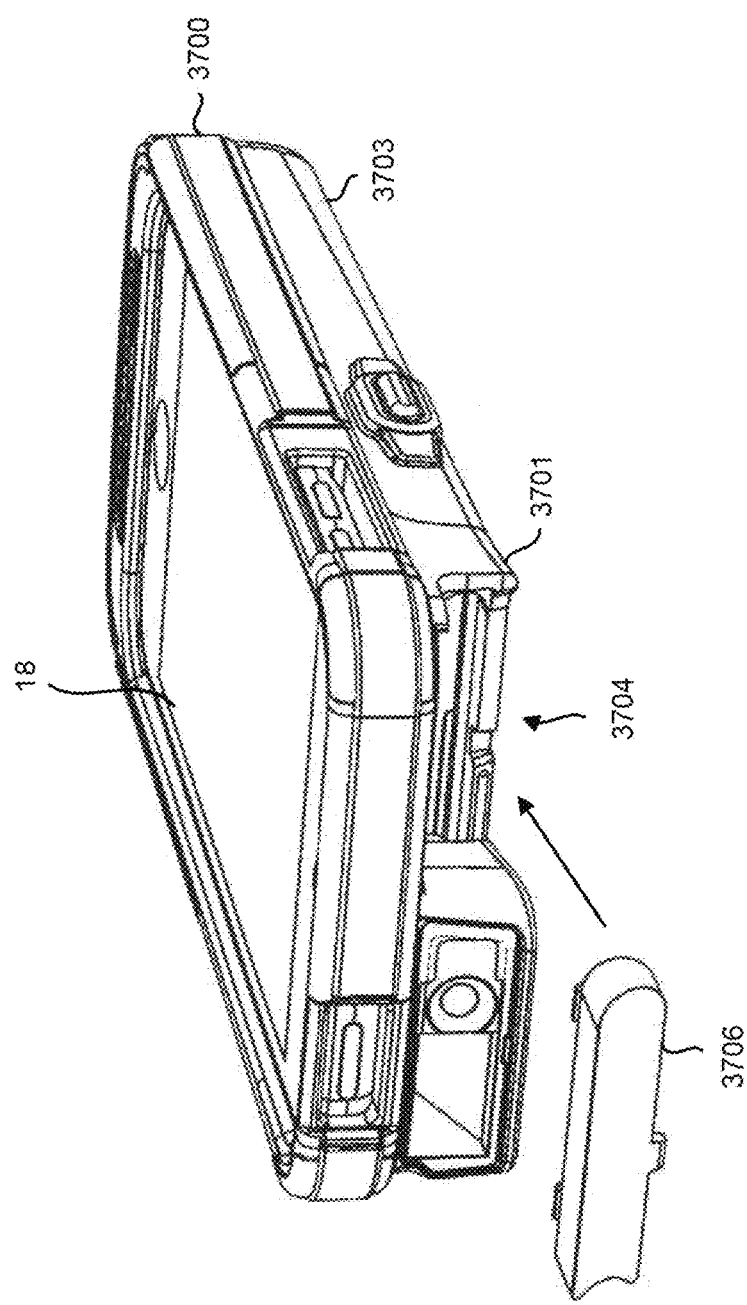

FIG. 31D, like FIG. 31B, depicts the optics module 3702 in the first position. The encapsulating attachment 3700 may include a locking component to lock the optics module 3702 in the first position. For example, the locking component may be a spacer component 3706 which clips into or otherwise engages with the track 3704 and fills the space between the optics module 3702 (when in the first position) and a side edge of the encapsulating attachment 3700 thereby preventing movement of the optics module 3702 when the spacer component 3706 is clipped into the track 3704. Use of the spacer component 3706 also makes the appearance of the encapsulating attachment 3700 more aesthetically pleasing when the optics module 3702 is in the first position.

FIG. 31A shows an alternative encapsulating attachment 3710 without the separate detachable package 3703. Whereas the encapsulating attachment 3700 shown in FIGS. 31B-31D may include systems such as attachment control circuitry 270, a trigger circuit 161, a battery 272, 163, a user control 288 to initiate the capture of a barcode, a trigger switch 157, links 276a, 276b, and/or a microphone connector 155, the encapsulating attachment 3710 shown in FIG. 31A may not include these systems. FIG. 31A depicts the optics module 3702 removed entirely from the track 3704.

As discussed above, a mobile device that includes a camera may be used for reading barcodes. In typical operation, a user may position the mobile device so that the barcode is within the camera's field of view. The user may then provide some type of input (e.g., pressing a button) that is interpreted by a barcode-reading application running on the mobile device as an instruction to read the barcode. This user input may be referred to herein as a read command.

The camera of a mobile device may be capable of capturing video. Some barcode-reading applications may use this capability to read barcodes. In response to receiving a read command, a barcode-reading application may activate the camera to begin capturing video. The barcode-reading application may also include a decoder that is configured to process captured video in order to attempt to decode a barcode.

In some mobile devices, the camera may be configured so that the first few frames of captured video are dark frames, i.e., frames in which all of the pixels are black. As a result, with such mobile devices, the first few frames of captured video may not be useful for decoding. This feature may cause a noticeable and undesirable delay to the process of barcode reading. If the barcode-reading application activates the camera in response to receiving a read command, it may take a significant amount of time before the decoder receives useful video frames. For example, with some known mobile devices, at least the first seven or eight video frames after video capture is started may be dark frames. If it takes approximately 50-60 milliseconds to capture a video frame, then it may take several hundred milliseconds before the decoder receives useful video frames. This may add a delay of several hundred milliseconds to the process of decoding a barcode.

In order to reduce or eliminate this delay, the present disclosure proposes starting video capture at an earlier point in time than in known implementations. For example, it may be desirable to start video capture before a read command is received. It is difficult, however, to know when the video capture should be started. Starting video capture too early also has disadvantages, including unnecessarily draining the mobile device's battery and using too much of the mobile device's storage.

As noted above, some mobile devices include one or more components that are operative to detect motion. Such motion-sensing components may be able to detect acceleration, rotation, angular displacement, tilt, position, orientation, motion along a non-linear (e.g., arcuate) path, or the like. Examples of motion-sensing components include accelerometers, gyroscopes, and magnetometers. The present disclosure proposes to use data from a motion-sensing component within the mobile device to determine when to activate video capture by the camera.

Figure 32:
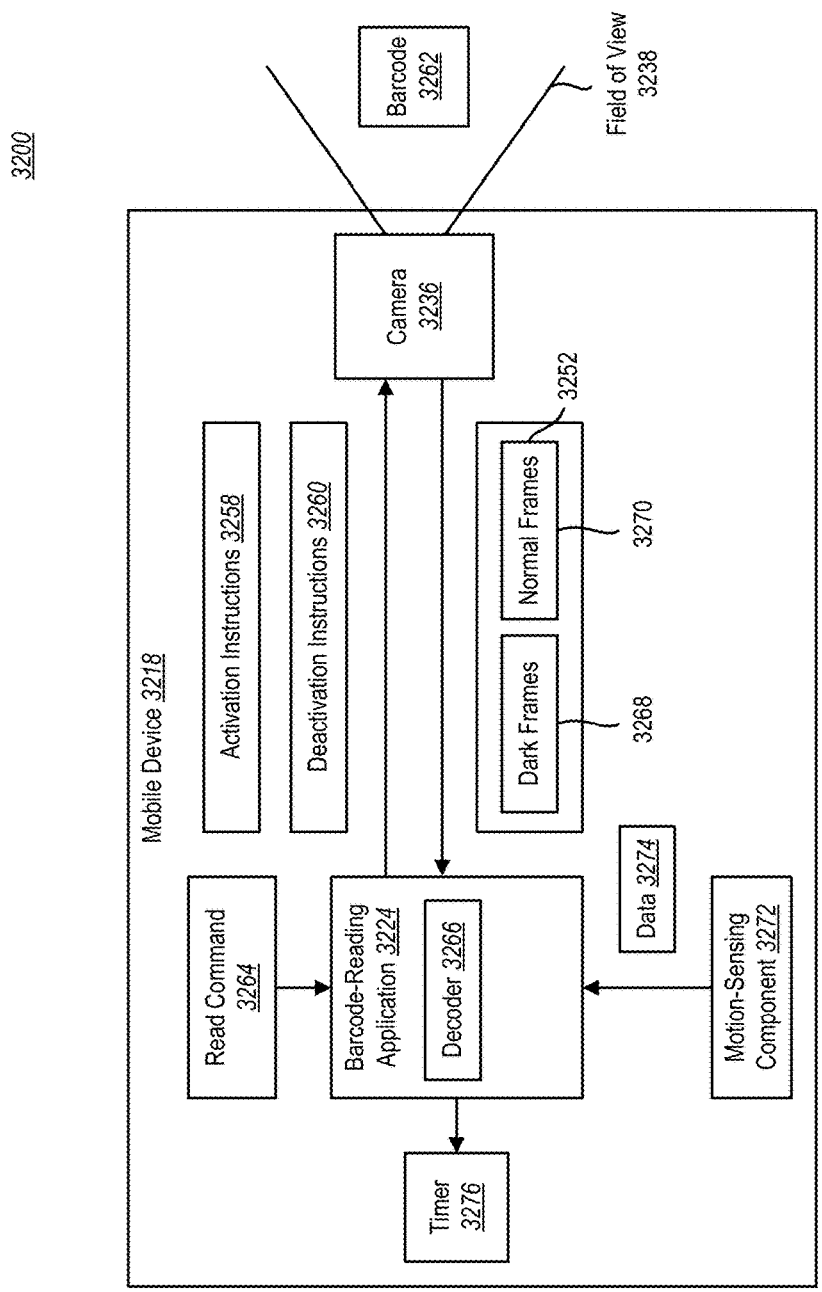
FIG. 32 illustrates a system in which aspects of the present disclosure may be utilized, including a mobile device that comprises a camera, a barcode-reading application, and a motion-sensing component.

FIG. 32 illustrates a system 3200 in which aspects of the present disclosure may be utilized. The system 3200 includes a mobile device 3218. Except as indicated otherwise below, the mobile device 3218 may be configured similarly to the mobile device 18 described previously. For example, the mobile device 3218 may include a camera 3236 that may be configured similarly to the camera assembly 36 described previously, and a barcode-reading application 3224 that may be configured similarly to the barcode-reading application 24 described previously.

Figure 33:
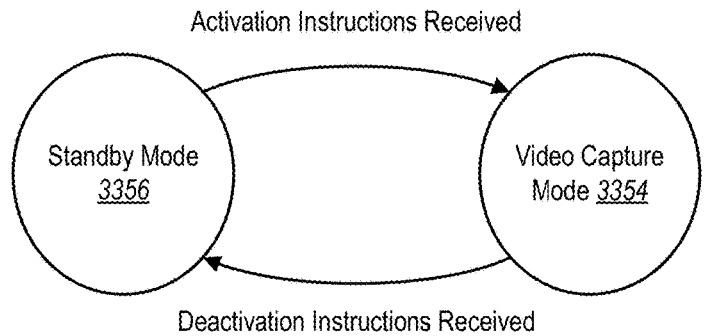
FIG. 33 is a state diagram that illustrates two possible modes of operation for the camera.

The camera 3236 may be capable of capturing video 3252 of objects within the field of view 3238 of the camera 3236. As shown in FIG. 33, there may be at least two possible modes of operation for the camera 3236, namely, a video capture mode 3354 and a standby mode 3356. The camera 3236 may be configured so that it captures video when it is operating in the video capture mode 3354, and does not capture video when it is operating in the standby mode 3356.

Referring again to FIG. 32, the barcode-reading application 3224 (which, for simplicity, may be referred to herein simply as an application 3224) may be configured to activate and deactivate video capture by the camera 3236. For example, the application 3224 may send activation instructions 3258 to the camera 3236 that cause the camera 3236 to transition from the standby mode 3356 to the video capture mode 3354 and begin capturing video. Conversely, the application 3224 may send deactivation instructions 3260 to the camera 3236 that cause the camera 3236 to transition from the video capture mode 3354 to the standby mode 3356 and discontinue capturing video.

When the mobile device 3218 is being used to read a barcode 3262, the user may position the mobile device 3218 so that the barcode 3262 is within the field of view 3238 of the camera 3236. The user may then provide a read command 3264. In response to receiving the read command 3264, the application 3224 may send activation instructions 3258 to the camera 3236. The activation instructions 3258 may cause the camera 3236 to transition from the standby mode 3356 to the video capture mode 3354 and begin capturing video 3252. The application 3224 may include a decoder 3266 that processes the captured video 3252 in order to attempt to decode the barcode 3262.

The camera 3236 may be configured so that the first few frames of captured video 3252 are dark frames 3268. The dark frames 3268 may not be useful for decoding. In other words, it may not be possible to decode the barcode 3262 from the dark frames 3268. Thus, as described above, the presence of the dark frames 3268 in the captured video 3252 may cause a noticeable and undesirable delay to the process of reading a barcode 3262. The dark frames 3268, however, may be followed by normal frames 3270. The normal frames 3270 within the captured video 3252 may include a sequence of images of objects within the field of view 3238 of the camera 3236 (such as the barcode 3262 and possibly other objects as well). Unlike the dark frames 3268, the normal frames 3270 may be useful for decoding. In other words, it may be possible to decode the barcode 3262 by processing the normal frames 3270 (assuming, of course, that the barcode 3262 is within the field of view 3238 of the camera 3236 when the video 3252 is captured and also that the captured video 3252 is of sufficient quality so that the barcode 3262 can be identified therein and decoded).

Ideally, the camera 3236 should be placed in the video capture mode 3354 sufficiently early so that when the read command 3264 is received, most or all of the dark frames 3268 have already been captured and the decoder 3266 can quickly or immediately begin receiving and processing normal frames 3270. At the same time, however, the camera 3236 should not be placed in the video capture mode 3354 too early, because this can cause resources of the mobile device 3218 (like battery power and storage) to be wasted.

The mobile device 3218 may include a motion-sensing component 3272, which may be configured to detect motion of the mobile device 3218. The motion-sensing component 3272 may be configured similarly to the motion-sensing component 72 in the mobile device 18 described previously. In order to reduce or eliminate the delay associated with the dark frames 3268 without unnecessarily wasting resources of the mobile device 3218, the application 3224 may be configured to use data 3274 from the motion-sensing component 3272 to determine whether the camera 3236 should be in video capture mode 3354 or standby mode 3356. For example, the application 3224 may use data 3274 from the motion-sensing component 3272 to determine when the mobile device 3218 is in motion. This may be done periodically, both when the camera 3236 is in standby mode 3356 and also when the camera 3236 is in video capture mode 3354. If the camera 3236 is in standby mode 3356 and the application 3224 determines that the mobile device 3218 is in motion, the application 3224 may under some circumstances cause the camera 3236 to transition into video capture mode 3354. Conversely, if the camera 3236 is in video capture mode 3354 and the application 3224 determines that the mobile device 3218 is not in motion, the application 3224 may under some circumstances cause the camera 3236 to transition into standby mode 3356.

As noted above, the application 3224 may periodically determine when the mobile device 3218 is in motion. The application 3224 may use a timer 3276 to keep track of when particular operations should be performed, as will be discussed in greater detail below.

The techniques described herein related to starting video capture early in order to reduce the delay associated with dark frames 3268 may be used by a mobile device 3218 that has a barcode-reading enhancement accessory secured thereto. Any of the barcode-reading enhancement accessories 2300, 2600, 3000, 3700 described herein may be secured to the mobile device 3218. As described previously, a barcode-reading enhancement accessory may include one or more components that improve the barcode-reading capabilities of the mobile device 3218. It is not necessary, however, for any type of accessory to be secured to the mobile device 3218.

Figure 34:
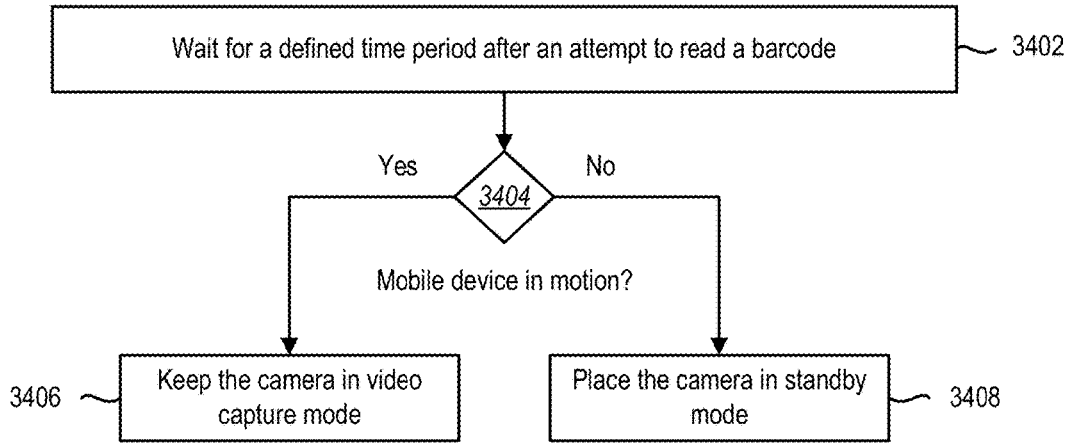
FIG. 34 is a flow diagram illustrating a method that may be performed by a barcode-reading application after a mobile device is used to attempt to read a barcode.

FIG. 34 is a flow diagram illustrating a method 3400 that may be performed by a barcode-reading application 3224 after a mobile device 3218 is used to attempt to read a barcode 3262. In some embodiments, the application 3224 may perform some or all of the operations of the method 3400 after each read attempt (i.e., each attempt that is made to read a barcode 3262 using the mobile device 3218).

When the mobile device 3218 is used to read a barcode 3262, the camera 3236 may be in video capture mode 3354. After attempting to read a barcode 3262, the application 3224 may wait 3402 for a defined time period and then use data 3274 from the motion-sensing component 3272 to determine 3404 whether the mobile device 3218 is in motion. If the application 3224 determines 3404 that the mobile device 3218 is in motion, the application 3224 may keep 3406 the camera 3236 in video capture mode 3354. For example, the application 3224 may refrain from any action that would cause the camera 3236 to change its mode of operation. If the application 3224 determines 3404 that the mobile device 3218 is not in motion, however, the application 3224 may place 3408 the camera 3236 in standby mode 3356. For example, the application 3224 may send deactivation instructions 3260 to the camera 3236.

Figure 35:
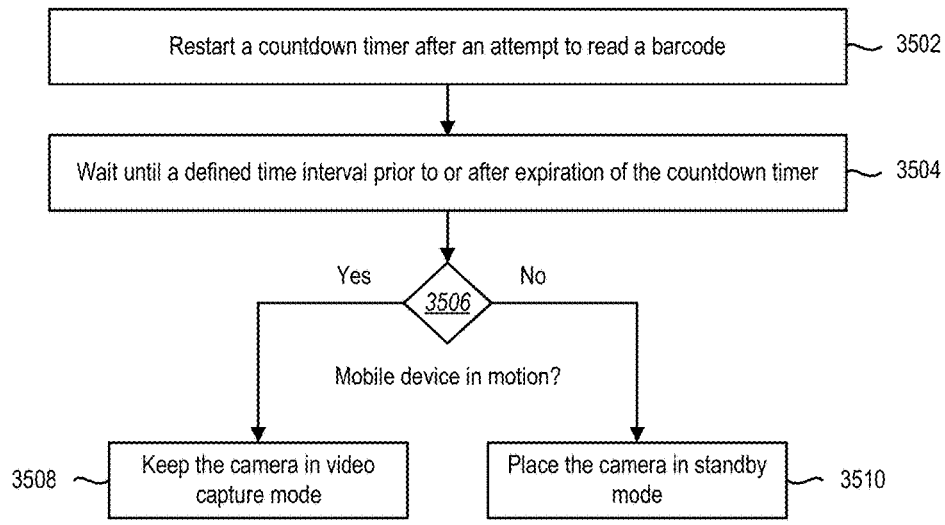
FIG. 35 is a flow diagram illustrating another method that may be performed by a barcode-reading application after a mobile device is used to attempt to read a barcode.

FIG. 35 is a flow diagram illustrating another method 3500 that may be performed by a barcode-reading application 3224 after a mobile device 3218 is used to attempt to read a barcode 3262. The method 3500 shown in FIG. 35 may be considered to be a more detailed implementation of the method 3400 shown in FIG. 34. In some embodiments, the application 3224 may perform some or all of the operations of the method 3500 after each attempt that is made to read a barcode 3262 using the mobile device 3218.

As noted above, when the mobile device 3218 is used to read a barcode 3262, the camera 3236 may be in video capture mode 3354. After attempting to read a barcode 3262, the application 3224 may restart 3502 a timer 3276. The timer 3276 may be a countdown timer 3276, i.e., the timer 3276 may be configured to count down. The application 3224 may wait 3504 until a defined time interval prior to or after expiration of the countdown timer 3276, at which point the application 3224 may determine 3506 whether the mobile device 3218 is in motion. If the application 3224 determines 3506 that the mobile device 3218 is in motion, the application 3224 may keep 3508 the camera 3236 in video capture mode 3354. If, however, the application 3224 determines 3506 that the mobile device 3218 is not in motion, the application 3224 may place 3510 the camera 3236 in standby mode 3356.

Figure 36:
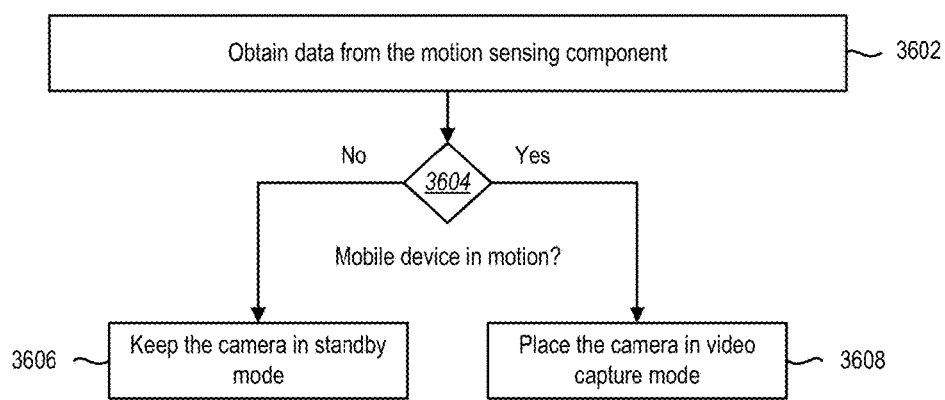
FIG. 36 is a flow diagram illustrating a method that may be performed by a barcode-reading application when a camera is in standby mode.

FIG. 36 is a flow diagram illustrating a method 3600 that may be performed by a barcode-reading application 3224 when the camera 3236 is in standby mode 3356. In some embodiments, the application 3224 may perform some or all of the operations of the method 3600 periodically whenever the camera 3236 is in standby mode 3356.

The application 3224 may obtain 3602 data 3274 from the motion-sensing component 3272. The application 3224 may determine 3604, based on the data 3274 from the motion-sensing component 3272, whether the mobile device 3218 is in motion. If the application 3224 determines 3604 that the mobile device 3218 is not in motion, the application 3224 may keep 3606 the camera 3236 in standby mode 3356. If, however, the application 3224 determines 3604 that the mobile device 3218 is in motion, the application 3224 may place 3608 the camera 3236 in video capture mode 3354.

Figure 37:
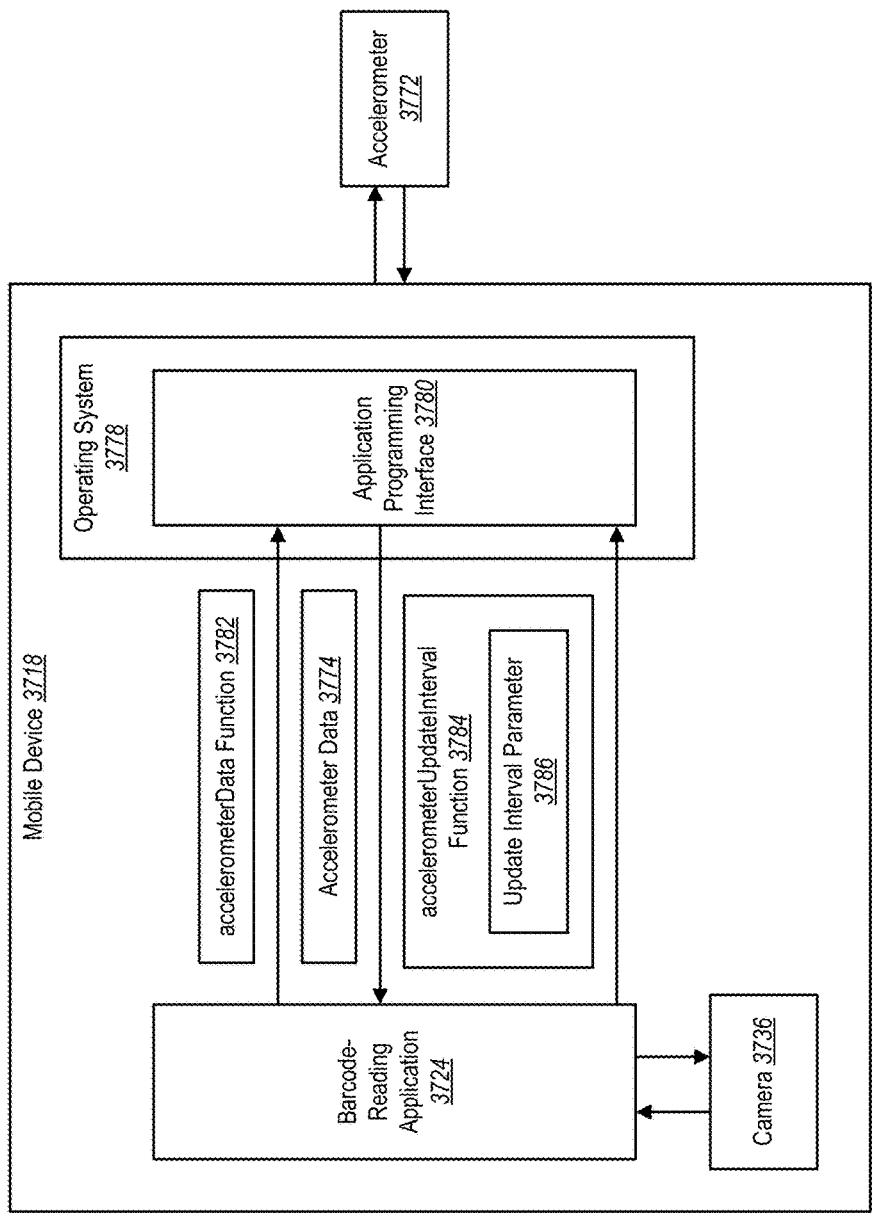
FIG. 37 illustrates another system in which aspects of the present disclosure may be utilized, including a mobile device that comprises a camera, a barcode-reading application, and an accelerometer.

FIG. 37 illustrates another mobile device 3718, which may include a barcode-reading application 3724. Except as indicated otherwise below, the mobile device 3718 and barcode-reading application 3724 may be configured similarly to the mobile device 3218 and barcode-reading application 3224 in the system 3200 shown in FIG. 32.

The mobile device 3718 may include an accelerometer 3772, which is an example of the motion-sensing component 3272 in the system 3200 shown in FIG. 32. The accelerometer 3772 may be configured to detect acceleration of the mobile device 3718 and to provide data 3774 that is indicative of the detected acceleration. This data 3774 may be referred to herein as accelerometer data 3774.

The mobile device 3718 may include an operating system 3778 that exposes the accelerometer data 3774 to the application 3724 via an application programming interface (API) 3780. For example, the API 3780 may provide a function 3782 that returns the accelerometer data 3774. This function 3782 may be referred to herein as an accelerometerData function 3782.

The operating system 3778 may also expose an update interval for the accelerometer 3772 to the application 3724 via the API 3780. For example, the API 3780 may provide a function 3784 that enables the application 3724 to set the update interval for the accelerometer 3772. This function 3784 may be referred to herein as an accelerometerUpdateInterval function 3784. The update interval may control how often the accelerometer data 3774 is updated. In order to set the update interval for the accelerometer 3772, the application 3724 may call the accelerometerUpdateInterval function 3784 and provide the desired update interval as a parameter 3786.

The mobile device 3718 may also include a camera 3736. The interaction between the application 3724 and the camera 3736 may be similar to the interaction between the application 3224 and the camera 3236 in the mobile device 3218 shown in FIG. 32. For example, as described previously, FIGS. 34-36 illustrate various methods 3400, 3500, 3600 that may be performed by a barcode-reading application 3224. These methods 3400, 3500, 3600 are related to determining what the mode of operation of the camera 3236 should be (e.g., whether the camera 3236 should be in standby mode 3356 or video capture mode 3354). The application 3724 in the mobile device 3718 shown in FIG. 37 may perform methods that are similar to the methods 3400, 3500, 3600 shown in FIGS. 34-36, with the accelerometer data 3774 being used as the data 3274 from the motion-sensing component 3272.

Figure 38:
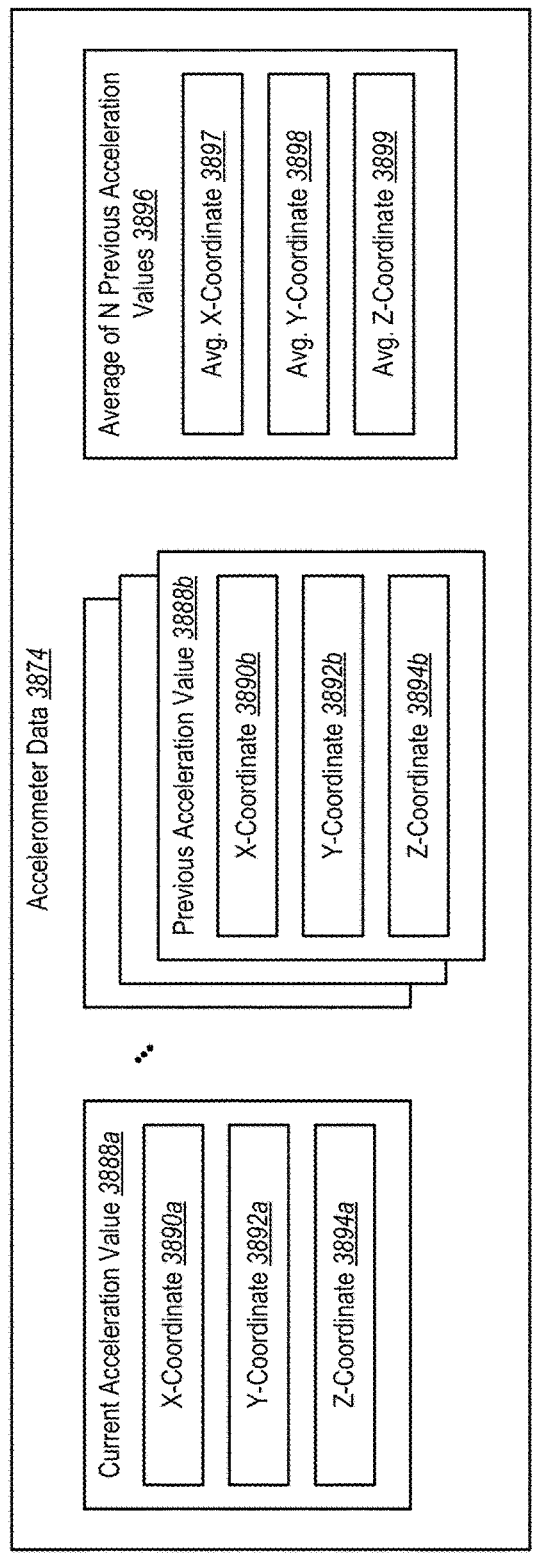
FIG. 38 illustrates an example of accelerometer data provided by the accelerometer.

FIG. 38 illustrates an example of accelerometer data 3874. The accelerometer data 3874 may include a plurality of acceleration values 3888. Each acceleration value 3888 may include an x-coordinate 3890, a y-coordinate 3892, and a z-coordinate 3894.

At any given point in time, the acceleration values 3888 provided by the accelerometer 3772 may include a current acceleration value 3888a as well as one or more previous acceleration values 3888b. The current acceleration value 3888a may be the most recent acceleration value 3888 provided by the accelerometer 3772. The previous acceleration values 3888b may be the acceleration values 3888 provided prior to the current acceleration value 3888a. The current acceleration value 3888a may include an x-coordinate 3890a, a y-coordinate 3892a, and a z-coordinate 3894a. Each of the previous acceleration values 3888b may similarly include an x-coordinate 3890b, a y-coordinate 3892b, and a z-coordinate 3894b.

For reasons that will be explained in greater detail below, the application 3724 may calculate the average 3896 of the N previous acceleration values 3888b, where N may be any integer greater than or equal to one. The average 3896 of the N previous acceleration values 3888b may include an average x-coordinate value 3897, an average y-coordinate value 3898, and an average z-coordinate value 3899.

Figure 39:
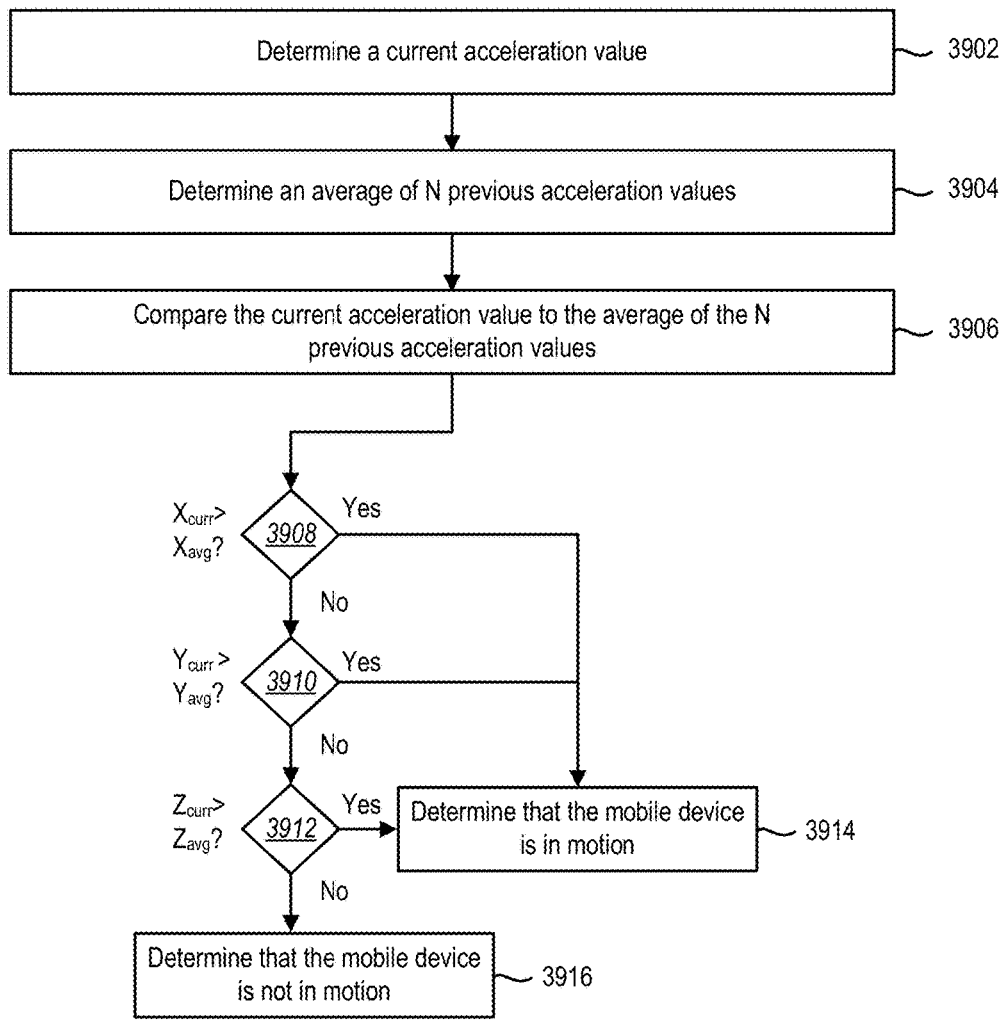
FIG. 39 is a flow diagram that illustrates a method that may be performed by a barcode-reading application in order to determine whether a mobile device is in motion.

FIG. 39 is a flow diagram that illustrates a method 3900 that may be performed by the application 3724 in order to determine whether the mobile device 3718 is in motion. In the depicted method 3900, the application 3724 may determine that the mobile device 3718 is in motion if the x-coordinate 3890a, the y-coordinate 3892a, or the z-coordinate 3894a of the current acceleration value 3888a exceeds a corresponding coordinate of the average 3896 of the N previous acceleration values 3888b.

In accordance with the method 3900, the application 3724 may determine 3902 a current acceleration value 3888a. The application 3724 may also determine 3904 an average 3896 of N previous acceleration values 3888b, where N may be any integer greater than or equal to one. The application 3724 may then compare 3906 the current acceleration value 3888a to the average 3896 of the N previous acceleration values 3888b.

The application 3724 may determine 3908 whether the x-coordinate 3890a of the current acceleration value 3888a (which is denoted $x_{curr}$ in FIG. 39) exceeds the average x-coordinate value 3897 (which is denoted $x_{avg}$ in FIG. 39) in the average 3896 of the N previous acceleration values 3888b. The application 3724 may also determine 3910 whether the y-coordinate 3892a of the current acceleration value 3888a (which is denoted $y_{curr}$ in FIG. 39) exceeds the average y-coordinate value 3898 (which is denoted $y_{avg}$ in FIG. 39) in the average 3896 of the N previous acceleration values 3888b. The application 3724 may also determine 3912 whether the z-coordinate 3894a of the current acceleration value 3888a (which is denoted $z_{curr}$ in FIG. 39) exceeds the average z-coordinate value 3899 (which is denoted $z_{avg}$ in FIG. 39) in the average 3896 of the N previous acceleration values 3888b. If the application 3724 determines 3908 that $x_{curr} > x_{avg}$, and/or the application 3724 determines 3910 that $y_{curr} > y_{avg}$, and/or the application 3724 determines 3912 that $z_{curr} > z_{avg}$, then the application 3724 may determine 3914 that the mobile device 3718 is in motion. If, however, the application 3724 determines 3908 that $x_{curr} \leq x_{avg}$, and the application 3724 determines 3910 that $y_{curr} \leq y_{avg}$, and the application 3724 determines 3912 that $z_{curr} \leq z_{avg}$, then the application 3724 may determine 3916 that the mobile device 3718 is not in motion.

In an alternative embodiment, the application 3724 may determine that the mobile device 3718 is in motion only if the x-coordinate 3890a, the y-coordinate 3892a, and the z-coordinate 3894a of the current acceleration value 3888a each exceed a corresponding coordinate of the average 3896 of the N previous acceleration values 3888b. In other words, the application 3724 may determine that the mobile device 3718 is in motion only if $x_{curr} > x_{avg}$, $y_{curr} > y_{avg}$, and $z_{curr} > z_{avg}$.

In another alternative embodiment, the application 3724 may determine that the mobile device 3718 is in motion if at least two of the x-coordinate 3890a, the y-coordinate 3892a, and the z-coordinate 3894a of the current acceleration value 3888a exceed a corresponding coordinate of the average 3896 of the N previous acceleration values 3888b. For example, the application 3724 may determine that the mobile device 3718 is in motion if $x_{curr} > x_{avg}$ and $y_{curr} > y_{avg}$, even if $z_{curr} \leq z_{avg}$.

Figure 40:
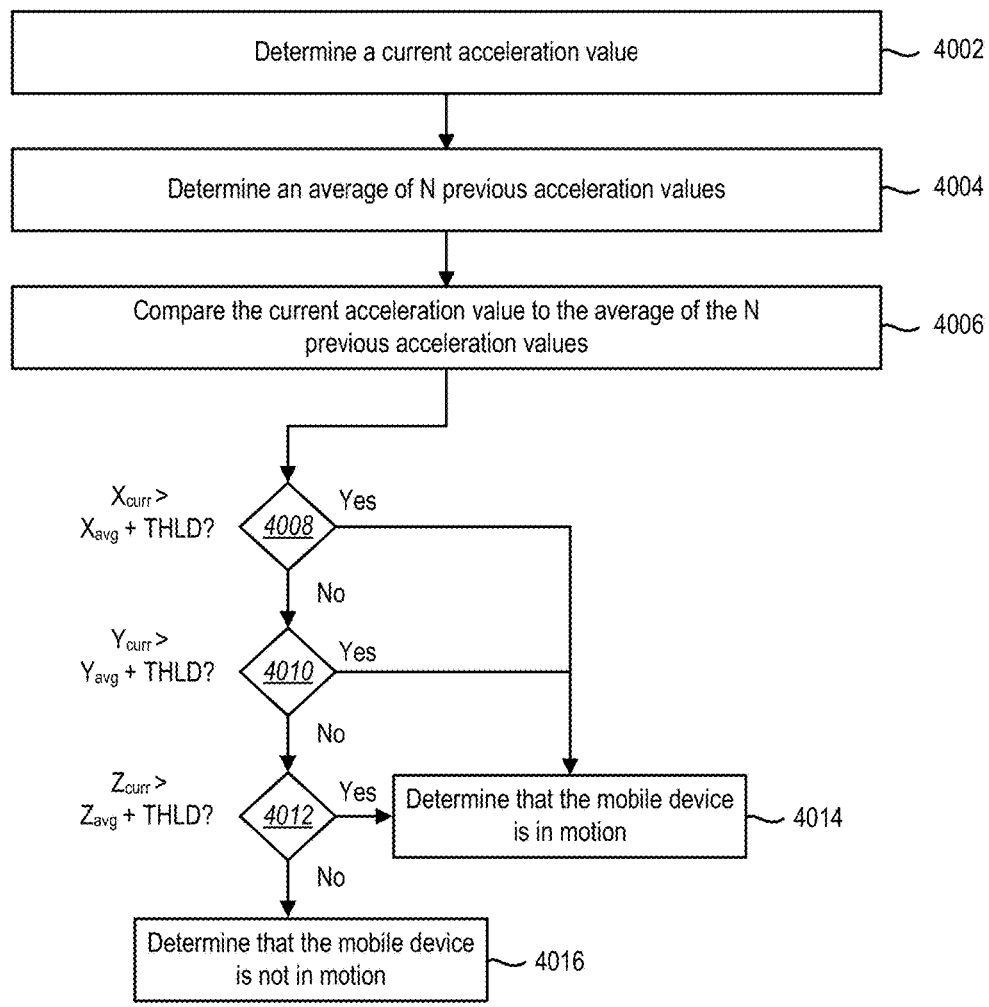
FIG. 40 is a flow diagram that illustrates another method that may be performed by a barcode-reading application in order to determine whether a mobile device is in motion

FIG. 40 is a flow diagram that illustrates another method 4000 that may be performed by the application 3724 in order to determine whether the mobile device 3718 is in motion. In the method 4000 shown in FIG. 40, the application 3724 may determine that the mobile device 3718 is in motion if the x-coordinate 3890a, the y-coordinate 3892a, or the z-coordinate 3894a of the current acceleration value 3888a exceeds a corresponding coordinate of the average 3896 of the N previous acceleration values 3888b by a threshold amount.

Steps 4002 and 4004 may be similar to steps 3902 and 3904 in the method 3900 shown in FIG. 39. The application 3724 may then compare 4006 the current acceleration value 3888a to the average 3896 of the N previous acceleration values 3888b plus a threshold amount (which is denoted THLD in FIG. 40).

More specifically, the application 3724 may determine 4008 whether $x_{curr}$ exceeds $x_{avg}$ by the threshold amount. In other words, the application 3724 may determine 4008 whether $x_{curr} > x_{avg}$+THLD. The application 3724 may also determine 4010 whether $y_{curr} > y_{avg}$+THLD. The application 3724 may also determine 4012 whether $z_{curr} > z_{avg}$+THLD.

If the application 3724 determines 4008 that $x_{curr} > x_{prev}$+THLD, and/or the application 3724 determines 4010 that $y_{curr} > y_{prev}$+THLD, and/or the application 3724 determines 4012 that $z_{curr} > z_{prev}$+THLD, then the application 3724 may determine 4014 that the mobile device 3718 is in motion. If, however, the application 3724 determines 4008 that $x_{curr} \leq x_{prev}$+THLD, and the application 3724 determines 4010 that $y_{curr} \leq y_{prev}$+THLD, and the application 3724 determines 4012 that $z_{curr} \leq z_{prev}$+THLD, then the application 3724 may determine 4016 that the mobile device 3718 is not in motion.

In an alternative embodiment, the application 3724 may determine that the mobile device 3718 is in motion only if the x-coordinate 3890a, the y-coordinate 3892a, and the z-coordinate 3894a of the current acceleration value 3888a each exceed a corresponding coordinate of the average 3896 of the N previous acceleration values 3888b by a threshold amount. In other words, the application 3724 may determine that the mobile device 3718 is in motion only if $x_{curr} > x_{avg}$+THLD, $y_{curr} > y_{avg}$+THLD, and $z_{curr} > z_{avg}$+THLD.

In another alternative embodiment, the application 3724 may determine that the mobile device 3718 is in motion if at least two of the x-coordinate 3890a, the y-coordinate 3892a, and the z-coordinate 3894a of the current acceleration value 3888a exceed a corresponding coordinate of the average 3896 of the N previous acceleration values 3888b by a threshold amount. For example, the application 3724 may determine that the mobile device 3718 is in motion if $x_{curr} > x_{avg}$+THLD and $y_{curr} > y_{avg}$+THLD, even if $z_{curr} \leq z_{avg}$+THLD.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible. Numbers, percentages, ratios, or other values stated herein are intended to include that value, and also other values that are "about" or "approximately"

the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words "means for" appear together with an associated function. Each addition, deletion, and modification to the embodiments that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A mobile device, comprising:
a camera;
a motion-sensing component configured to detect motion of the mobile device;
a processor;
memory; and
a barcode-reading application stored in the memory and executable by the processor to use data from the motion-sensing component to determine when to activate video capture by the camera.

2. The mobile device of claim 1, wherein the barcode-reading application is further executable by the processor to:
periodically determine, while the camera is in a standby mode, whether the mobile device is in motion based on the data from the motion-sensing component; and
place the camera in a video capture mode if the mobile device is in motion.

3. The mobile device of claim 2, wherein the motion-sensing component comprises an accelerometer that is configured to detect acceleration of the mobile device, wherein the accelerometer is configured to provide accelerometer data comprising a plurality of acceleration values, and wherein determining whether the mobile device is in motion comprises:
determining a current acceleration value;
determining an average of N previous acceleration values, where N is an integer greater than or equal to one; and
comparing the current acceleration value to the average of the N previous acceleration values.

4. The mobile device of claim 3, wherein:
each acceleration value of the plurality of acceleration values comprises an x-coordinate, a y-coordinate, and a z-coordinate; and
the barcode-reading application is further executable by the processor to determine that the mobile device is in motion if any of the x-coordinate, the y-coordinate, or the z-coordinate of the current acceleration value exceeds a corresponding coordinate of the average of the N previous acceleration values.

5. The mobile device of claim 3, wherein:
each acceleration value of the plurality of acceleration values comprises an x-coordinate, a y-coordinate, and a z-coordinate; and
the barcode-reading application is further executable by the processor to determine that the mobile device is in motion if any of the x-coordinate, the y-coordinate, or the z-coordinate of the current acceleration value exceeds a corresponding coordinate of the average of the N previous acceleration values by a threshold amount.

6. The mobile device of claim 1, wherein the barcode-reading application is further executable by the processor to:
wait for a defined time period after an attempt to read a barcode;
use the data from the motion-sensing component to make a determination about whether the mobile device is in motion, the determination being made after the defined time period; and
place the camera in a standby mode if the mobile device is not in motion.

7. The mobile device of claim 1, wherein the barcode-reading application is further executable by the processor to:
restart a countdown timer after each attempt to read a barcode;
determine, at a defined time interval prior to or after expiration of the countdown timer, whether the mobile device is in motion; and
place the camera in a standby mode if the mobile device is not in motion.

8. The mobile device of claim 1, wherein:
the motion-sensing component comprises an accelerometer; and
the barcode-reading application is further executable by the processor to set an update interval for the accelerometer, the update interval controlling how often accelerometer data is updated.

9. The mobile device of claim 8, further comprising an operating system that exposes the accelerometer data and the update interval for the accelerometer to the barcode-reading application via an application programming interface.

10. A mobile device, comprising:
a camera that is operable in a video capture mode and a standby mode;
an accelerometer configured to detect acceleration of the mobile device and to provide accelerometer data that is indicative of the acceleration of the mobile device;
a processor;
memory; and
a barcode-reading application stored in the memory and executable by the processor to:
periodically determine, based on the accelerometer data, whether the mobile device is in motion while the camera is in the standby mode, and place the camera in the video capture mode if the mobile device is in motion; and use the accelerometer data to determine whether the mobile device is in motion following a defined time period after each read attempt, and place the camera in the standby mode if the mobile device is not in motion.

11. The mobile device of claim 10, wherein the accelerometer data comprises a plurality of acceleration values, and wherein determining whether the mobile device is in motion comprises:
   determining a current acceleration value;
   determining an average of N previous acceleration values, where N is an integer greater than or equal to one; and
   comparing the current acceleration value to the average of the N previous acceleration values.

12. The mobile device of claim 11, wherein:
   each acceleration value of the plurality of acceleration values comprises an x-coordinate, a y-coordinate, and a z-coordinate; and
   the barcode-reading application is further executable by the processor to determine that the mobile device is in motion if any of the x-coordinate, the y-coordinate, or the z-coordinate of the current acceleration value exceeds a corresponding coordinate of the average of the N previous acceleration values.

13. The mobile device of claim 11, wherein:
   each acceleration value of the plurality of acceleration values comprises an x-coordinate, a y-coordinate, and a z-coordinate; and
   the barcode-reading application is further executable by the processor to determine that the mobile device is in motion if any of the x-coordinate, the y-coordinate, or the z-coordinate of the current acceleration value exceeds a corresponding coordinate of the average of the N previous acceleration values by a threshold amount.

14. The mobile device of claim 10, wherein the barcode-reading application is further executable by the processor to:
   restart a countdown timer after each read attempt;
   determine, at a defined time interval prior to or after expiration of the countdown timer, whether the mobile device is in motion; and
   place the camera in the standby mode if the mobile device is not in motion.

15. The mobile device of claim 10, wherein the barcode-reading application is further executable by the processor to set an update interval for the accelerometer, the update interval controlling how often the accelerometer data is updated.

16. The mobile device of claim 15, further comprising an operating system that exposes the accelerometer data and the update interval for the accelerometer to the barcode-reading application via an application programming interface.

17. A method implemented by a mobile device comprising a camera, the method comprising:
   periodically determining, based on accelerometer data, whether the mobile device is in motion while the camera is in a standby mode, and placing the camera in a video capture mode if the mobile device is in motion; and
   using the accelerometer data to determine whether the mobile device is in motion following a defined time period after each attempt to read a barcode, and placing the camera in the standby mode if the mobile device is not in motion.

18. The method of claim 17, wherein the accelerometer data comprises a plurality of acceleration values, and wherein determining whether the mobile device is in motion comprises:
   determining a current acceleration value;
   determining an average of N previous acceleration values, where N is an integer greater than or equal to one; and
   comparing the current acceleration value to the average of the N previous acceleration values.

19. The method of claim 18, wherein each acceleration value of the plurality of acceleration values comprises an x-coordinate, a y-coordinate, and a z-coordinate, and further comprising determining that the mobile device is in motion if any of the x-coordinate, the y-coordinate, or the z-coordinate of the current acceleration value exceeds a corresponding coordinate of the average of the N previous acceleration values.

20. The method of claim 18, wherein each acceleration value of the plurality of acceleration values comprises an x-coordinate, a y-coordinate, and a z-coordinate, and further comprising determining that the mobile device is in motion if any of the x-coordinate, the y-coordinate, or the z-coordinate of the current acceleration value exceeds a corresponding coordinate of the average of the N previous acceleration values by a threshold amount.

* * * * *